US010079968B2

(12) United States Patent
Galor et al.

(10) Patent No.: US 10,079,968 B2
(45) Date of Patent: *Sep. 18, 2018

(54) CAMERA HAVING ADDITIONAL FUNCTIONALITY BASED ON CONNECTIVITY WITH A HOST DEVICE

(71) Applicant: QUALCOMM Incorporated, San Diego, CA (US)

(72) Inventors: Micha Galor, Tel-Aviv (IL); Eran David Pinhasov, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/092,564

(22) Filed: Nov. 27, 2013

(65) Prior Publication Data
US 2014/0160304 A1    Jun. 12, 2014

Related U.S. Application Data

(60) Provisional application No. 61/732,314, filed on Dec. 1, 2012.

(51) Int. Cl.
H04N 5/232    (2006.01)
H04N 17/00    (2006.01)

(52) U.S. Cl.
CPC ......... H04N 5/23203 (2013.01); H04N 5/232 (2013.01); H04N 5/23206 (2013.01); H04N 5/23209 (2013.01); H04N 17/002 (2013.01)

(58) Field of Classification Search
CPC ........ H04N 7/20; H04N 7/185; H04N 17/002; H04N 5/23206; H04N 5/232; H04N 5/23203; H04N 5/23209

(Continued)

(56) References Cited

U.S. PATENT DOCUMENTS 5,809,354 A * 9/1998 Miyazawa ............. G03B 17/14
396/301
7,522,828 B2 * 4/2009 Doi ........................ G03B 17/56
396/71

(Continued)

FOREIGN PATENT DOCUMENTS

JP    2007082059 A    3/2007
JP    2013105014 A    5/2013

OTHER PUBLICATIONS http://www.sonyalpharumors.com/sr3-honami-smartphone-uses-a-magnetic-mount-for-nex-lenses-and-a-curious-lens.

(Continued)

Primary Examiner — Pritham Prabhakher
(74) Attorney, Agent, or Firm — Paradice and Li LLP/Qualcomm

(57) ABSTRACT

Embodiments may be directed to lens cameras which may be cameras arranged as a sensor in a lens cap. A lens camera may comprise a printed circuit board with a digital image sensor and associated components enclosed in a cylindrical body that may be constructed of metal, plastic, or the like, or combination thereof. Lens cameras may be fitted with lens mounts for attaching host devices, cameras, interchangeable lens, or the like. Lens mounts on a lens camera may be arranged to be compatible with one or more standard lens mounts. Accordingly, a lens camera may be attached to cameras that have compatible lens mounts. Also, interchangeable lens having lens mounts compatible with the lens camera may be attached to the lens camera. Further, lens cameras may communicate with host devices using wired or wireless communication facilities.

20 Claims, 39 Drawing Sheets

(58) Field of Classification Search
USPC .................................................. 348/211.99
See application file for complete search history.

(56) References Cited

U.S. PATENT DOCUMENTS

| | | | |
|---|---|---|---|
| 7,645,080 B2* | 1/2010 | Toji | G03B 17/02 348/360 |
| 7,783,182 B2* | 8/2010 | Tokiwa | G03B 17/14 348/375 |
| 8,342,760 B2* | 1/2013 | Imafuji | G02B 7/08 359/827 |
| 8,414,205 B2* | 4/2013 | Okada | G02B 7/14 396/530 |
| 8,446,433 B1 | 5/2013 | Mallet et al. | |
| 8,665,161 B2 | 3/2014 | Parsche | |
| 8,704,907 B2* | 4/2014 | Shibuno | H04N 5/23209 348/222.1 |
| 8,704,944 B1* | 4/2014 | Wierzoch | H04N 5/2251 348/207.99 |
| 8,749,698 B2* | 6/2014 | Yamaya | H04N 5/23209 348/360 |
| 8,755,684 B2* | 6/2014 | Sugiyama | G03B 17/56 396/301 |
| 8,885,560 B2 | 11/2014 | Wallen et al. | |
| 9,568,806 B2* | 2/2017 | Kim | H04N 5/2254 |
| 2002/0021898 A1 | 2/2002 | Teramoto | |
| 2003/0229667 A1 | 12/2003 | Pedersen et al. | |
| 2004/0239763 A1 | 12/2004 | Notea et al. | |
| 2005/0025472 A1* | 2/2005 | Sugita | G03B 17/14 396/71 |
| 2005/0124379 A1 | 6/2005 | Liu | |
| 2005/0174434 A1 | 8/2005 | Chang et al. | |
| 2006/0077279 A1 | 4/2006 | Kang | |
| 2006/0098114 A1* | 5/2006 | Horii | H04N 5/2254 348/360 |
| 2006/0104483 A1 | 5/2006 | Harel et al. | |
| 2006/0165401 A1* | 7/2006 | Doi | G03B 17/56 396/71 |
| 2006/0291842 A1* | 12/2006 | Tokiwa | G03B 17/14 396/56 |
| 2007/0098385 A1 | 5/2007 | Tanaka | |
| 2007/0147815 A1 | 6/2007 | Tanaka | |
| 2007/0153112 A1 | 7/2007 | Ueda et al. | |
| 2007/0248356 A1* | 10/2007 | Toji | G03B 17/02 396/529 |
| 2008/0238893 A1 | 10/2008 | Ishii | |
| 2008/0310039 A1 | 12/2008 | Tanaka | |
| 2009/0303176 A1 | 12/2009 | Chen et al. | |
| 2010/0141762 A1* | 6/2010 | Siann | H04N 7/185 348/143 |
| 2011/0032412 A1* | 2/2011 | Higuchi | H04N 5/232 348/345 |
| 2011/0069196 A1 | 3/2011 | Jung et al. | |
| 2011/0102618 A1* | 5/2011 | Yamaya | H04N 5/23209 348/222.1 |
| 2011/0157461 A1 | 6/2011 | Tanaka | |
| 2011/0229114 A1* | 9/2011 | Okada | G03B 17/14 396/71 |
| 2011/0249174 A1 | 10/2011 | Idemura et al. | |
| 2011/0289136 A1* | 11/2011 | Klassen | H04N 1/32101 709/203 |
| 2011/0317990 A1* | 12/2011 | Imafuji | G03B 17/14 396/133 |
| 2012/0033955 A1* | 2/2012 | Okada | G02B 7/14 396/71 |
| 2012/0169901 A1 | 7/2012 | Chang | |
| 2012/0218435 A1 | 8/2012 | Olsen et al. | |
| 2012/0256916 A1 | 10/2012 | Kitamura et al. | |
| 2012/0293686 A1 | 11/2012 | Karn et al. | |
| 2012/0293687 A1 | 11/2012 | Karn et al. | |
| 2012/0294598 A1* | 11/2012 | Oikawa | G03B 17/14 396/125 |
| 2012/0315016 A1 | 12/2012 | Fung | |
| 2013/0011057 A1 | 1/2013 | Li et al. | |
| 2013/0120589 A1 | 5/2013 | Chang et al. | |
| 2013/0124471 A1 | 5/2013 | Chen et al. | |
| 2013/0132044 A1* | 5/2013 | Paris | G02C 7/028 703/2 |
| 2013/0141640 A1* | 6/2013 | Kim | H04N 5/2254 348/375 |
| 2013/0142431 A1 | 6/2013 | Jin | |
| 2013/0235222 A1 | 9/2013 | Karn et al. | |
| 2013/0235226 A1 | 9/2013 | Karn et al. | |
| 2013/0278779 A1 | 10/2013 | Hong | |
| 2013/0321586 A1 | 12/2013 | Kirk et al. | |
| 2014/0104449 A1 | 4/2014 | Masarik et al. | |
| 2014/0152777 A1 | 6/2014 | Galor et al. | |
| 2014/0208126 A1 | 7/2014 | Mooney et al. | |
| 2017/0301201 A1 | 10/2017 | Siann et al. | |

OTHER PUBLICATIONS

Search Report for GB Application No. GB1321085.1, searched on May 6, 2014.
Search Report for GB Application No. GB1321083.6, searched on May 6, 2014.
"Sony Cyber-shot QX10 review: a WiFi 'lens camera' that mounts directly on your smartphone", Sep. 18, 2013, accessed on May 5, 2014 at: http://pdf.engadge.com/2013/09/18/sony-qx10-review/.
Sony instruction manual for DSC-QX10/QX100, 2013, China, accessed on May 5, 2014 at: http://pdf.crse.com/manuals/4480203121.pdf.

* cited by examiner

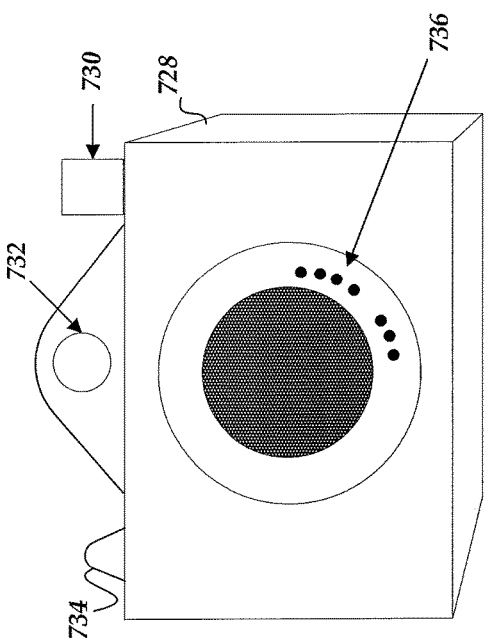
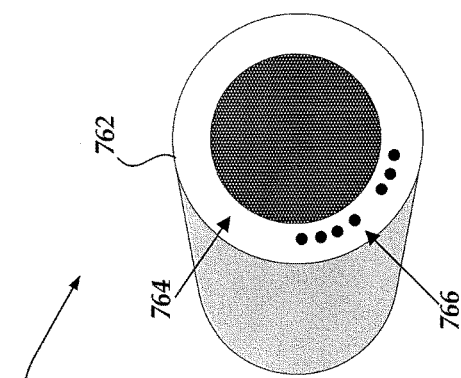
FIG. 7D
FIG. 7E

CAMERA HAVING ADDITIONAL FUNCTIONALITY BASED ON CONNECTIVITY WITH A HOST DEVICE

CROSS-REFERENCE TO RELATED APPLICATIONS

This application claims the benefit of U.S. Provisional Application Ser. No. 61/732,314 filed on Dec. 1, 2012, entitled "An interchangeable lens camera/Sensor in a lens cap," the benefit of the earlier filing date of which is hereby claimed under 35 U.S.C. § 119 (e) and further incorporated by reference.

TECHNICAL FIELD

The present invention relates to digital image capture, and more particularly to capturing digital images with a camera that is operative to wirelessly communicate with at least a host device that is operative to control at least digital image capture by the camera.

BACKGROUND

The marketplace competition between mobile telephone cameras and stand-alone digital cameras continues to increase as each new generation of mobile telephone cameras achieve improved performance and features. In some cases, mobile telephone cameras may match or exceed the performance characteristics of some consumer grade stand-alone digital cameras. Convenience and cost considerations may be two of many reasons that consumers are drawn to mobile telephone cameras. However, as mobile telephones grow more powerful and full-featured the performance of their on-board cameras may be strongly influenced by design considerations unique to mobile telephones, such as, physical size limitations, battery life, storage, or the like. Accordingly, the evolution of mobile telephone cameras maybe slowed by limitations inherent with some of the design goals for mobile telephones that may work against digital camera performance improvements. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 7A-7E illustrate camera designs and lens cameras in accordance with at least one of the various embodiments;

DETAILED DESCRIPTION

Figure 1:
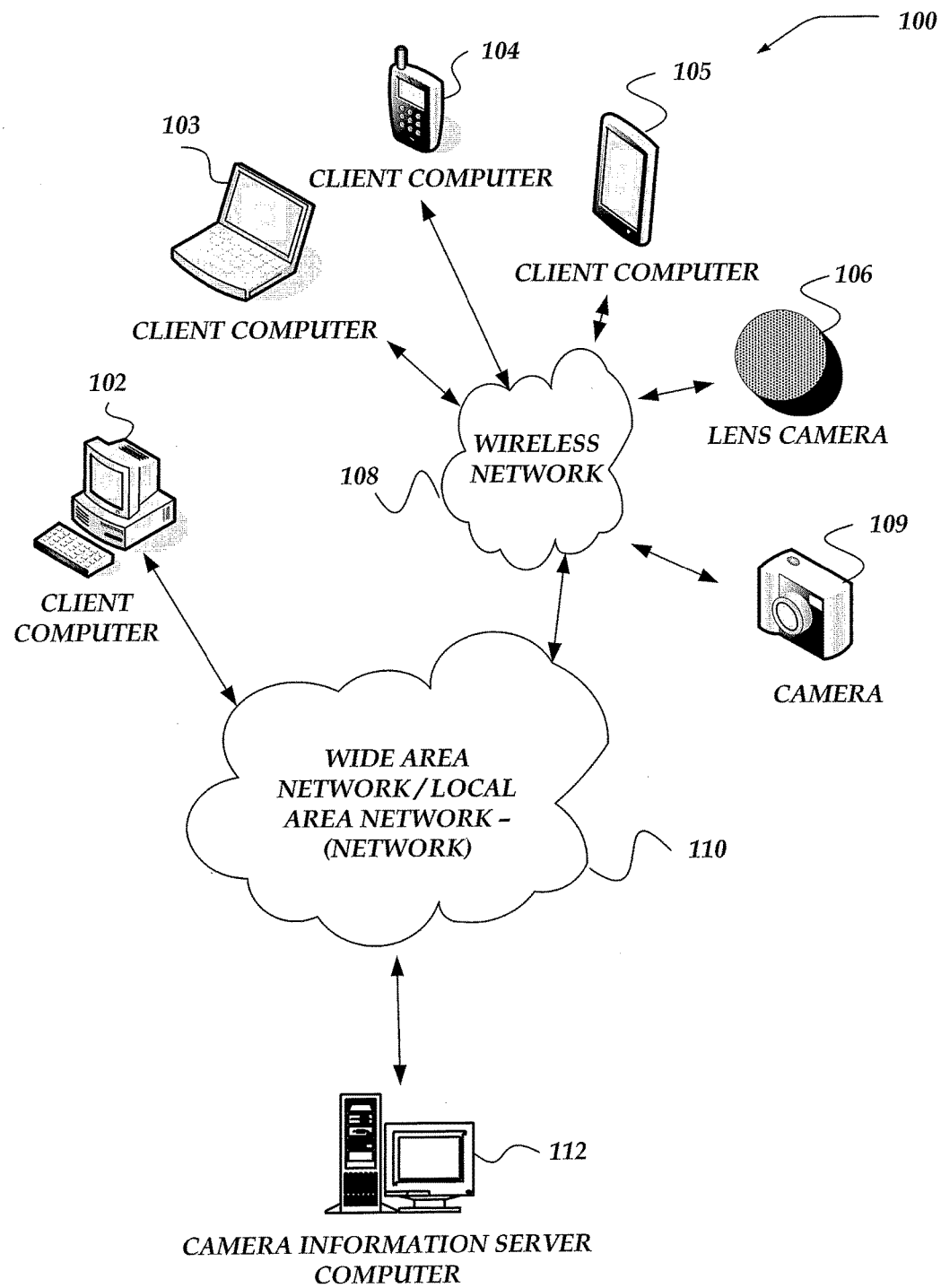
FIG. 1 is a system diagram of an environment in which at least one of the various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in at least one of the various one embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated embodiments may be directed to lens cameras which may be cameras arranged to communicate with a host device. In at least one of the various embodiments, a lens camera may comprise a printed circuit board with a digital image sensor and associated components enclosed in a cylindrical body that may be constructed of metal, plastic, or the like, or combination thereof.

In at least one of the various embodiments, one end of the lens camera may be fitted with a lens mount for attaching interchangeable lens. In at least one of the various embodiments, the other end of the lens camera may be fitted with a lens mount that enables the lens camera to be attached one or more host devices such as a digital camera, mobile computer, smart phone, or the like.

In at least one of the various embodiments, the lens mounts on a lens camera may be electro-mechanical mounts arranged to be compatible with one or more standard lens mounts. Accordingly, in at least one of the various embodiments, a lens camera may be attached to cameras that have compatible lens mounts. Also, interchangeable lens having lens mounts compatible with the lens camera may be attached to the lens camera.

In at least one of the various embodiments, lens cameras may be arranged to communicate using the electronic interfaces of its lens mounts. Accordingly, the lens camera may communicate with the host device camera and the interchangeable lens through the electronic interface of the lens mounts. Such communication may include, command and control messages, status messages, or the like. For example, communication from the lens camera to an attached interchangeable lens may set some or all of the lens settings, such as, aperture, focus, exposure, or the like. In at least one of the various embodiments, the protocol for communicating with an interchangeable lens family may be provided by the lens manufacturers, various camera manufacturers, and/or other third-parties. In some cases, the protocol may be specific and/or proprietary to a particular camera manufacturer and/or camera brand. In other cases, the protocol may be a more open standard that has been developed for use with multiple camera manufacturers, and camera brands.

Likewise, in at least one of the various embodiments, the lens camera and the host camera may communicate electronically over the lens mount interface that attaches the lens camera to the host camera. For example, communication between the lens camera and the host camera may include aperture control and/or auto-focus motor control. Further, in at least one of the various embodiments, the lens camera may be arranged to communicate with the host camera using one or more other communication facilities that may be supported be the host camera, such as, but not limited to, flash shoes, remote switch interfaces, wireless interfaces (e.g., Wi-Fi, Bluetooth, NFC, or the like), data/power connections, such as, Universal Serial Bus (USB), micro USB, Firewire, or the like. For example, the lens camera may receive lens control information through the lens mount while extended communication with the host camera may be conducted over a secondary wired or wireless connection with the host camera.

In at least one of the various embodiments, lens cameras may use one or more of the host camera communication facilities to provide image data to the host camera for display in the view screen of the host camera. Accordingly, the cost, power usage, and/or size of a lens camera may be reduced because it does not include a liquid crystal display (LCD) view screen and/or the user-interface for operating a camera—these sometimes expensive and/or complex features may be offloaded to the host camera. In at least one of the various embodiments, host camera control system interface may be adapted and/or arranged to enable improved coupling of lens cameras. Thus, some host cameras may support a higher level of integration with lens cameras than other depending on how well their control system interfaces integrate with lens cameras.

In at least one of the various embodiments, lens cameras may be employed to upgrade a host camera by providing improved and/or additional features. For example, if the built-in sensor of a host camera is ten megapixels, performance may be improved by attaching a lens camera that includes a twenty megapixel sensor. Likewise, other features that may be absent on the host camera may be provided by a coupled lens camera, such as, increased data stored, wireless connectivity, High Definition Multimedia Interface (HDMI) connections, or the like. Further, since the lens mount on the front of a lens camera may be different that the lens mount of the host camera, coupling a lens camera with a host camera may enable the use of interchangeable lens that may otherwise be incompatible with the host camera.

In at least one of the various embodiments, lens cameras may be arranged to couple with one or more host devices, such as, mobile computers, smart phones, mobile tablets, computers, or the like, using wired and/or wireless interfaces. In at least one of the various embodiments, lens camera coupled with host devices may be arranged to capture more or less raw image data and communicate to the host device for image processing.

Further, in at least one of the various embodiments, lens cameras may have wired and/or wireless interfaces, such as, HDMI, micro HDMI, Ethernet, Wi-Fi, Bluetooth, near-field communication (NFC), or the like, for interfacing with other devices, such as, televisions, projectors, computers, remote storage devices, or the like. Accordingly, a lens camera may be arranged to provide imagery to a television and/or video/image project at the same time as it may be interfacing with the host camera.

In at least one of the various embodiments, lens cameras may be equipped with a lens mounts on the front end and a lens camera mount on the back end. A lens camera mount may be a mount that is arranged to connect a lens camera with accessories such as battery packs, grip, flash extensions, or the like. In some embodiments, a lens camera mount enables a lens camera to be attached to a lens camera body that may enable physical coupling with host devices. Lens camera bodies may have physical data connectors, such as, dock connectors, that enable a smart phone to interface with the lens camera. Alternately, in at least one of the various embodiments, a lens camera and a lens camera body may be arranged into a single unit.

Accordingly, in at least one of the various embodiments, lens cameras may be arranged to off-load compute intensive image processing functionality to a host device. Further, in at least one of the various embodiments, a single host device may be arranged to couple with multiple lens cameras. Thus, in at least one of the various embodiments, applications operative on the host device may be arranged to control multiple lens cameras.

In at least one of the various embodiments, host devices that may be coupled with multiple lens cameras may include lens camera applications that enable coordinating the image capturing for multiple lens cameras on one hosting device. For example, three lens cameras on tripods each with different sized interchangeable lens may be placed at different angles and distances from the same subject. In this example, preview imagery from each of the three lens cameras may be simultaneously displayed on the same display screen of a single host device. In at least one of the various embodiments, video imagery from multiple lens cameras may be previewed and/or controller by a single host device. In some cases, multiple streams of video may be captured for future video editing. In other embodiments, a single video stream may be captured by dynamically selecting among them to determine which lens camera should be captured.

In at least one of the various embodiments, a lens camera may be mounted on a host camera and simultaneously coupled (wired and/or wirelessly) with a host device. In this configuration, a user may "take pictures" using the camera while the image data maybe captured by the lens camera and off-loaded to the host device (separate from the host camera) for image processing. In this configuration, the user may employ continue to use their existing camera body along with its accessories, such as, grips, flashes, tripods, or the like, while the image data may be captured by the lens camera and sent to a host device for further processing.

In at least one of the various embodiments, lens camera applications executing on a host device may be arranged to perform various actions that take advantage of having multiple lens cameras. For example, lens camera applications may be arranged to blend multiple source of image data into a single image. In another example, a lens camera application operative on a single host device may be arranged to generate 3D and stereoscopic imagery from two lens cameras. Likewise, a lens camera application may be arranged to coordinate image capture from multiple lens cameras arranged in a sequence or array.

In at least one of the various embodiments, lens camera applications may be arranged to incorporate image data captured by one or more lens cameras with image data captured by a camera that may be built-in to the host device. For example, if a lens camera is coupled with a host device that includes a built-in camera, such as a smart phone, the lens camera application on the host device may be enabled to use image data from the smart phone camera along with image data from the lens camera when generating processed imagery.

Furthermore, in at least one of the various embodiments, lens camera application may be enabled to enable a user to create a cloud trigger on a server for coordinating the actions of multiple lens cameras that may be coupled with different host devices. Cloud triggers may be arranged to perform Various actions, such as, crowd flash effects, where a multitude of lens cameras are synchronized such that they operate their flashes at the same time.

In at least one of the various embodiments, lens camera applications and/or lens camera may be provided one or more lens profiles for correcting aberrations that may be present in one or more interchangeable lens. Lens profiles may be purchased from online stores and/or in-application purchases from within the lens camera application. One or more lens profiles may be provided for a given interchangeable lens enabling lens profiles tailored to different conditions to be made available.

In at least one of the various embodiments, users may be enabled to capture calibration information for their own lens camera systems and/or interchangeable lens. The calibration information may be provided to a server that may use it to generate one or more custom lens profiles. Further, these custom lens profiles may be shared with other users by enabling them to be made available in online stores, in-application purchases, social network sharing systems, or the like, or combination thereof.

Illustrative Operating Environment

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes local area networks (LANs)/wide area networks (WANs)—(network) 110, wireless network 108, client computers 102-105, lens camera 109, Camera Information Server Computer 112.

At least one embodiment of client computers 102-105 is described in more detail below in conjunction with FIG. 2. In one embodiment, at least some of client computers 102-105 may operate over a wired and/or wireless network, such as networks 110 and/or 108. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, an accounting server, a production server, an inventory server, or the like. However, client computers 102-105 are not constrained to these services and may also be employed, for example, as an end-user computing node, in other embodiments. It should be recognized that more or less client computers may be included within a system such as described herein, and embodiments are therefore not constrained by the number or type of client computers employed.

Computers that may operate as client computers 102-105 may include computers that typically connect using a wired or wireless communications medium such as personal computers, multiprocessor systems, microprocessor-based or programmable electronic devices, network PCs, or the like. In some embodiments, client computers 102-105 may include virtually any portable personal computer capable of connecting to another computing device and receiving information and/or performing as a host device, such as, laptop computer 103, smart mobile telephone 104, and tablet computers 105, mobile computers, or the like. However, portable computers and/or host devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer may employ the browser application to perform various activities over a network (online) However, another application may also be used to perform various online activities.

Client computers 102-105 may also include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Camera Information Server Computer 112, or other computers.

Client computers 102-105 may further be configured to include a client application that enables an end-user to log into an end-user account that may be managed by another computer or device, such as, Camera Information Server Computer 112, or the like. Such end-user accounts, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Lens camera 106 may be camera devices arranged for coupling with client computers 102-105 and or camera 109 for image data captures. Image data may be of still images or video. Lens camera 106 may be arranged to communicate with client computers 102-105 over a wireless network 108. Also, lens camera 106 may be arranges to communicate with Camera Information Server 112. Further, in some embodiments, lens camera 106 may be arranged to communicate image data to televisions, video projectors, or the like. Various embodiments of lens camera 106 are discussed in more detail below.

Camera 109 is a digital camera that may be arranged for capturing image data for photographs and/or video. Some embodiments of camera 109 may be arranged to communicate using one or more networks, such as, wireless network 108. Camera 109 may be arranged to couple with lens camera 106. In at least one of the various embodiments, camera 109 may be arranged to be a host device.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like. Wireless network 108 may further be arranged to couple Lens camera 109 with one or more of Client Computer 103-105. In at least one of the various embodiments, Wireless network 108 may comprise additional wireless communication methods such as, NFC, Bluetooth, Bluetooth Low Energy, Wi-Fi, WiMax, or the like, or combination thereof, Network 110 is configured to couple network computers with other computers and/or computing devices, including, Camera Information Server Computer 112, client computer 102, client computers 103-105, and camera 109, through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Camera Information Server Computer 112 is described in more detail below in conjunction with FIG. 3. Briefly, however, Camera Information Server Computer 112 includes virtually any network computer capable of communicating lens camera information with client computers, including client computer that may be operative as a host device coupled with a lens camera. Camera Information Server Computer 112 may determine statistics regarding the lens and/or len profiles that may be associated with interchangeable lens that may be used with lens camera, such as, camera 109. Further, in at least one of the various embodiments, Camera Information Server Computer 112 may deliver content to host devices, including browser plugins, plugin engine code, audio, video, images, html, news, events, or the like, or combination thereof. Further, Camera Information Server Computer may be arranged to collect calibration information from lens camera and/or generate lens profiles from provide calibration information, or the like. Computers that may be arranged to operate as Camera Information Server Computer 112 include various network computers, including, but not limited to personal computers, desktop computers, multiprocessor systems, microprocessor-based or programmable consumer electronics, network PCs, server computers, network appliances, and the like.

Although FIG. 1 illustrates Camera Information Server Computer 112 as a single computer, the various embodiments are not so limited. For example, one or more functions of the Camera Information Server Computer 112 may be distributed across one or more distinct network computers. Moreover, Camera Information Server Computer 112 is not limited to a particular configuration. Thus, in one embodiment, Camera Information Server Computer 112 may contain a plurality of network computers. In another embodiment, Camera Information Server Computer 112 may contain a plurality of network computers that operate using a master/slave approach, where one of the plurality of network computers of Camera Information Server Computer 112 operates to manage and/or otherwise coordinate operations of the other network computers. In other embodiments, the Camera Information Server Computer 112 may operate as a plurality of network computers within a cluster architecture, a peer-to-peer architecture, and/or even within a cloud architecture. Thus, the invention is not to be construed as being limited to a single environment, and other configurations, and architectures are also envisaged.

Although illustrated separately, Camera Information Server Computer 112 may be employed as a single network computer, separate network computers, a cluster of network computers, or the like.

Illustrative Client Computer

Figure 2:
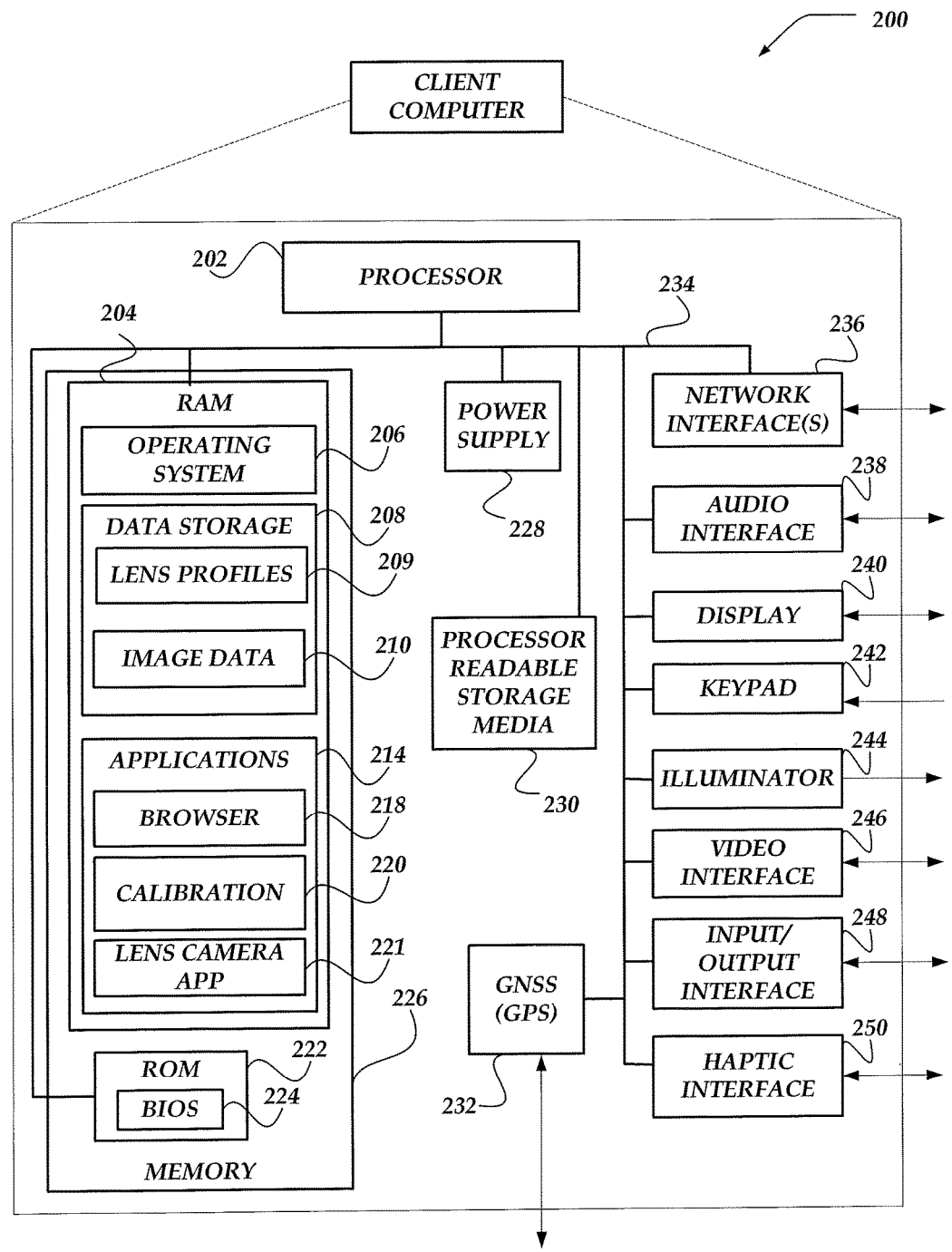
FIG. 2 shows an embodiment of a client computer that may be included in a system such as that shown in FIG. 1.

FIG. 2 shows one embodiment of Client Computer 200 that may be included in a system implementing embodiments of the invention. Client Computer 200 may include many more or less components than those shown in FIG. 2. However, the components shown are sufficient to disclose an illustrative embodiment for practicing the present invention. Client Computer 200 may represent, for example, one embodiment of at least one of Client Computers 102-105 of FIG. 1. Client Computer 200 may represents at least one of the various embodiments of a host device that may be arranged to connect and/or couple with one or more lens cameras.

As shown in the figure, Client Computer 200 includes a processor 202 in communication with a mass memory 226 via a bus 234. In some embodiments, processor 202 may include one or more central processing units (CPU). Client Computer 200 also includes a power supply 228, one or more network interfaces 236, an audio interface 238, a display 240, a keypad 242, an illuminator 244, a video interface 246, an input/output interface 248, a haptic interface 250, and a global navigation satellite system (GNSS) receiver 232, such as a Global Positioning Satellite (GPS) receiver.

Power supply 228 provides power to Client Computer 200. A rechargeable or non-rechargeable battery may be used to provide power. The power may also be provided by an external power source, such as an alternating current (AC) adapter or a powered docking cradle that supplements and/or recharges a battery.

Client Computer 200 may optionally communicate with a base station (not shown), or directly with another computer. Network interface 236 includes circuitry for coupling Client Computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the Client Computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computing computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAT), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. Also, data storage 208 may store lens profiles 209 for one or more lens cameras and/or interchangeable lens and image data 210. At least a portion of the information may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, browser 218, and calibration application 220. Calibration application 220 may be employed for computing calibrations information and/or capturing calibration information that may be used for generating lens profiles. Also, other applications may be included in Applications 214, such as, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as Camera Information Server Computer 112 of FIG. 1.

Applications 214 may also include lens camera application 221. Lens Camera Application 221 may be a program that may be provided to the client computer by Camera Information Server Computer 112. Or it may be installed from another source, such as, an online application store. Lens Camera Application 221 may run as a native client computer application or it may run in Browser 218 as web browser based application and/or plugins.

Illustrative Network Computer

Figure 3:
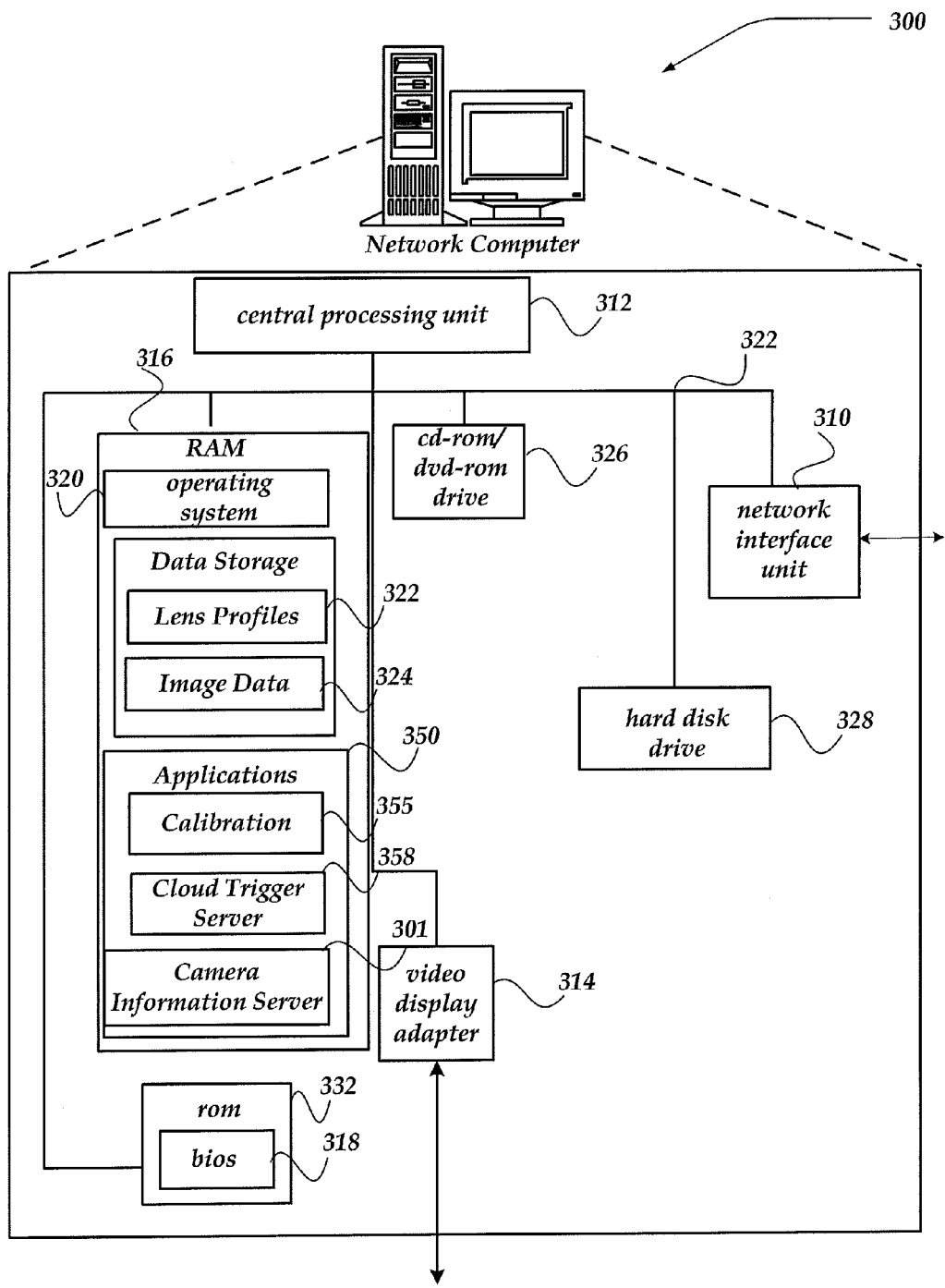
FIG. 3 shows an embodiment of a network computer that may be included in a system such as that shown in FIG. 1.

FIG. 3 shows one embodiment of another device useable with another embodiment of the lens camera. Network computer 300 may include many more or less components than those shown. The components shown, however, are sufficient to disclose an illustrative embodiment for practicing the invention. Network computer 300 may represent any of a variety of computing devices, including, but not limited to personal computers, desktop computers, multiprocessor systems, microprocessor-based or programmable electronics, a rack mounted multi-processing configuration, network PCs, televisions, camera systems, server devices, network appliances, and the like. In one embodiment, network computer 300 may also operate as a laptop computer, or similar handheld computer system. In at least one embodiment, network computer 300 may be mated with one or more lens cameras and/or an image capturing components useable for capturing image data.

In at least one of the various embodiments, while a single network computer 300 is illustrated, operations discussed with respect to at least the lens camera, may also be distributed across a plurality of computing devices, for example, such as might arise within a cloud architecture, a peer-to-peer structure, a cluster architecture, or other distributed architectures.

Network computer 300 includes central processing unit 312, video display adapter 314, and a mass memory, all in communication with each other via bus 322. Central processing unit 312 may include at least one central processor. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network computer 300. Any general-purpose operating system or special purpose operating system may be employed. Basic input/output system ("BIOS") 318 is also provided for controlling the low-level operation of network computer 300. As illustrated in FIG. 3, network computer 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Moreover, in at least one embodiment, Network interface unit 310 may be configured to interface with an image capturing component, such as a camera, lens assembly, or the like, such as disclosed above in conjunction with FIG. 1.

The mass memory as described above illustrates another type of computer-readable or processor-readable device, namely non-transitory computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of non-transitory computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical non-transitory medium which can be used to store the desired information and which can be accessed by a computing device.

As shown, data stores 354 may include a database, text, spreadsheet, folder, file, or the like, that may be configured to maintain and store data useable for camera information server 301, including, focus range data, threshold data, function look-ups, tables, lens calibration information, user information, lens profiles 322, image data 324, and/or any of a variety of data useable within one or more of the processes discussed below. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network computer 300, including, but not limited to cd-rom/dvd-rom 326, hard disk drive 328, or other computer-readable storage device resident on network computer 300 or accessible by network computer 300 over, for example, network interface unit 310.

The mass memory also stores program code and data. One or more applications 350 are loaded into mass memory and run on operating system 320. Examples of application programs may include transcoders, schedulers, customizable user interface programs, security programs, and so forth. Memory may also include calibration application 355, camera information server 301, and cloud trigger server 358. It should be recognized that while cloud trigger server 358 and camera information server 301 are illustrated within RAM 316, other embodiments may include cloud trigger server 358 and/or camera information server 301 within ROM 332, and/or within one or more separate circuit boards (not shown) within network computer 300.

It should be recognized that calibration application 355, cloud trigger server 358, and camera information server 301 may operate on image data 324 obtained from data stores 354, hard disk drive 328, cd-rom/dvd-rom drive 326, other storage devices, or even from a network or from another device or computer through network interface unit 310, as well as from various image sensing devices, or the like.

Illustrative Embodiments

Figure 4:
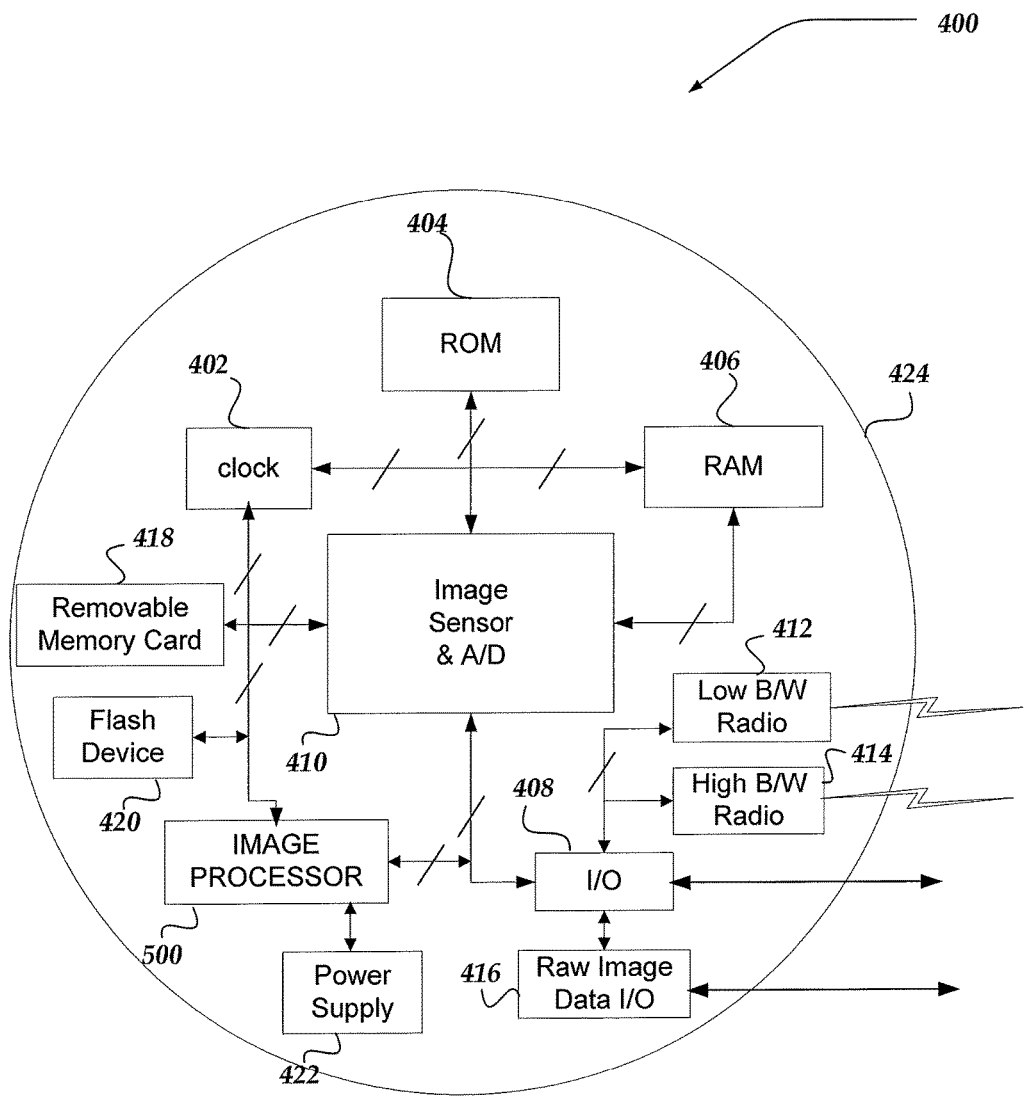
FIG. 4 illustrates a system diagram of one embodiment of an environment in which the embodiments may be practiced.

FIG. 4 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 4. However, the components shown are sufficient to disclose at least one of the various embodiments for practicing the disclosed innovations.

As shown, system 400 of FIG. 4 may represent a lens camera that may be a stand-alone imaging device or may be mated/paired/coupled with or any of a variety of other possible portable devices, including cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to capture and process images and/or video. In one embodiment, system 400 may include components not shown, such as a lens or other optical elements, and image sensor(s) for receiving images that may be converted into digital images for processing and subsequent storage within one or more storage devices and/or communicated to one or more host devices/computers.

As shown, system 400 may include components on a single integrated circuit chip or on a plurality of different circuit chips. In any event, components shown in FIG. 4 include a clock circuit 402 for providing clocking signals to the circuit chips and other components. While illustrated as a separate component, it should be understood that clock circuit 402 may also be included on image processor 500, or the like.

Also shown is a volatile random-access memory (RAM) circuit chip 406 that may be coupled to image processor 500 to provide temporary data storage. In one embodiment, RAM 406 may be configured to receive and store image data for use by image processor 500 or output data from image processor 500, as well as to store lens profiles, various algorithms, and the like. A separate non-volatile read-only memory (ROM) memory chip 404 is also coupled to image processor 500 and may be employed for storage of a processor program, calibration data, look-up tables (LUTS), non-linear functions, and a variety of other data useable by system 400. In one embodiment, ROM 404 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 400, including, for example, memory cards that may, include semi-conductor flash electrically erasable and programmable read-only memory, removable rotating magnetic disk storage, removable universal serial bus (USB) devices, or any of a variety of other storage devices. In one embodiment, system 400 may also be configured through Input/Output (I/O) device 408 to access storage devices that may be external to system 400. Thus, it should be understood that image processor 400 may be configured to receive one or more frames of image data, operate upon the received image data, and store or otherwise communicate the image data using a variety of storage devices, and/or communication mechanisms, and therefore is not limited to merely those described herein.

I/O device 408 includes circuitry for coupling system 400 to one or more external devices, networks or the like, and is constructed for use with one or more communication protocols and technologies, including any of a variety of communication protocols and technologies useable for communicating images, including images to and/or from system 400. In one embodiment, I/O device 408 may be comprised one or more transceivers, transceiver processors, transceiver devices, radio transceivers, network interface cards (NIC), or the like, or combination thereof.

I/O device 408 may also provide for various other communications, including for use various input devices, such as keypads, touch screens, or the like, as well as output devices including screen displays, audio outputs, or the like. Thus, although not shown, system 400 may also include a speaker and/or microphone that may be coupled to I/O device 408 to enable communications. System 400 may also include a display that may include a liquid crystal display (LCD), gas plasma, light emitting diode (LED), or any other type of display usable for providing text and/or an image for display.

Also illustrated, is an image sensor & analog-to-digital converter (A/D) that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). Image sensor & A/D 410 may then provide the digital data to image processor 500 for processing. In one embodiment, the data received by image processor 500 may be in a raw Bayer format. However, other data formats may also be used, including, for example, the image data may be defined by three components of the image signal; namely, a luminance component (Y), and two complementary chrominance (color differences) components (V=R−Y) and (U=B−Y).

In at least one of the various embodiments, lens camera housing 424 may be arranged such that it may be coupled to one or host devices (not shown). In at least one of the various embodiments, for host devices that support detachable lens, lens camera housing 424 may be arranged for attaching to the host device using the lens mount of the host device. In at least one of the various embodiments, the host device connector of lens camera housing 424 may be arranged to mimic and/or duplicate one or more lens connection and control standards that are supported by the host device, such as, as bayonet-style mount that is compatible with the host camera. Accordingly, I/O 408 may be arranged to communicate with the host camera using control messages/commands that are compatible with the lens mount of the host camera.

In at least one of the various embodiments, lens camera housing 424 may be arranged such that it may be coupled with the host device other connectors, that may include, dock mount connections, USB connectors, micro-USB connectors, custom format connectors, or the like. Accordingly, I/O 408 may be arranged to communicate with the host devices using control messages/commands that are compatible with the connector of the host device.

In at least one of the various embodiments, I/O 408 may be arranged to communicate with one or more host devices using near field communication, such as, NFC, Bluetooth, Bluetooth Low Energy, Wi-Fi, Wimax, or the like, or combination thereof.

In at least one of the various embodiments, low bandwidth radio 412 may be employed for at least communication of control information, video data, and/or image data with a host device. In some embodiments, this may be advantageous since low bandwidth radio 412 may be arranged to conserver energy consumption by employing relatively low-power radios and/or protocols such as Bluetooth, Bluetooth Low Energy, NFC, or the like. In at least one of the various embodiments, control commands may be sent and received from a host device, including host cameras. In at least one of the various embodiments, low bandwidth radio 412 enables the lens camera to communicate with host devices while image data may be communicated using other communication facilities, such as high bandwidth radio 414. In at least one of the various embodiments, low bandwidth radio 412 may be employed to communicate video or image data using a low-bit rate while consuming relatively less energy. Accordingly, in at least one of the various embodiments, communicating video and/or image data using low bandwidth radio 412 may reduce power/energy consumption at the expense of data quality and/or transmission speed.

In at least one of the various embodiments, high bandwidth radio 414 may be arranged to communicate at least image data and/or video data that may be captured by image sensor 410 to a host device, data store, projection/display device, computer, of the like, or combination thereof. In at least one of the various embodiments, high bandwidth radio 414 may be a Wi-Fi radio supporting 802.11a-n, Wimax, or the like. Further, in at least one of the various embodiments, high bandwidth radio 414 may be designed for optimal transmission of image data for still photographs. Accordingly, some of the embodiments may be designed to optimize power consumption based on periodic transmission of image data. For example, high bandwidth radio 414 may be designed for transmitting one image per second. In this example, in at least one of the various embodiments, if image data exceeds the transmission rate, excess image data may be buffered in removable memory card 418, RAM 406, or the like, or combination thereof.

In at least one of the various embodiments, high bandwidth radio 414 may be designed for ultra-high bandwidth for transmitting video image data sufficient for multiple frames per second (e.g., 20 frames per second, 24 frames per second, 30 frames per second, or the like). Thus, in some of the embodiments, high bandwidth radio 414 may be designed to operate in high power/higher bandwidth mode if transmitting image data associated with video capturing. In at least one of the various embodiments, as discussed above, low bandwidth radio 412 may be used as a relatively low energy consumption radio for communicating and/or transmitting control information, video data, and/or image data.

In at least one of the various embodiments, lens camera 400 may be arranged to employ low bandwidth radio 412 and high bandwidth radio 414 in concert if communicating to host devices, data stores, display device, computers, or the like. Accordingly, in at least one of the various embodiments, lens camera 400 may arranged to communicate control commands with a host device, or other device and/or computer, including, acknowledgements, security keys, errors, status, flow control, or the like, using low bandwidth radio 412. Likewise, in at least one of the various embodiments, lens camera 400 may be arranged to communicate image data using high bandwidth radio 414. The two radios, low bandwidth radio 412 and high bandwidth radio 414 may be arranged to work together with low bandwidth radio 412 used for protocol control while high bandwidth radio 414 is used for bulk image/video data transfer.

In at least one of the various embodiments, lens camera 400 may be arranged such that low bandwidth radio 412 and high bandwidth 414 may be powered down individually if not in use. Accordingly, in at least one of the various embodiments, if lens camera 400 is communicating control information using low bandwidth radio 412, high bandwidth radio 414 may be powered down until the image/video data is ready to be communicated.

In at least one of the various embodiments, raw image data I/O 416 may be arranged to communicate using one or more bulk and/or high bandwidth communication protocols. Image data may be communicated to one or more data storage computers and/or host devices. Further, in at least one of the various embodiments, raw image data I/O 416 may be used for communicating image data to one or more display devices, such as, televisions, video monitors, video projectors, or the like or combination thereof.

In at least one of the various embodiments, raw image data I/O 416 may be arranged to communicate raw image data such as uncompressed video data and/or batches of still image data from image sensor 410 that may not have been otherwise processed by the lens camera and/or a lens camera application. In some embodiments, raw image data I/O 416 may be arranged to employ unidirectional communication protocols that send image data and control information in one direction (e.g., to a storage or display device) for improved throughput. In other embodiments, raw image data I/O 416 may be arranged to employ bi-directional protocols with data and control information communicated between each endpoint. In at least one of the various embodiments, raw image data I/O 416 may be arranged to communicate using HDMI, microHDMI, Firewire, Thunderbolt, USB, video graphics array (VGA), or the like, or combination thereof.

In at least one of the various embodiments, one or more of low bandwidth radio 412, high bandwidth radio 414, or raw image data I/O 416 may be absent from lens camera 400 without departing from the scope of the innovations described herein. For example, in at least one of the various embodiments, a lens camera may be arranged to include a high bandwidth radio that performs all communications. Or, for example, a lens camera may be arranged to have two or more high bandwidth radios, or the like. One of ordinary skill in the art will appreciate that other combinations of radios and I/O may be employed without departing from the scope of the innovations disclosed herein.

In at least one of the various embodiments, low bandwidth radio 412 may often be arranged to consume less power than high bandwidth radio 414. Accordingly, in such arrangements, it may be advantageous to employ low bandwidth radio 412 for communication with a host device to reduce power use and/or power consumption by at least lens camera 400 and/or the host device. Likewise, it may be advantageous to use high bandwidth radio 414 if power consumption is not at issue, e.g., the lens camera is plugged in to a external power source. However, in at least one of the various embodiments, it may be that low bandwidth radio 412 consumes more power or has an excessive delay in transmitting video/image data than high bandwidth radio 414. For example, if low bandwidth radio 412 is arranged to communicate significant amounts of image/video data over a substantially longer period of time than what high bandwidth radio 414 would require, low bandwidth radio 412 may consume more power than high bandwidth radio 414. Also, if low bandwidth radio 412 is arranged to communicate over a far distance it may actually consume more power than high bandwidth radio 414 that may be arranged to communicate over a lesser distance/range. In any event, lens camera 400 may be arranged to include one or more radios that may have various and/or different power consumption profiles, transmission range, bandwidth, signal protocols, or the like.

Accordingly, in at least one of the various embodiments, lens camera 400 and/or a lens camera application may be arranged to determine which one or more radios to employ for communication based on various criteria such as, power consumption, range, required bandwidth to reduce significant delays in transmitting image/video data, supported communication protocols, battery strength or the like, or combination thereof. For example, if a lens camera is operating in a low-power mode, it may be arranged to determine which radio to use based on power consumption alone rather than other considerations such as higher bandwidth radio.

In at least one of the various embodiments, removable memory card 418 may be included in lens camera 400. Removable memory card 418 may be compatible with one or more well-known removable memory card formats, such as, secure digital card (SD), miniSD, microSD, Compact Flash card, (CF), or the like.

In at least one of the various embodiments, flash device 420 may be included in lens camera 400. Flash device 420 may be a light source arranged for illuminating scenes that may be captured by the Image Sensor 410. Flash device may be further arranged to perforin actions more or less similar to illuminator 244. In at least one of the various embodiments, flash device 420 may be comprised of one or more light sources, such as, light emitting diodes (LED's) that may be arranged to emit light during the capture of image/video data at different and/or various wavelengths, including, light wavelengths within the visible spectrum, light wavelengths within the infra-red spectrum to enable capturing image/video data in darkness, or the like.

In at least one of the various embodiments, power supply 422 provides power to lens camera 400. A rechargeable or non-rechargeable battery may be used to provide power. The power may also be provided by an external power source, such as an alternating current (AC) adapter or a powered docking cradle that supplements and/or recharges a battery. Further, in at least one of the various embodiments, power supply 422 may be arranged to include an "over-sized" battery to provide a power source for the host device. Accordingly, in at least one of the various embodiments, power supply 422 may be used to extend the operational battery life of the host device. As such, power supply 422 may be arranged to include one or more interfaces and/or connectors for providing power to a host device.

Figure 5:
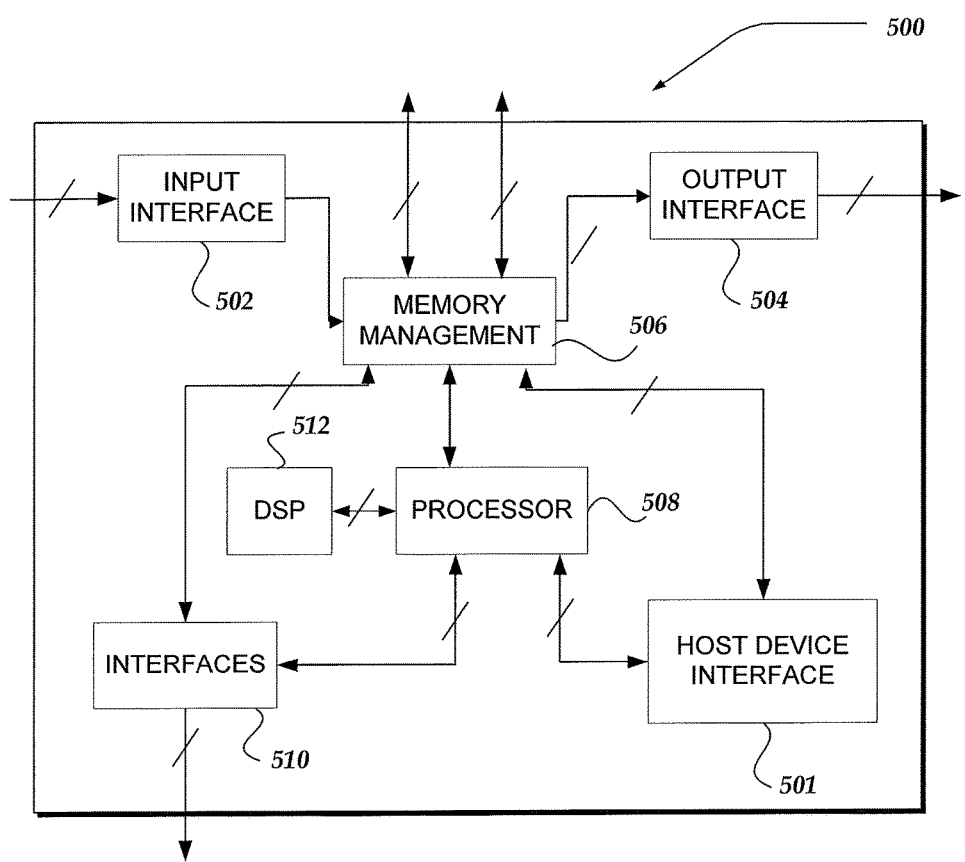
FIG. 5 shows one embodiment of an image processor usable for practicing various embodiments.

At least one of the various embodiments of image processor 500 is illustrated in FIG. 5. Image processor 500 may include more or fewer components than those shown. The components shown, however, are sufficient to disclose an illustrative embodiment for practicing various embodiments.

As shown in FIG. 5, image processor 500 may include processor 508 that may represent a general purpose or a specialized central processing unit (CPU) that is configured to perform a variety of calculations on an image and/or sequence of images and to control various operations of system 400 in response to computer-readable instructions that may be stored within one of the memory devices of FIG. 4, such as ROM 404, or the like. In one embodiment, digital data of one or more image frames may be received by input interface circuit 502 and communicated to other components by connection through memory management device 506. In one embodiment, host device interface 501 may be employed as described further below, to communicate captured image data and/or control messages to one or more host devices. Interfaces 510 may provide for various mechanisms to communicate with processor 508 and/or memory management 506, other components, to enable modifications to various actions, provide status of an action, or the like by another device, an end-user, or the like. As discussed further below, however, in some embodiments, the image data might be captured using various digital image capture devices, including system 400 of FIG. 4, and provided to a different computing device, such as, a host device, for post-processing.

Further, in at least one of the various embodiments, image processor 500 may include digital signal processor (DSP) 512 may be arranged to perform various signal processing operations some of which may be offloaded from processor 508. DSP 512 may be arranged for digital and/or analog signal processing designed to modify, filter, compress, encode, encrypt, decrypt, or improve information signals, including information and data related to images, videos, audio, or the like, combination thereof.

In at least one of the various embodiments, DSP 512 may be arranged as a co-processor with respect to processor 500. Likewise, in at least one of the various embodiments, processor 508 may be arranged to include the features of DSP 512.

Figure 6:
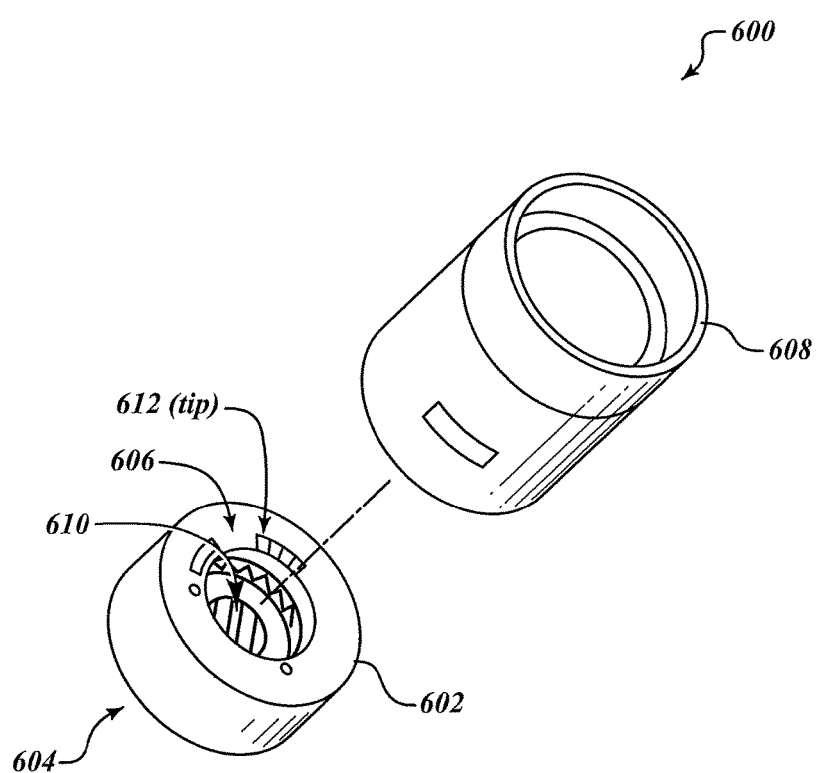
FIG. 6 illustrates a lens camera in accordance with at least one of the various embodiments.

FIG. 6 illustrates lens camera 600 in accordance with at least one of the various embodiments. In some embodiments, lens cameras may be arranged to interchangeably couple with camera lens. Further, in some embodiments, the lens camera may be arranged for coupling with a host device that may be a camera body that is designed to use interchangeable lens, such as, a mirror-less interchangeable-lens (MIL) camera.

In at least one of the various embodiments, lens camera 602 may be arranged to include at least one lens camera mount 604 that is compatible with a host device such as a camera or mobile computer (not shown). Also, in at least one of the various embodiments, lens camera 602 may be arranged to include lens mount 606 that is compatible with interchangeable lens 608. In at least one of the various embodiments, lens camera 602 may include processor 500 and/or components, such as, those included in lens camera 400. In at least one of the various embodiments, lens camera 602 may be comprised of a cylindrical metal and/or plastic body that encloses a lens camera system, such as, system 400 in FIG. 4. In some embodiments, lens mount 606 may be a bayonet style lens mount arranged to be compatible with one or more standard electronic lens interfaces. Accordingly, in at least one of the various embodiments, lens camera 602 may be enabled to communicate control messages to and from interchangeable lens 608. In at least one of the various embodiments, sensor 610 may be include in lens camera 602 for capturing image data. Further, in at least one of the various embodiments, electronic connectors/pins 612 may be arranged for communicating signal for interfacing with interchangeable lens 608 using one or more standard lens information protocols.

In at least one of the various embodiments, lens mounts may include electro-mechanical interfaces that may be used to communicate control information with an attached interchangeable lens. In at least one of the various embodiments, lens camera may be arranged to enable attachment of different lens mounts to enable compatibility with multiple interchangeable lens formats.

In at least one of the various embodiments, a lens camera mount may be arranged with one or more features that may be similar to a lens mount, such as, mechanical bayonet style attachment, electrical connections for communication and/or power. In at least one of the various embodiments, lens camera mounts may be used for attaching grips, battery packs, flashes, host devices, docks, or the like.

In at least one of the various embodiments, lens camera may be arranged to use less expensive image processing components because most image processing functions may be off loaded to a host device. Accordingly, the lens camera may be optimized for capturing image data that may be communicated to a host device for further image processing.

Figure 7A:
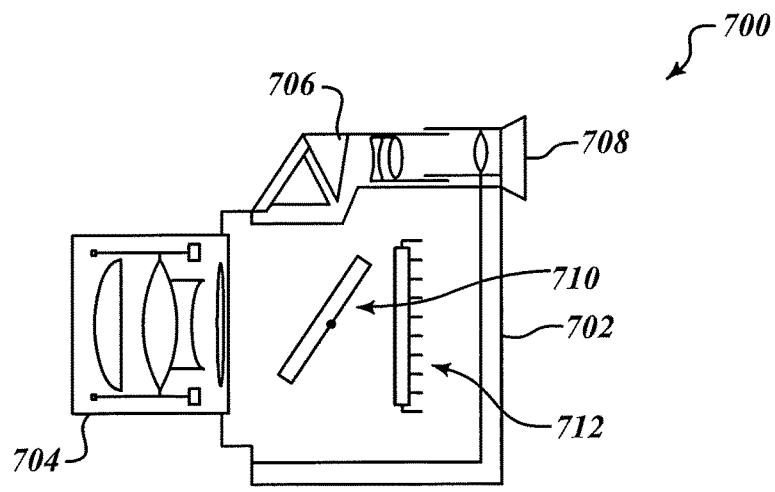
Figure 7A:
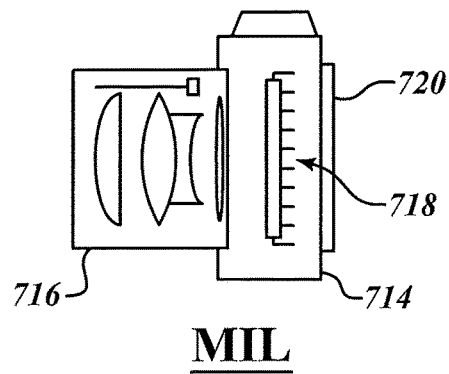
Figure 7A:
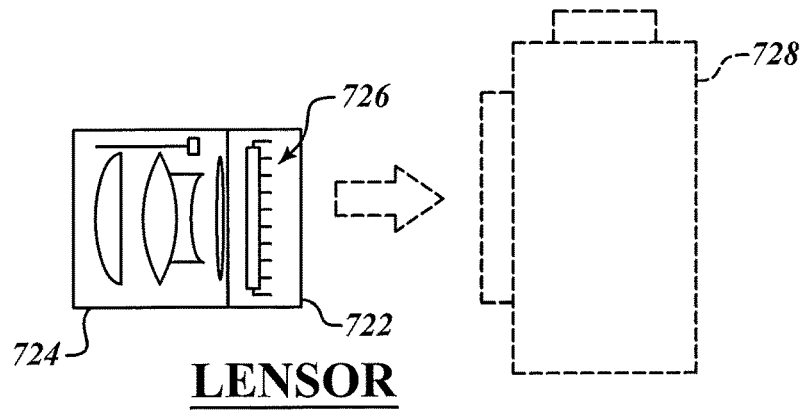

FIG. 7A illustrates sequence 700 that shows an evolution of camera designs from digital single-lens reflex cameras (DSLR) to a lens camera in accordance with at least one of the various embodiments. DSLR cameras often comprised camera body 702, interchangeable lens 704, pentaprism 706, view finder 708, mirror 710, sensor 712, or the like.

A next step in the evolutions of digital cameras includes the mirrorless interchangeable-lens cameras (MIL). MIL cameras may be comprised of camera body 714, interchangeable lens 716, LCD "view-finder" 720, sensor 718, or the like. Generally, MIL cameras include fewer components and are accordingly smaller and less expensive than comparable DSLR's. At least one of the primary sources of size reduction and cost savings of the MIL camera is the absence of complex mechanisms and components (e.g., mirror 710, pentaprism 706, view finder 708) for enabling the user to view the image scene. Rather, MIL cameras may be arranged to render the scene on a high-quality LCD screen, such as, LCD screen 720.

In at least one of the various embodiments, lens cameras, such as lens camera 722 may represent a further reduction in the complexity of cameras. In at least one of the various embodiments, lens camera 722 may include interchangeable lens 724 and sensor 726. In at least one of the various embodiments, lens cameras may be arranged to communicate image data captured by sensor 726 to one or more host devices for additional processing, storing, and/or viewing. Accordingly, since processing, storage, and viewing resources (e.g., image processors, non-volatile memory, high quality LCD screen) may be offloaded to the host device, a lens camera, such as, lens camera 722 may be advantageously economical. In at least one of the various embodiments, lens cameras 722 may be arranged to couple with a camera, such as, as camera 728. Len camera 722 may be arranged to connect to a camera, such as, camera 728 using the lens mount of the camera.

Figure 7B:
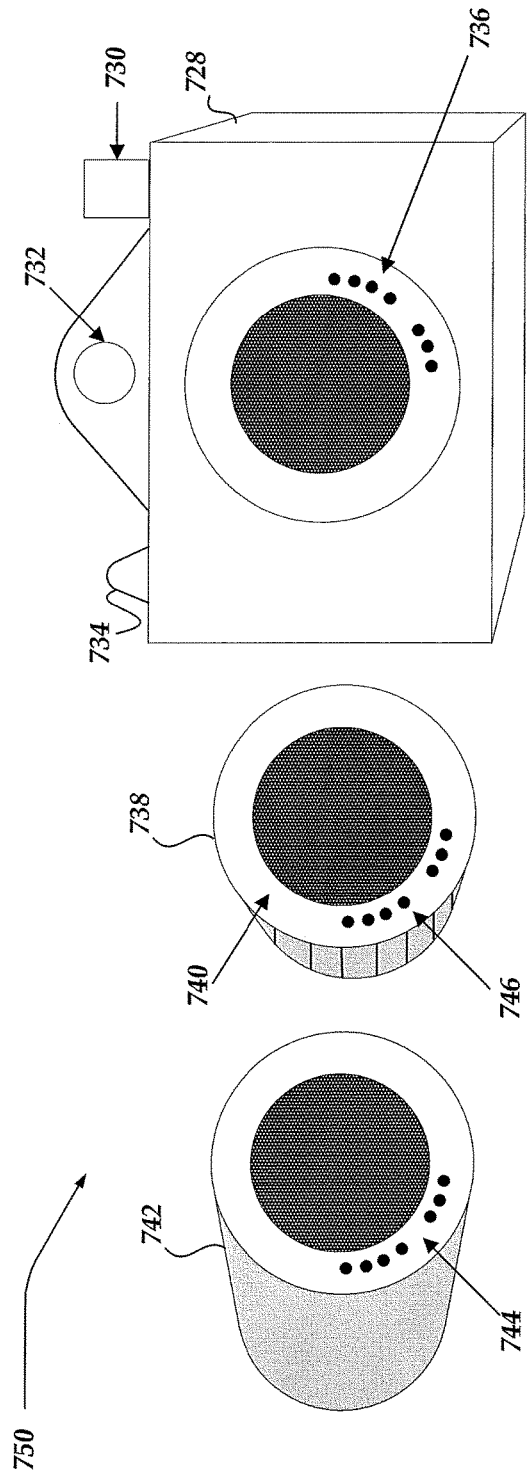

FIG. 7B shows lens camera system 750 in accordance with at least one of the various embodiments. Camera 728 may be a host device such as host camera. In at least one of the various embodiments, camera 728 may be a DSLR cameras, MIL camera, medium format camera, or the like that may be arranged to use interchangeable lenses. Accordingly, in at least one of the various embodiments, camera 728 may comprise, flash 730, view finder 732, controls/button 734, or the like.

In at least one of the various embodiments, lens mount 736 may be arranged for attaching interchangeable lenses to camera 728. In at least one of the various embodiments, lens mounts may include one or more electronic pins and/or connectors for communicating with interchangeable lenses that may be attached to the camera. In this non-limiting example, lens mount 736 includes 7 pins. In at least one of the various embodiments, the number of pins and their configuration may vary depending on the manufacturer of the camera and/or the format/standard that the camera may be arranged to comply with.

In at least one of the various embodiments, lens camera 738 may be arranged to fit on lens mount 736 of camera 728. Accordingly, in at least one of the various embodiments, lens camera 740 may be arranged to include lens mount 740. Lens mount 740 may be arranged to be compatible with lens mount 736. Accordingly, in at least one of the various embodiments, lens camera 738 may be securely coupled to camera 728 by attaching to lens mount 736 of camera 728. Also, in at least one of the various embodiments, since lens mount 740 on lens camera 738 includes electronic connectors/pins that are compatible with lens mount 736, lens camera 738 may be arranged to communicate with camera 728 using the same communication protocol that camera 728 uses to communicate with interchangeable lenses. In at least one of the various embodiments, lens mount 746, while not visible in this figure, may be on lens camera 738, opposite of lens mount 740. Lens mount 746 may be arranged to use a lens format/standard that may be compatible with lens mount 740 and/or lens mount 736. Or, in at least one of the various embodiments, since it is not intended to attached to lens mount 736, it may be arranged to use a lens format/standard that may be different the lens format/standard or lens mount 736 and lens mount 740. In at least one of the various embodiments, lens camera 738 may also include lens camera components such as at least those described in conjunction with FIG. 4 and FIG. 5.

In at least one of the various embodiments, interchangeable lens 742 may be a lens designed for photographic/video applications. In at least one of the various embodiments, interchangeable lens 742 may be a standard and/or "off-the-shelf" lens compatible with one or more camera lens mount systems. In at least one of the various embodiments, lens mount 744 may be a lens mount that enables interchangeable lens 742 to be attached to a camera and/or a lens camera that include a compatible mount. Similar to lens mount 736 and lens mount 740, lens mount 744 may be compatible with one or more lens formats. Likewise, in at least one of the various embodiments, lens mount 744 may include electronic connectors/pins compatible with one or more communication protocols for communicating between interchangeable lens and cameras. In at least one of the various embodiments, if interchangeable lens 742 may be intended for coupling with lens camera 738, lens mount 744 may be compatible with lens mount 740. Accordingly, in at least one of the various embodiments, lens mount 744 may be different and/or incompatible with lens mount 736. In such cases, lens camera 738 may be arranged to translate between the different lens communication protocols and/or standards as required. Further, in at least one of the various embodiments, commands/operations that may be triggered by controls/button 734 may be communicated to lens camera 738 over the interface between lens mount 736 and lens mount 740.

Figure 7C:
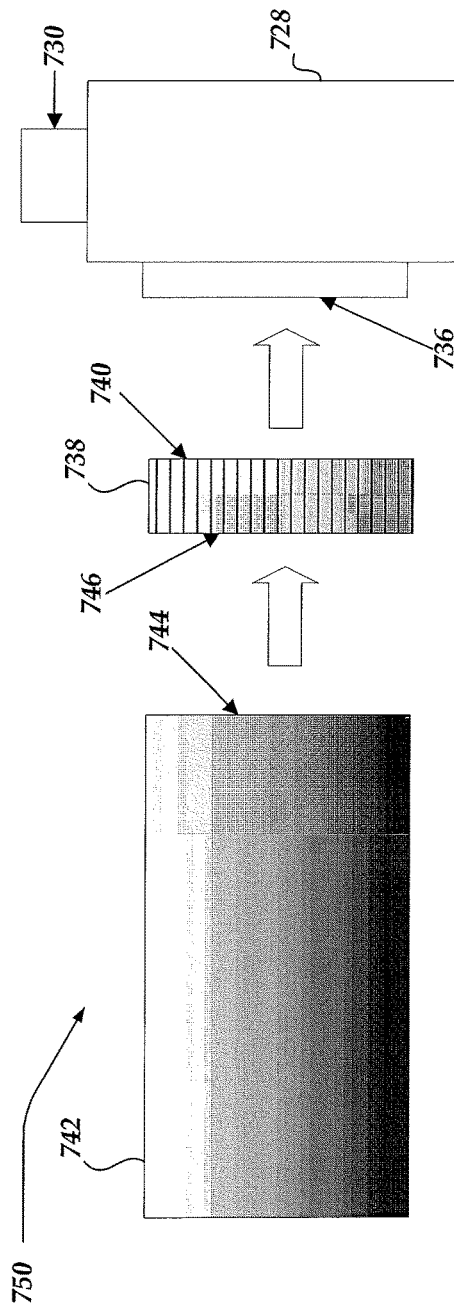

FIG. 7C shows another view of lens camera system 750 in accordance with at least one of the various embodiments. In at least one of the various embodiments, camera 728 may be attached to lens camera 738 that may be attached to interchangeable lens 742. In at least one of the various embodiments, lens camera system 750 may be comprised of camera 728, lens camera 738, and interchangeable lens 742. Accordingly, in at least one of the various embodiments, lens mount 736 of camera 728 may be attached to lens mount 740 of lens camera 738; and lens mount 746 of lens camera 736 may be attached to lens mount 744 of interchangeable lens 742.

FIG. 7D shows lens camera system 760 in accordance with at least one of the various embodiments. Camera 728 may be a host device such as host camera. In at least one of the various embodiments, camera 728 may be a DSLR cameras, MIL camera, medium format camera, or the like that may be arranged to use interchangeable lenses. Accordingly, in at least one of the various embodiments, camera 728 may comprise, flash 730, view finder 732, controls/button 734, or the like.

In at least one of the various embodiments, lens mount 736 may be arranged for attaching interchangeable lenses to camera 728. In at least one of the various embodiments, lens mounts may include one or more electronic pins and/or connectors for communicating with interchangeable lens that may be attached to the camera. In this non-limiting example, lens mount 736 includes 7 pins. In at least one of the various embodiments, the number of pins and their configuration may vary depending on the manufacturer of the camera and/or the format/standard that the camera may be arranged to comply with.

In at least one of the various embodiments, lens camera 762 may be arranged to fit on lens mount 736 of camera 728. Accordingly, in at least one of the various embodiments, lens camera 762 may be arranged to include lens mount 764. Lens mount 764 may be arranged to be compatible with lens mount 736. Accordingly, in at least one of the various embodiments, lens camera 762 may be securely coupled to camera 728 by attaching to lens mount 736 of camera 728. Also, in at least one of the various embodiments, since lens mount 764 on lens camera 762 includes electronic connectors/pins that are compatible with lens mount 736, lens camera 762 may be arranged to communicate with camera 728 using the same communication protocol that camera 728 uses to communicate with interchangeable lenses. In at least one of the various embodiments, lens camera 762 may be include an integrated lens rather than being designed for coupling with interchangeable lenses. Accordingly, lens camera 762 may include on or more lens components, including, auto-focus motors, image stabilization components, or the like. In at least one of the various embodiments, lens camera 762 may also include lens camera components such as at least those described in conjunction with FIG. 4 and FIG. 5.

Further, in at least one of the various embodiments, commands/operations that may be triggered by controls/button 734 may be communicated to lens camera 762 over the interface between lens mount 736 and lens mount 766.

FIG. 7E shows another view of lens camera system 760 in accordance with at least one of the various embodiments. In at least one of the various embodiments, camera 728 may be attached to lens camera 762. In at least one of the various embodiments, lens camera system 760 may be comprised of camera 728, and lens camera 762 (with the built-in lens). Accordingly, in at least one of the various embodiments, lens mount 736 of camera 728 may be attached to lens mount 766 of lens camera 762.

In at least one of the various embodiments, a lens camera may be semi-permanently and/or permanently mated with a lens. For example, in at least one of the various embodiments, a lens and lens camera may comprise a single unit such a user may change lens cameras to changes lens. Accordingly, in at least one of the various embodiments, the components in a lens camera may be arranged, calibrated and/or configured to be optimized for a particular lens that it may be permanently attached.

Figure 8:
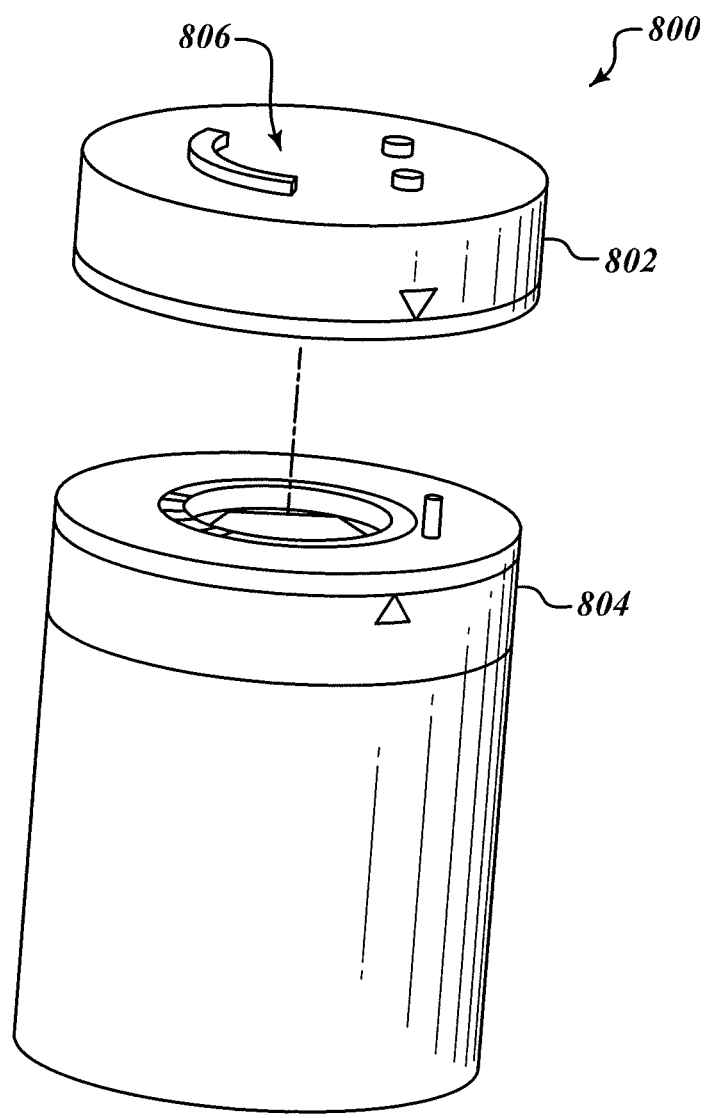
FIG. 8 shows a lens camera system in accordance with at least one of the various embodiments.
Figure 9:
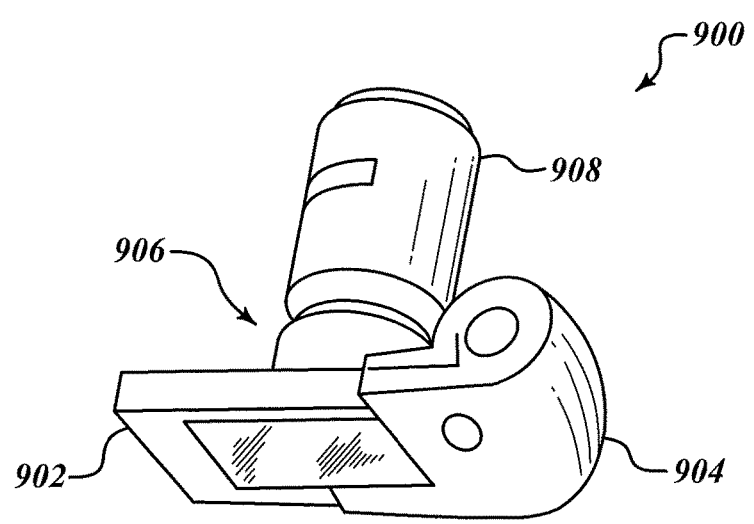
FIG. 9 shows a lens camera system that includes a lens camera and a mobile device, in accordance with at least one of the various embodiments.

FIG. 8 shows lens camera system 800 in accordance with at least one of the various embodiments. In at least one of the various embodiments, lens camera base 802 may be arranged to couple with interchangeable lens unit 804. In at least one of the various embodiments, lens camera 802 may be arranged to include a mount, such as, mount 806, for attaching lens camera 802 to other accessories, such as, grips, battery packs, mobile telephone docks, or the like, or combination thereof. Further, in at least one of the various embodiments, lens camera 802 may be arranged to conform to one or more lens mount standards, such as, micro-four-thirds lens mounts (Micro 4/3), or the like. FIG. 9 shows lens camera system 900 that include a lens camera and a mobile device, in accordance with at least one of the various embodiments. In at least one of the various embodiments, lens camera may be arranged to couple with mobile devices (e.g., smart phones). In at least one of the various embodiments, the lens camera may communicate with the mobile device using one or more dock connectors integral to the mobile device, near field communication, Bluetooth, Wi-Fi (e.g., 802.11a-n), or the like, or combination thereof. In at least one of the various embodiments, a host device, such as, mobile device 902 may be coupled with grip assembly 904. In at least one of the various embodiments, grip assembly 904 may include a dock connector port compatible with mobile device 902. Lens camera 906 may be coupled to grip assembly 904. Lens 908 may be an interchangeable lens for a standard format (e.g., Micro 4/3) that may be coupled to lens camera 906 using a standard format bayonet-style lens mount.

Figure 10:
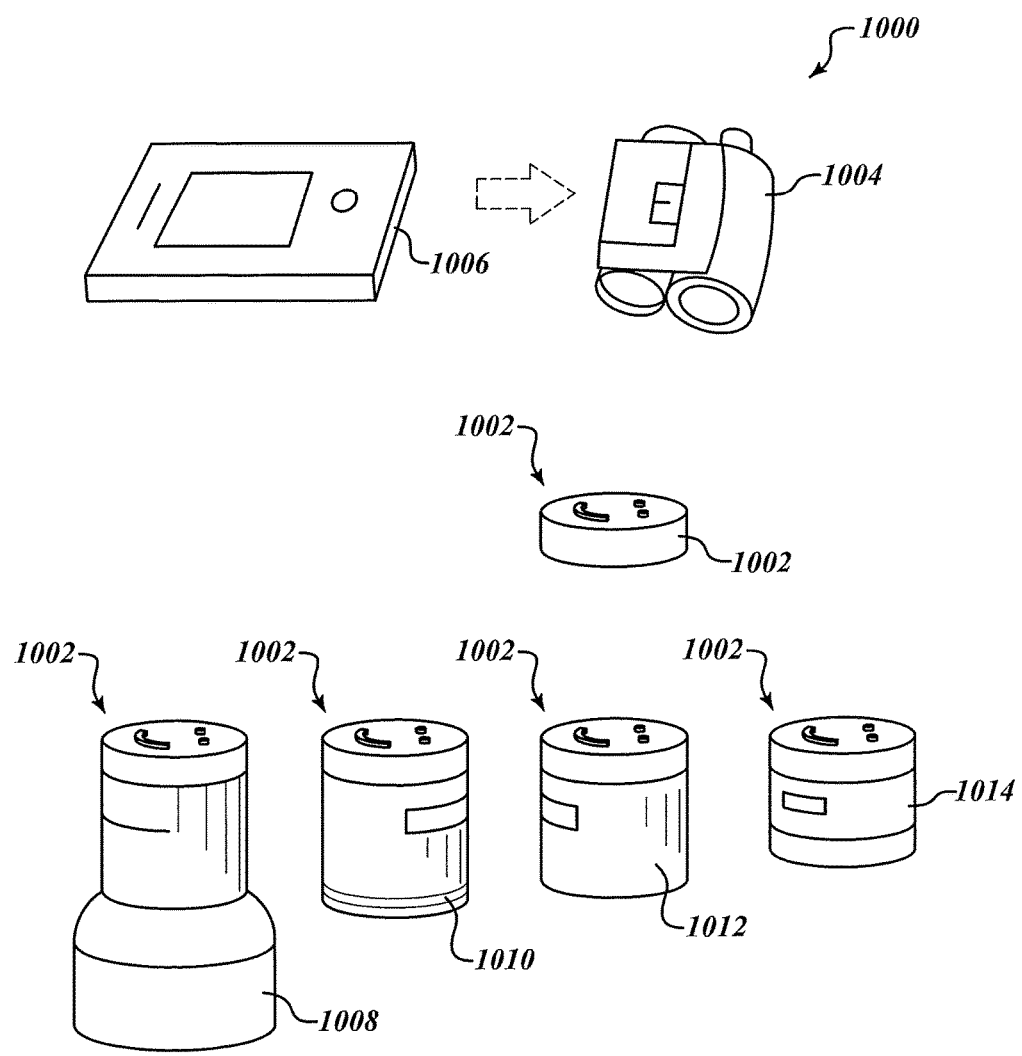
FIG. 10 shows a lens camera system organized into components in accordance with at least one of the various embodiments.

FIG. 10 shows lens camera system 1000 organized into components in accordance with at least one of the various embodiments. In at least one of the various embodiments, lens camera 1002 may represent a lens camera absent mounted lens and detached from a host device. Grip assembly 1004 represents an embodiment of a lens camera grip assembly accessories that is separate from lens camera 1002 and host device 1006. In at least one of the various embodiments, host device 1006 may be coupled with grip 1004 by sliding host device 1006 into grip 1004 as shown. In at least one of the various embodiments, various interchangeable lens, such as interchangeable lens 1008-1014 may be compatible with a lens camera. Interchangeable lens 1008-1014 are represented as being mounted on a lens camera, such as, lens camera 1002.

Figure 11:
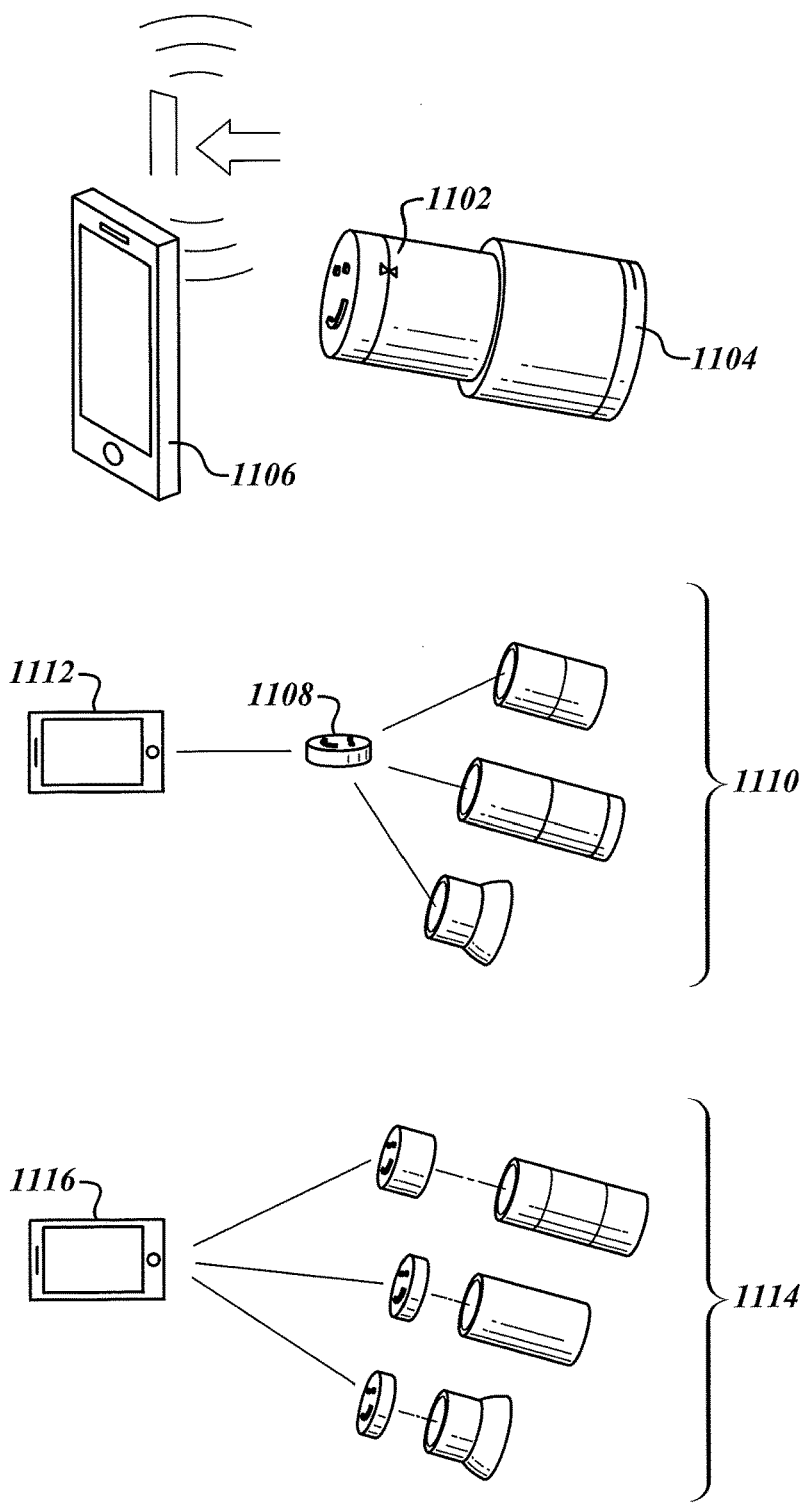
FIG. 11 illustrates various lens camera system configurations that are in accordance with at least one of the various embodiments.

FIG. 11 illustrates various lens camera system configurations that are in accordance with at least one of the various embodiments. In at least one of the various embodiments, users may couple lens camera 1102 with interchangeable lens 1104 for use with host device 1106. Alternatively, in at least one of the various embodiments, a user may employ a single lens camera, such as, lens camera 1108 with plurality of interchangeable lenses, such as, interchangeable lenses 1110. Accordingly, the user may select among the plurality of interchangeable lens and attached them as needed to lens camera 1108.

In at least one of the various embodiments, since lens camera 1108 includes a standard lens mount, interchangeable lenses 1110 may be coupled with lens camera 1108 as needed. Further, in at least one of the various embodiments, a user may acquire a lens camera for each interchangeable lenses 1114 for use with a host device such as host device 1116.

Figure 12:
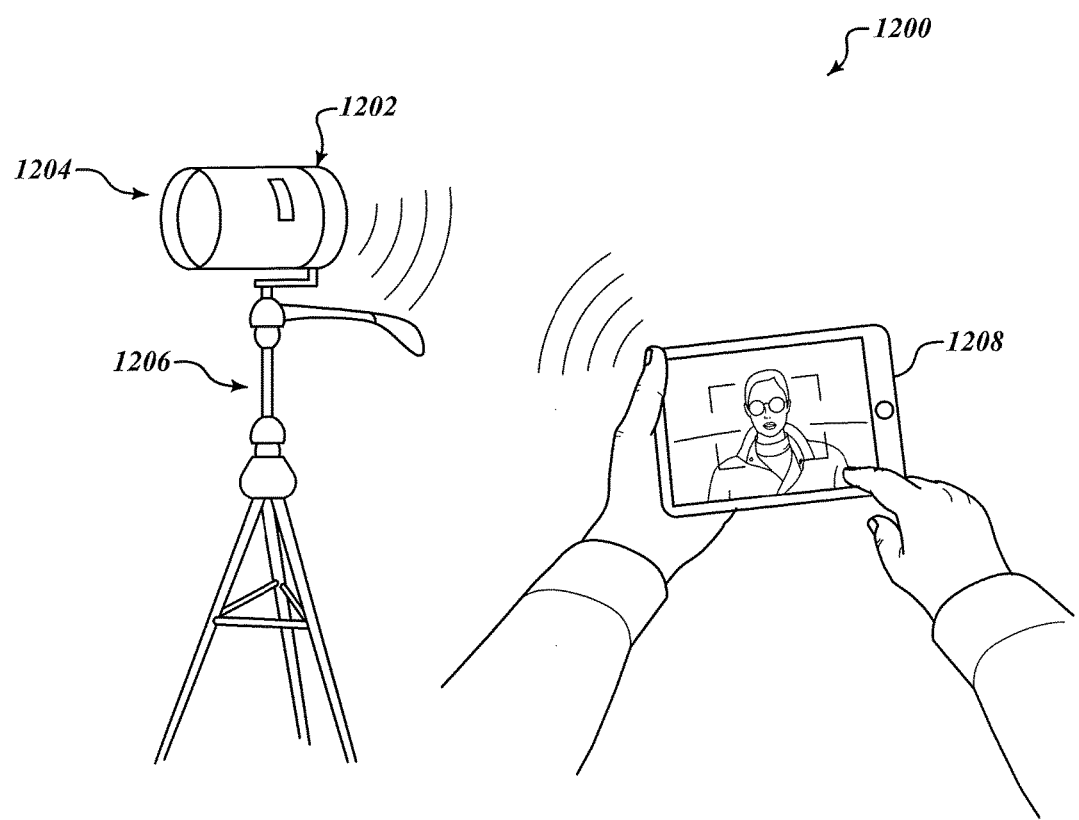
FIG. 12 illustrates a lens camera system for remote operation of a lens camera in accordance with at least one of the various embodiments.

FIG. 12 illustrates lens camera system 1200 for remote operation of a lens camera in accordance with at least one of the various embodiments. In at least one of the various embodiments, a stand-alone lens camera, such as, lens camera 1202 may be coupled with interchangeable lens 1204. Further, in at least one of the various embodiments, lens camera 1202 may be arranged to include tripod mount enabling tripod 1206 to be employed to support lens camera separate from a user. In at least one of the various embodiments, using one or more wired or wireless networking communication methods, host device 1208, may be arranged to communicate with lens camera 1202. In at least one of the various embodiments, host device 1208 may be arranged to enable a user to control lens camera 1202 as well as view the scene that observed by lens camera 1202. In at least one of the various embodiments, host device 1208 may include one or more lens camera applications, such as, lens camera application 221.

Figure 13:
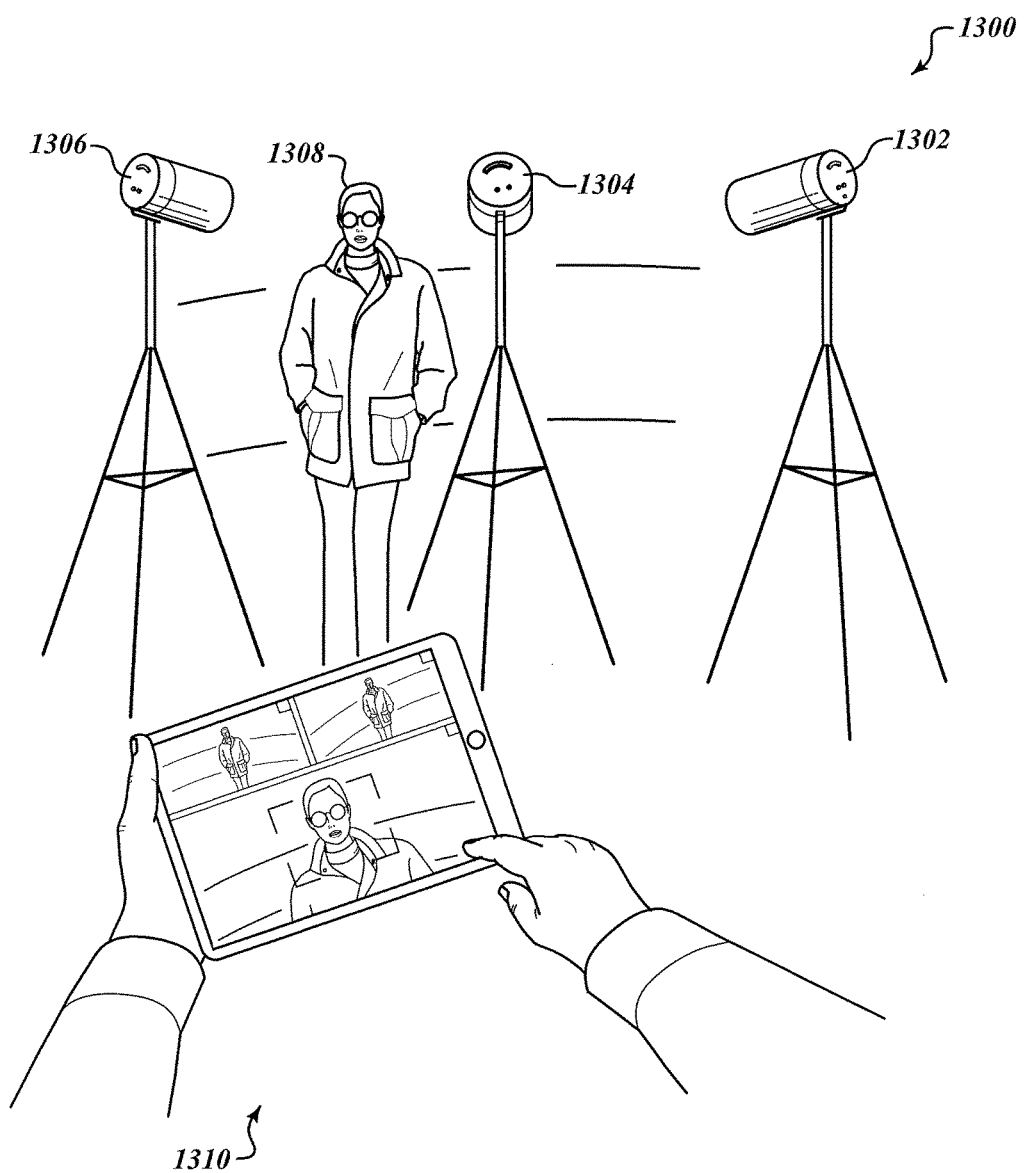
FIG. 13 shows a lens camera system configured to generate multiple images of the same subject matter in accordance with at least one of the various embodiments.

FIG. 13 shows lens camera system 1300 configured to generate multiple images of the same subject matter in accordance with at least one of the various embodiments. In at least one of the various embodiments, multiple lens cameras, such as, lens camera 1302, lens camera 1304, or lens camera 1306, may be arrayed around a single subject, such as, subject 1308. Furthermore, in at least one of the various embodiments, a single host device, such as, as host device 1310 may be arranged and/or configured to communicate with a plurality of lens cameras, such as, lens camera 1302, lens camera 1304, or lens camera 1306 at the same time. (See, at least, FIG. 29 and accompanying description.) Applications running on host device 1310, such as, lens camera application 221 may be arranged to simultaneously display one or more images and/or video from each of the lens cameras. Further, in at least one of the various embodiments, lens camera application 221 running on host device 1310 may be arranged for the user to communicate control messages to the one or more individual lens cameras. For example, in at least one of the various embodiments, a user may employ host device 1310 to adjust the focus on lens camera 1306, independent of lens camera 1304 or lens camera 1302.

Figure 14:
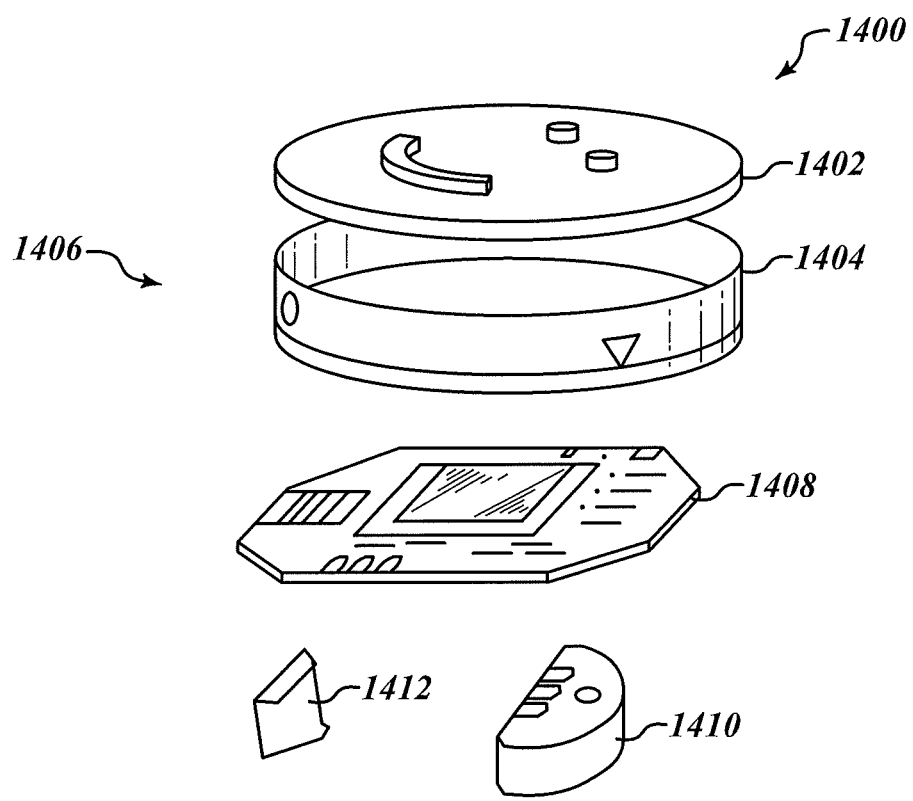
FIG. 14 shows a summary exploded view of a lens camera in accordance with at least one of the various embodiments.

FIG. 14 shows an overview exploded view of lens camera 1400 that is in accordance with at least one of the various embodiments. In at least one of the various embodiments, interchangeable lens mount 1402 may be coupled with lens camera body 1404. In at least one of the various embodiments, lens camera body 1404 may be arranged to include tripod connector 1406 for attaching lens camera 1400 to a tripod. In at least one of the various embodiments, a circuit board, such as, circuit board 1408, may be arranged to include the various circuit and components for performing the operations of a lens camera. For example, see, FIG. 4, lens camera 400 and FIG. 5 image processor 500. In at least one of the various embodiments, battery pack 1410 may be employed for providing a power source other than the host device. And, in at least one of the various embodiments, a data storage facility, such as, micro SD card adaptor 1412 may be used to enable a user to store image data locally as well as on the host device. One of ordinary skill in the art will appreciate that lens camera 1400 is a non-limiting example at least sufficient to teach the claimed innovations and that other contemplated embodiments may have more or fewer components than depicted herein.

Figure 15:
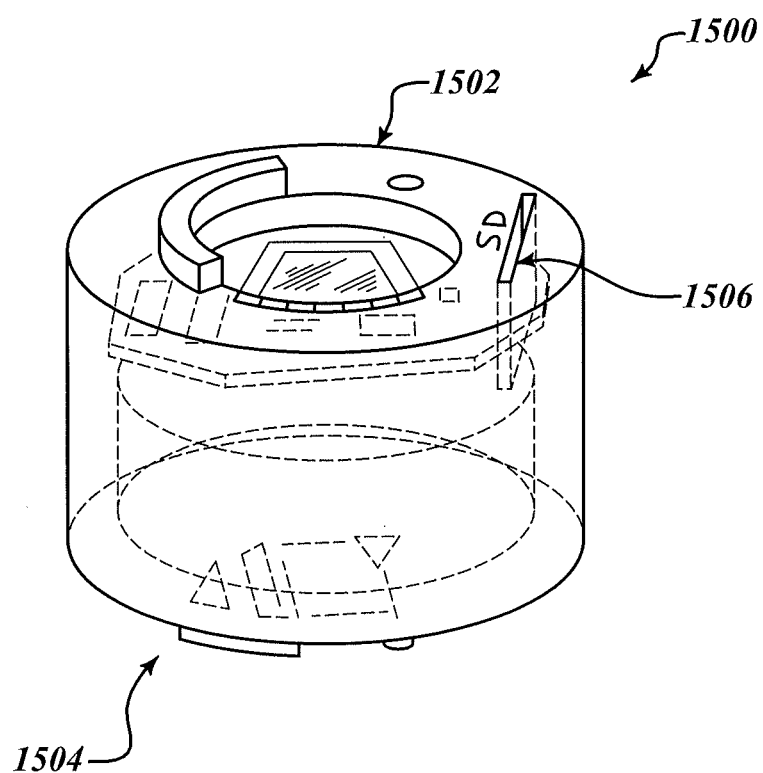
FIG. 15 illustrates a lens camera further showing a lens mount that is in accordance with at least one of the various embodiments.

FIG. 15 illustrates lens camera 1500 further showing a lens mount that is in accordance with at least one of the various embodiments. In at least one of the various embodiments, lens camera 1500 may be arranged In at least one of the various embodiments, a lens camera may be arranged to include an interchangeable lens mount, such as, lens mount 1502. As discussed above, lens mount 1502 may be arranged to be compatible with one of the various camera manufactures standard lens mount format. Accordingly, in at least one of the various embodiments, various interchangeable lenses may be attached to a lens camera such as lens camera 1500.

Also, in at least one of the various embodiments, lens camera 1500 may include a lens camera mount, such as, lens camera mount 1504, for attaching lens camera 1500 to one or more lens camera accessories and/or attachments, for coupling with host devices, tripods, grip accessories, or the like. In at least one of the various embodiments, lens camera 1500 may include one or more memory card slots, such as, memory slot 1506, for use with one or more memory cards.

Figure 16:
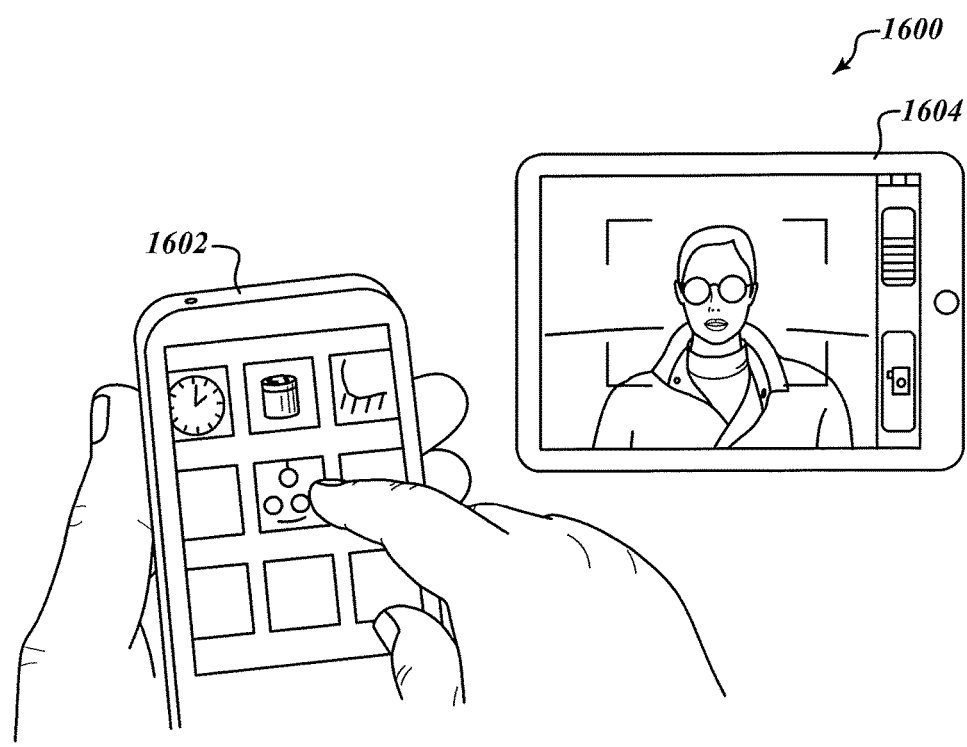
FIG. 16 illustrates an imaging application for operating one or more lens cameras in accordance with at least one of the various embodiments.

FIG. 16 illustrates lens camera application 1600 for operating one or more lens cameras in accordance with at least one of the various embodiments. In at least one of the various embodiments, applications, for controlling the lens cameras may be installed the various host devices. (See, lens camera application 221.) Also, in at least one of the various embodiments, lens camera application 1600 may be arranged to perform image processing operations. In at least one of the various embodiments, standard developer toolkits as well as standard installation and/or updating facilities (e.g., online application stores) may be employed to install and/or update lens camera applications onto host devices. Accordingly, in at least one of the various embodiments, users may employ familiar host device user interfaces to launch lens camera application, such as, application launcher 1602. After a lens camera application a user may be enabled to manipulate the lens camera and captured image data in full-screen view 1604 directly from the host device.

Since, in at least one of the various embodiments, the bulk of the image processing for a lens camera may be delegated to its host device, the hardware on a lens camera may be kept to a bare minimum. Also, in at least one of the various embodiments, since the user may be enabled to employ the high quality view-screen and user interface of the host device for operating the lens camera, the lens camera hardware and firmware may be simplified, since the user interface for interacting with the lens cameras may be handled by the lens camera application operative on the host devices.

Figure 17:
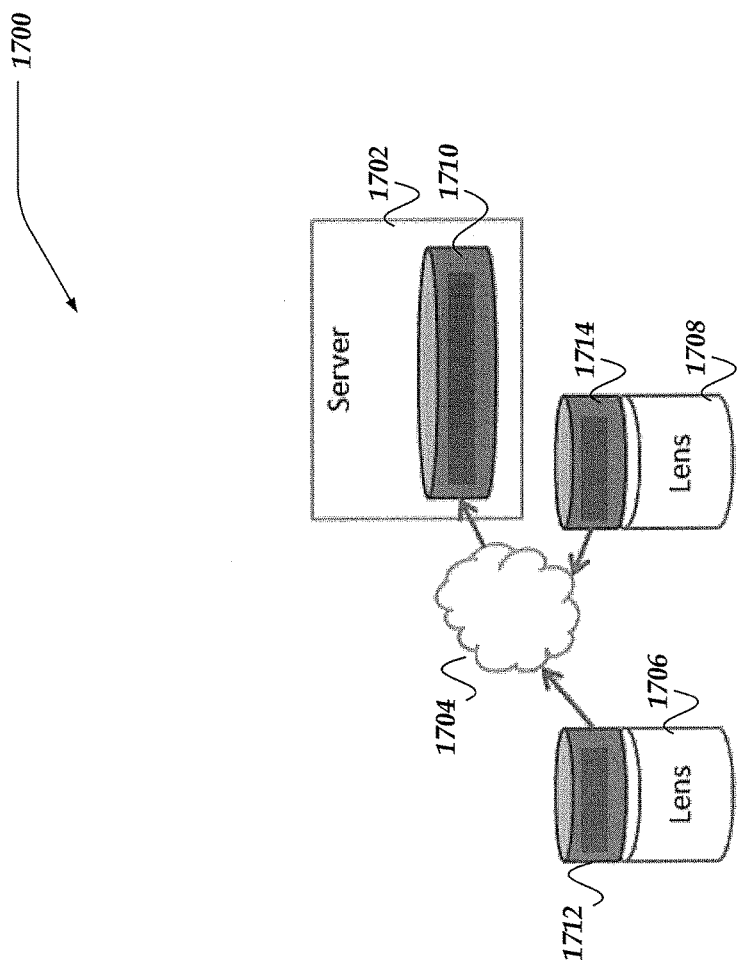
FIG. 17 illustrates a system for enabling the distribution of configuration information to lens cameras in accordance with at least one of the various embodiments.

FIG. 17 illustrates system 1700 for enabling the distribution of configuration information to lens cameras in accordance with at least one of the various embodiments. In at least one of the various embodiments, a server computer, such as, server 1702 may include one or more lens databases that include configuration information associated with one or more lens. In at least one of the various embodiments, server 1702 may be implemented by one or more network computers, such as network computer 300. In at least one of the various embodiments, Camera Information Server computer 112 may be arranged to perform some or all of the actions of server 1702.

In at least one of the various embodiments, server 1702 may be arranged to communicate over network 1704 to one or more lens cameras, such as, lens camera 1712 that may be coupled with interchangeable lens 1706 and lens camera 1714 that may be coupled with interchangeable lens 1708. In at least one of the various embodiments, lens camera applications operative on the host device may be arranged to enable a user to select if configuration information included in the lens calibration database 1710 on server 1702 may be installed and/or activated. Also, in at least one of the various embodiments, server 1702 and/or the host device applications may be arranged to automatically update and/or install software for particular applications without interaction by the user. Generally, in at least one of the various embodiments, maintenance updates may be installed automatically, while user selected configuration information for particular lenses may be determined and installed by a user.

In at least one of the various embodiments, network 1704 may be similar to network 110 and or wireless network 108. Also, in at least one of the various embodiments, the network communication between lens camera 1712 and lens camera 1714 and server 1702 may be facilitated by a lens camera application operative on a host device (not shown). In at least one of the various embodiments, lens camera 1712 and/or lens camera 1712 may be arranged to include an integral network transceiver for communicating with server 1702 independent of a host device. Further, in at least one of the various embodiments, the actions of server 1702 may be performed by a camera information server, such as, camera information server computer 112.

Figure 18:
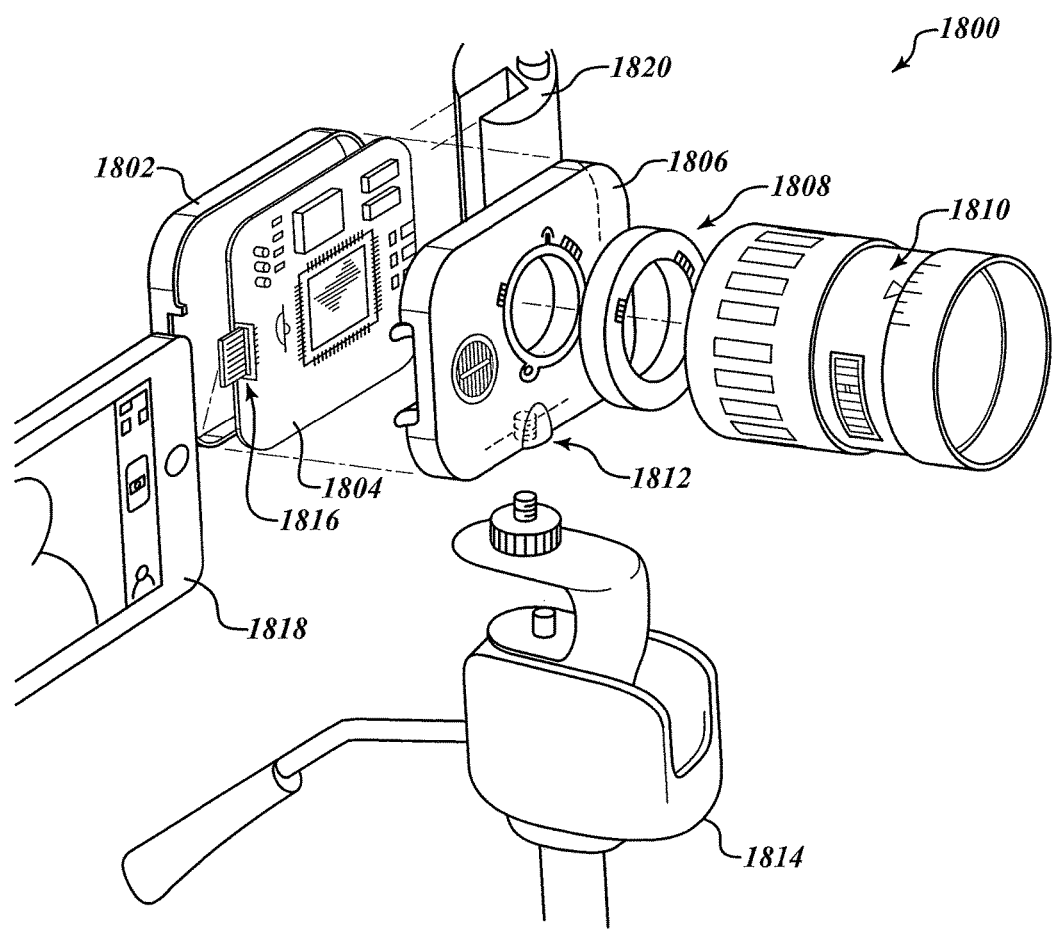
FIG. 18 illustrates a lens camera system that may be arranged to couple with a mobile device in accordance with at least one of the various embodiments.

FIG. 18 illustrates lens camera system 1800 that may be arranged to couple with a mobile device in accordance with at least one of the various embodiments. In at least one of the various embodiments, lens camera system 1800 may include back cover 1802; circuit board 1804; front cover 1806; or the like. Also, in at least one of the various embodiments, lens mount 1808 may be included for interfacing with one or more interchangeable lenses. In some embodiments lens mount 1808 may be interchangeable enabling different/various styles of lens mounts to be supported.

In at least one of the various embodiments, lens camera system 1800 may also include one or more interchangeable lenses, such as, interchangeable lens 1810. In some embodiments interchangeable lens 1810 may be a lens compatible with one or more standard lens formats (e.g., Micro 4/3, or the like). In some embodiments, interchangeable lens 1810 attaches to lens mount 1808 using standard mounting system and lens mount 1808 attaches to lens camera front cover 1806 using a lens camera mount. Accordingly, in at least one of the various embodiments, the lens camera front cover may have a mounting form factor that may be independent of the various lens mount standards offered and/or support by different camera and/or lens manufacturers. In at least one of the various embodiments, lens mount 1808 may include control surfaces that enable and/or support electronic control and communication with interchangeable lens 1810 in accordance with a lens control standard protocol supported by interchangeable lens 1808.

In at least one of the various embodiments, tripod connector 1812 may be included in lens camera front cover 1806. Accordingly, in at least one of the various embodiments, tripod connection 1812 may enable tripod 1814 to be includes as part of lens camera system 1800.

In at least one of the various embodiments, host device connector 1816 may be included and/or attached to circuit board 1804. Host device connector may be compatible with one or more data connection/connector standards that may be included on one or more various host devices. In at least one of the various embodiments, control messages, image data, power, control messages, or the like, may be communicated between the host device and the lens camera comprising circuit board 1804.

In at least one of the various embodiments, host device 1818 may be a host device, such as a mobile computer, mobile telephone, digital tablet, "smart phone", or the like. In this non-limiting example, host device 1818 is a smart phone that may be coupled with the lens camera system via host device connector 1816.

Also, in at least one of the various embodiments, lens camera system 1800 may include grip accessory 1820 that may enable improved grip and/or balance for a user. Also, in at least one of the various embodiments, grip accessory 1820 may include additional power storage, internal memory for storing image data, radio transceivers for wireless communication (e.g., Wi-Fi, Bluetooth, or the like), slots for memory cards, or the like.

One of ordinary skill in the art will appreciate that lens camera system 1800 is a non-limiting example at least sufficient to teach the claimed innovations and that other contemplated embodiments may have more or fewer components than depicted herein.

Figure 19A:
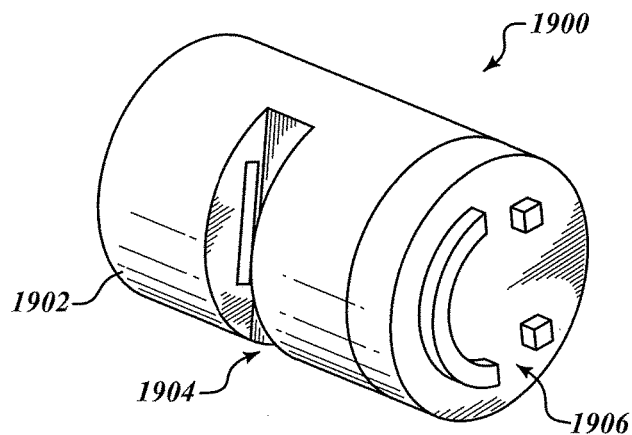
FIGS. 19A-19C illustrate views of a lens camera arranged for coupling with a mobile device in accordance with at least one of the various embodiments.
Figure 19B:
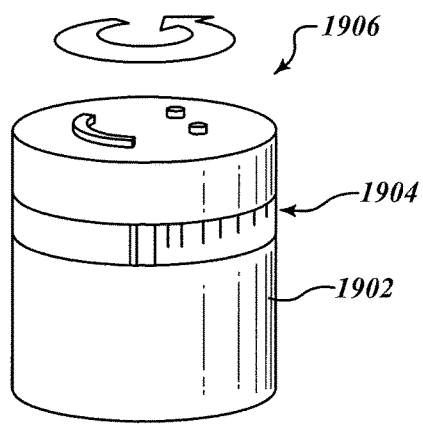
Figure 19C:
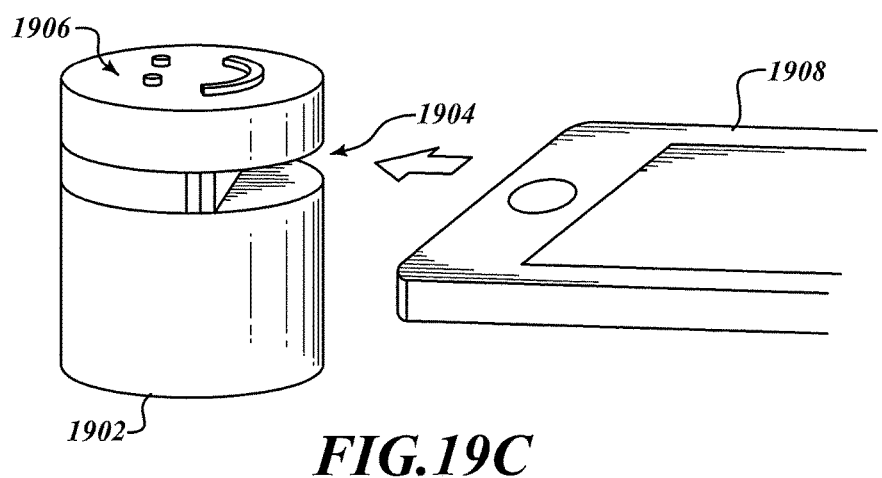

FIGS. 19A-19C illustrate views of lens camera 1900 arranged for coupling with a mobile computer in accordance with at least one of the various embodiments. In at least one of the various embodiments, lens camera body 1902 may be arranged into a cylindrical housing comprised of metal, plastic, or the like, or combination thereof. In at least one of the various embodiments, lens camera body 1902 may include connector slot 1904 for attaching a mobile computer that may act as the host device for lens camera 1900. FIG. 19B shows an embodiment of lens camera 1900 where connector slot 1904 may include a protective cover that may be opened by rotating the cover with respect to lens camera body 1902. In at least one of the various embodiments, lens camera body 1902 may be arranged to include an internal pocket and/or slot for storing the protective cover if connector slot 1904 is open. Also, in at least one of the various embodiments, at one end of lens camera body 1902 there may be a lens camera mount, such as, lens camera mount 1906 for enabling the attachment of lens mounts and/or interchangeable lenses. In at least one of the various embodiments, the lens camera the slot included in a housing of the lens camera may be operative to grip the host device and/or hold it securely in place.

FIG. 19C shows mobile computer 1908 that may be a host device for lens camera 1900. In at least one of the various embodiments, mobile computer 1908 may slide into connector slot 1904 for coupling the lens camera 1900 with the host device using a data connector that is in connector slot 1904.

Figure 20A:
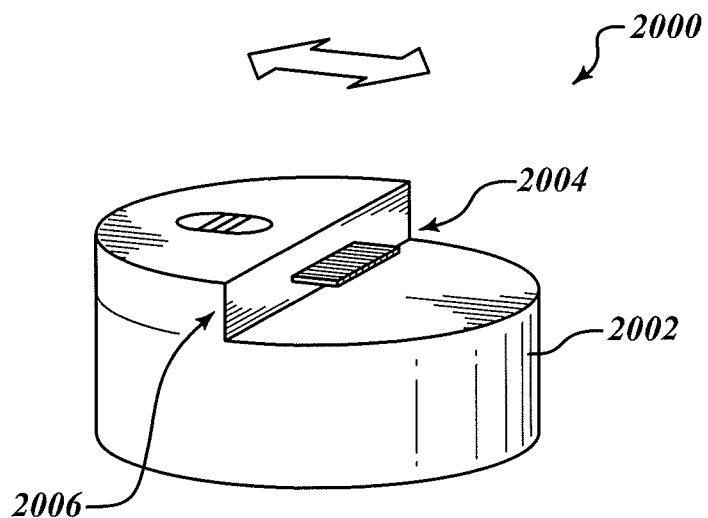
FIGS. 20A and 20B illustrate a lens camera arranged to include different host device connector covers in accordance with at least one of the various embodiments.
Figure 20B:
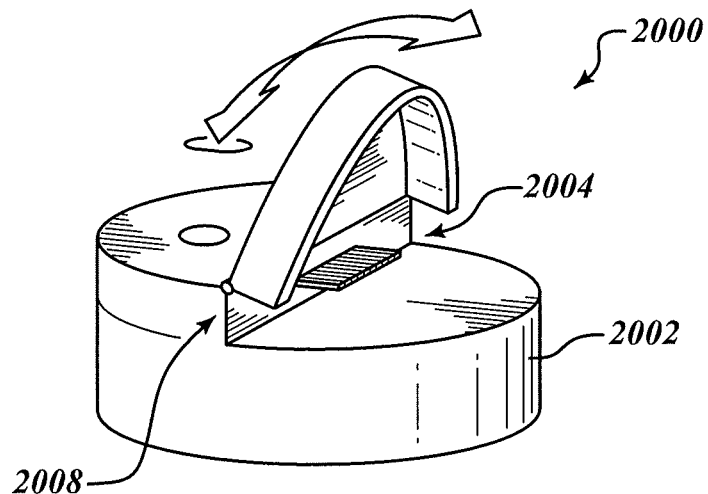

FIGS. 20A and 20B illustrate lens camera 2000 arranged to include different connector covers in accordance with at least one of the various embodiments. In at least one of the various embodiments, lens camera body 2002 may include connector 2004 for attaching the lens camera to a host device (not shown). In at least one of the various embodiments, to protect the connector the lens camera may be arranged to include protective cover, such as, protective cover 2006. In at least one of the various embodiments, a protective cover may be arranged to enable a user to access the connector by sliding the cover to expose connector 2004 to enable a host device to be physically mated with the lens camera. Likewise, a user may be enabled to slide protective cover 2006 the other direction for protecting connector 2004 if a host device (not shown) is detached. Alternatively, in at least one of the various embodiments, as illustrated in FIG. 20B, lens camera 2000 may be arranged to include protective cover 2008 that may be attached to lens camera body 2002 using a hinge that may enable the protective cover to be opened or closed by a user lifting the cover and rotating around the hinge. In at least one of the various embodiments, the protective cover may be arranged in the form of plate enabling the mechanism to grip the host device securely to lens camera. In some cases, the mechanism may be arranged to securely attached the lens camera to the host device absent a connector. In such cases, in at least one of the various embodiments, the lens camera may be arranged to communicate with the host device wirelessly.

Figure 21:
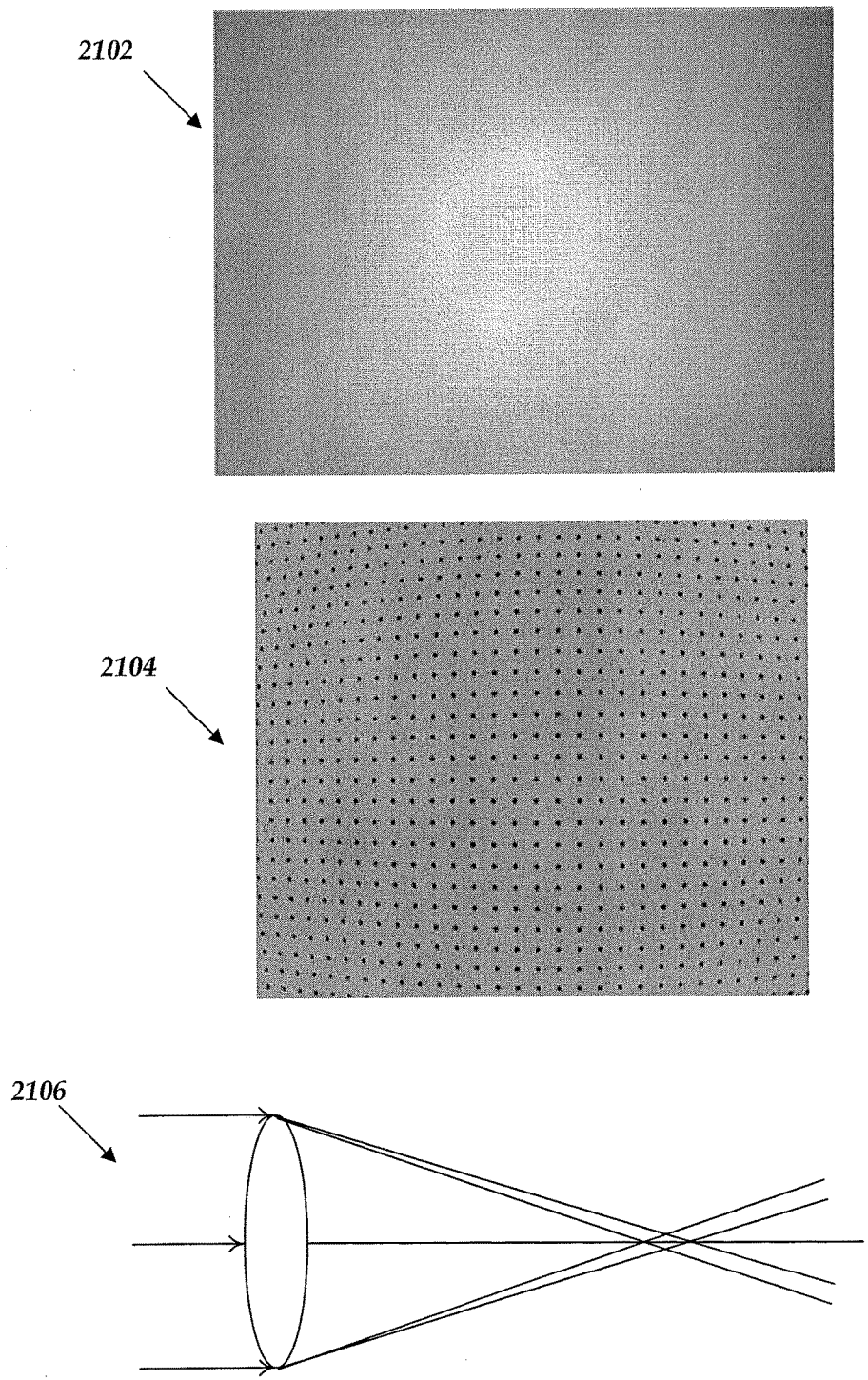
FIG. 21 illustrates three foams of lens aberrations that may be corrected by lens profiles in accordance with at least one of the various embodiments.

FIG. 21 illustrates three common forms of lens aberrations that may be corrected by lens profiles in accordance with at least one of the various embodiments. Three common forms of lens aberrations are vignetting 2102, barrel distortion 2104, or chromatic aberration 2106. One or more well-known techniques may be employed for determining information that may be used by an image processor to compensate for lens aberrations. In at least one of the various embodiments, lens aberrations vary depending on many factors, including lens type, manufacturer, materials, sensor characteristics, or the like, or combination thereof. Also, lenses having adjustable optical zoom levels may produce different lens aberrations depending on the operative optical zoom level. In some cases, manufacturing discrepancies in the manufacture of lenses and sensors may generate lens aberrations that may vary between different instances of lenses that otherwise appear to be identical.

In at least one of the various embodiments, optimal compensation for lens aberrations may vary depending on the application, such as, still photography, video, low-light, macro photography, indoor, outdoor, portraits, color temperature, or the like, or combination thereof. One of ordinary skill in the art will appreciate that the disclosed innovations anticipate that there may be additional lens and/or sensor aberrations that may be compensated by image processing to improve image quality. As such, correcting for more or fewer aberrations types is contemplated herein.

Figure 22:
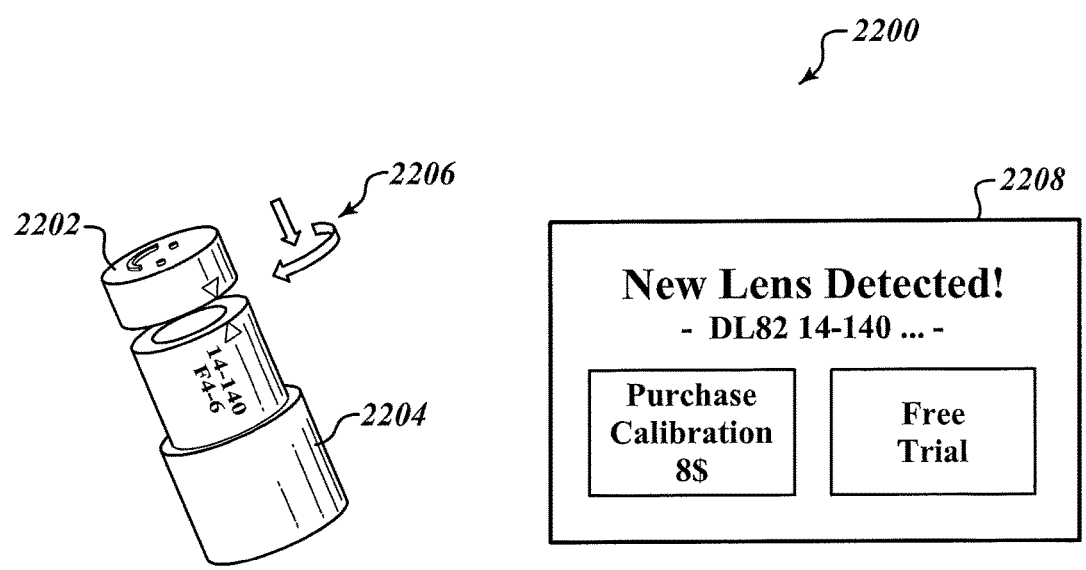
FIG. 22 illustrates a lens camera system arranged for providing lens profiles in accordance with at least one of the various embodiments.

FIG. 22 illustrates lens camera system 2200 arranged for providing lens profiles in accordance with at least one of the various embodiments. In at least one of the various embodiments, one or more lens profiles may be available for a given interchangeable lens. In at least one of the various embodiments, lens profiles may be comprised of configuration information that may be used for correcting and/or compensating for one or more lens aberrations. Accordingly, an application running on a host device may enable a user to purchase and/or download lens profiles that provide aberrations compensation information that may be targeted for a particular interchangeable lens and/or photographic application.

In at least one of the various embodiments, lens camera 2202 may be coupled with interchangeable lens 2204. Action 2206 represents a user attaching interchangeable lens 2204 to lens camera 2202. In at least one of the various embodiments, lens camera application 2208 may be an application, such as, lens camera application 221, running on a host device, such as, a tablet computer, laptop computer, mobile computer, smart phone, or the like. Also, in at least one of the various embodiments, lens camera application 2208 may be operative on a network computer that may be communicating with lens camera 2202 over a network using a connection enabled using Wi-Fi, Bluetooth, USB, Ethernet, or the like.

Accordingly, in at least one of the various embodiments, if interchangeable lens 2204 is attached to lens camera 2202, lens camera 2202 may signal the attachment by communicating with lens camera application 2208. In response the communication, lens camera application 2208 generate a user-interface that enables a user to select one or more available lens profiles associated with interchangeable lens 2204.

In at least one of the various embodiments, if a user selects a lens profile it may be downloaded to lens camera 2202 and/or the host device for use in processing image data generated by lens camera 2202 to compensate for lens aberrations the may be associated with interchangeable lens 2204.

In at least one of the various embodiments, lens camera application 2208 may be arranged to generated and/or navigate to an online application store that enables the user to purchase one or more lens profiles. Or, in at least one of the various embodiments, some or all of the lens profiles may be downloaded for free depending on a configuration.

Figure 23:
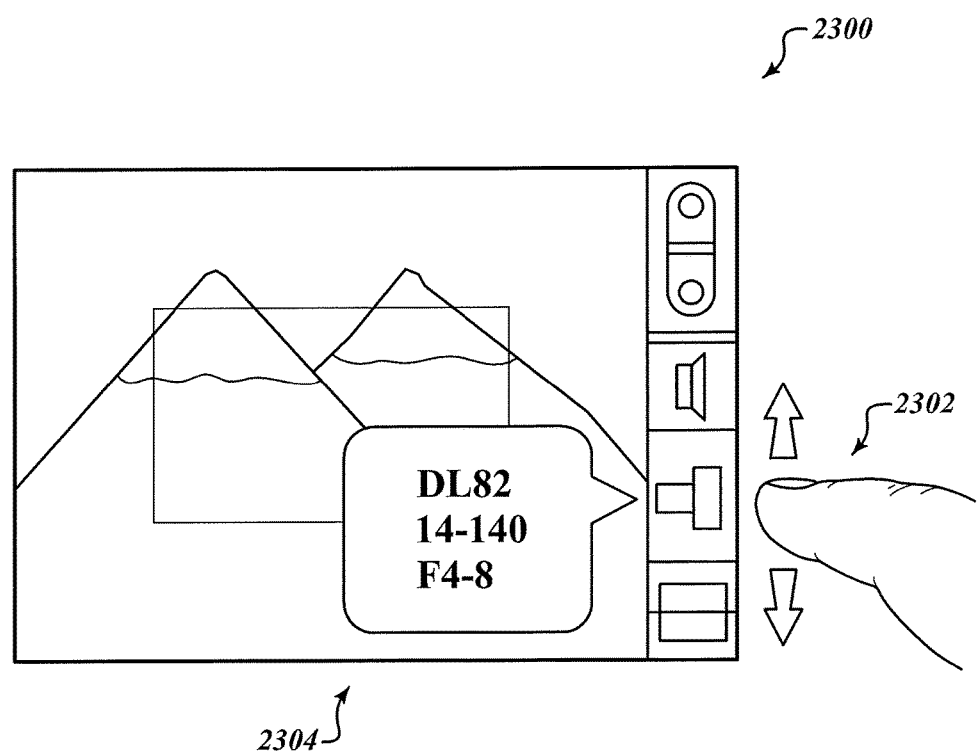
FIG. 23 shows a user-interface for enabling a user to select a lens profile in accordance with at least one of the various embodiments.

FIG. 23 shows user-interface 2300 for enabling a user to select a lens profile in accordance with at least one of the various embodiments. In at least one of the various embodiments, if a lens profile is available, user 2302 may select it using a user-interface controls that may be included as part of the lens camera application that is operative on the host device. In at least one of the various embodiments, details of the lens profiles installed and/or purchased may be displayed in window 2304 as user 2302 scrolls through the available lens profiles.

Figure 24:
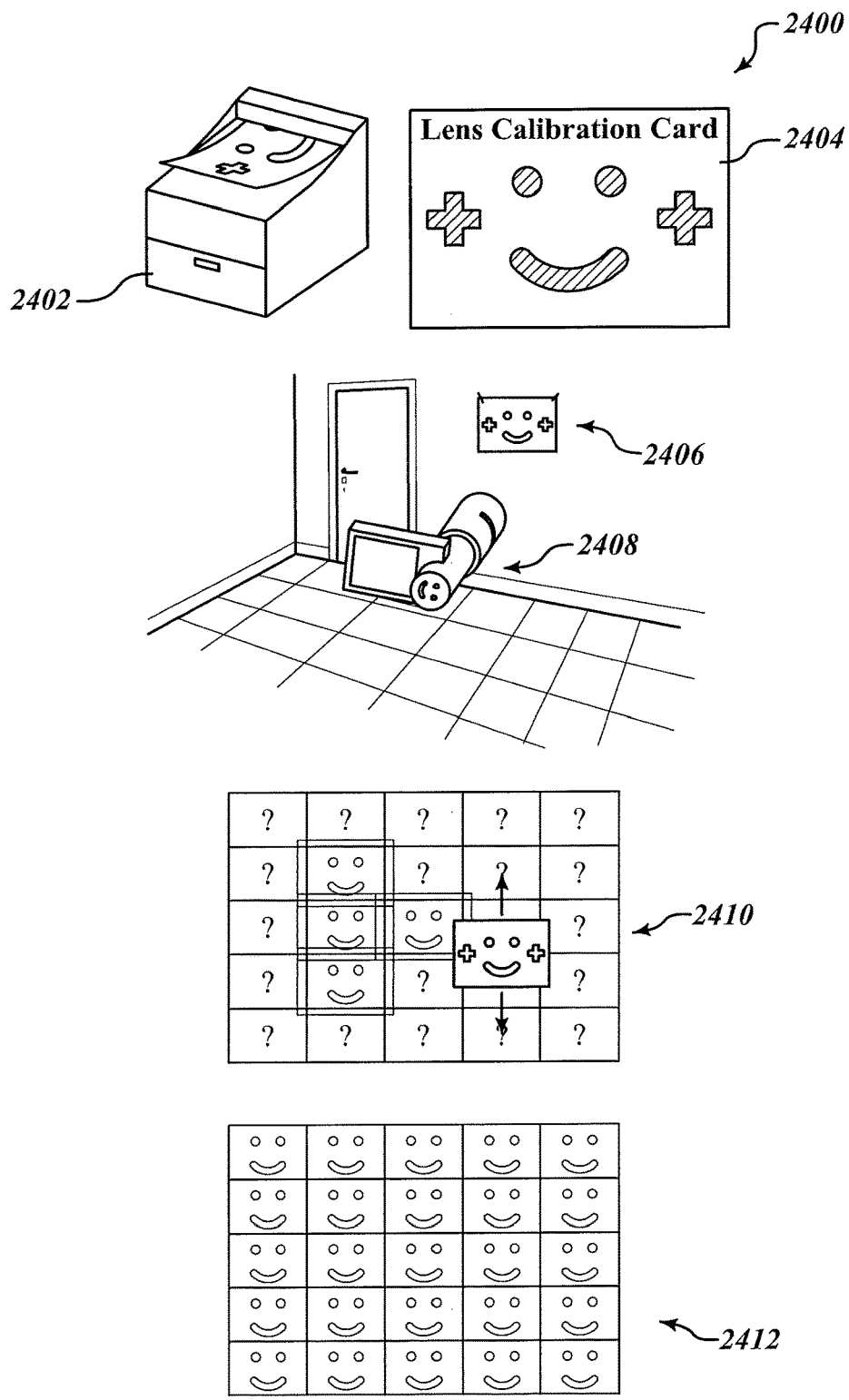
FIG. 24 illustrates a lens camera system that enables user directed lens profile generation in accordance with at least one of the various embodiments.

FIG. 24 illustrates lens camera system 2400 that enables user directed lens profile generation in accordance with at least one of the various embodiments. In at least one of the various embodiments, lens camera system 2400 may enable users to generate lens profiles based on calibration information that they collect themselves. These user generated lens profiles may be shared with other users and/or kept for personal use.

In at least one of the various embodiments, the user may print one or more calibration cards from a local printer, such as, printer 2402. In at least one of the various embodiments, the calibration cards may be printed from web pages, PDFs, or the like, that may be made available on a website. Further, in at least one of the various embodiments, calibration card information may be provided by lens camera application 221 or calibration application 220 enabling calibration card 2404 to be made available for printing directly from the host device, mobile computer, or smart phone using a printer, such as, a network printer, or the like. In at least one of the various embodiments, calibration card 2404 may be imprinted with one or more markings having predefined position and/or characteristics that may be used for determining calibration information that may be employed for generating lens profiles.

In at least one of the various embodiments, calibration card 2404 may be affixed to a flat surface, such as, a wall. Accordingly, in at least one of the various embodiments, affixed calibration card 2406 may then be imaged using a lens camera and coupled host device, such as, lens camera 2408.

In at least one of the various embodiments, a lens camera application operative on the host device, such as, lens camera application 2410, may be arranged to guide the user to collect multiple images of affixed calibration card 2406. In at least one of the various embodiments, multiple images of affixed calibration card 2406 may be advantageous if it takes more than one calibration card image to cover the entire view frame of the lens camera. For example, in at least one of the various embodiments, image 2412 is generated by a single calibration card where the user was directed to pan the lens camera up/down/left/right as seen in image 2410 (indicating that the user is moving the lens camera). Multiple images may be captured as the lens camera is moved by the user. Thus, continuing with this example, for each captured image the calibration card may be located in a different position within the field of view of the lens camera. If capturing is complete, the lens camera application may combine the different multiple images into a tiled image, such as image 2412. Alternatively, in at least one of the various embodiments, the lens camera application may provide the calibration images to a camera information server that may extract the calibration information from all the images—either by tiling them like image 2412, or the calibration information may be generated directly from the individual captured calibration images.

In at least one of the various embodiments, application 2410 may provide guidance to the user in form of a virtual grid that may be overlaid on the displayed preview view of the image. Accordingly, application 2410 may highlight an area of viewing frame that should be filled by the calibration card image. In at least one of the various embodiments, if application 2410 determines that sufficient data has been collected a lens profile may be generated based on the calibration card information.

In at least one of the various embodiments, application 2410 may be arranged to upload the calibration card information to a server, such as, as network computer 300, or the like. In at least one of the various embodiments, the server may employ an application, such as, calibration application 355, to compute the lens profile information based on the calibration information. Alternatively, in at least one of the various embodiments, the host device may be arranged to compute the lens profile information based on the calibration information. In any event, in at least one of the various embodiments, if a lens profile is generated it may be provided to the lens camera and/or the host device. In at least one of the various embodiments, the generated lens profiles may be made available to other users by making it downloaded from a website, in-application store, or the like, similar to lens profiles provided by lens/camera manufacturers.

Figure 25:
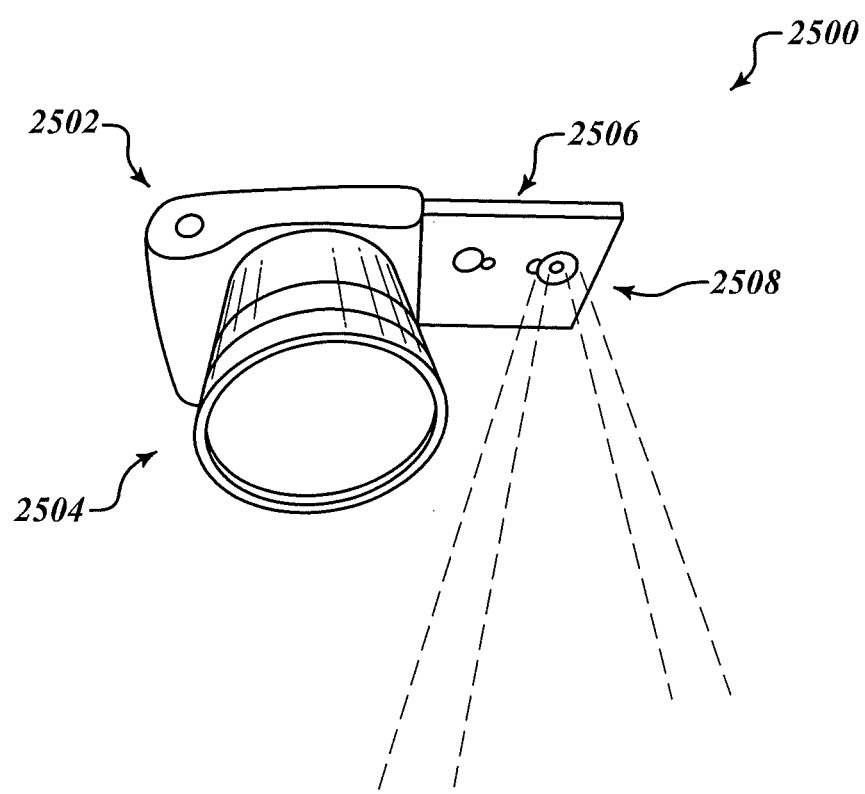
FIG. 25 illustrates a lens camera system that may be enabled for generating image data using multiple lens cameras in accordance with at least one of the various embodiments.

FIG. 25 illustrates lens camera system 2500 that may be enabled for generating image data using multiple imagers in accordance with at least one of the various embodiments. In at least one of the various embodiments, lens camera 2502 with attached interchangeable lens 2504 and host device 2506 may be enabled to generate enhanced imagery based on a combination of image data collected by lens camera 2502 and image data collected by an imager built in into host device 2506, such as, imager 2508. In at least one of the various embodiments, an application running on host device 2506 may be provided imaging data collected by both lens camera 2502 and images 2508. Accordingly, additional image processing may be performed, such as, generating three dimensional (3D) image data, light metering, stereo depth extraction, automatic focusing, image stabilization, background subtraction, high dynamic range image data, ghost image removal, or the like, or combination thereof.

In at least one of the various embodiments, two or more lens cameras may also be arranged and/or configured to provide image data to the same host device. Accordingly, in at least one of the various embodiments, additional image processing may be performed, such as, generating three dimensional (3D) image data, light metering, stereo depth extraction, automatic focusing, image stabilization, background subtraction, high dynamic range image data, ghost image removal, or the like, or combination thereof.

Figure 26A:
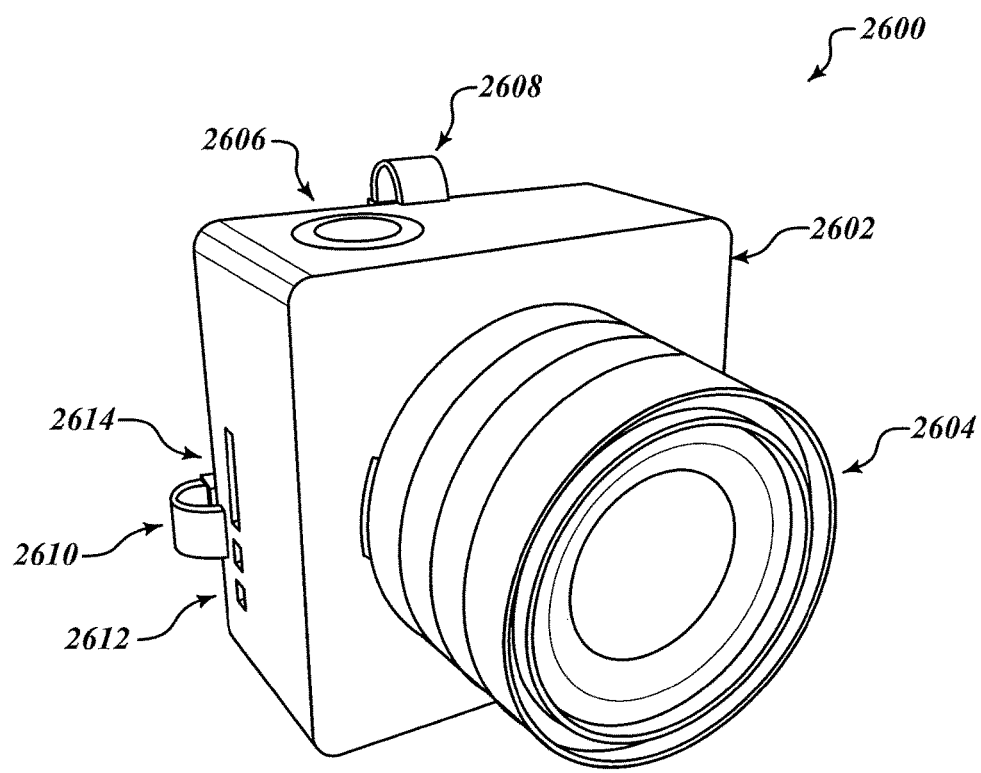
FIG. 26A-26B illustrates a lens camera system arranged in accordance with at least one of the various embodiments.
Figure 26B:
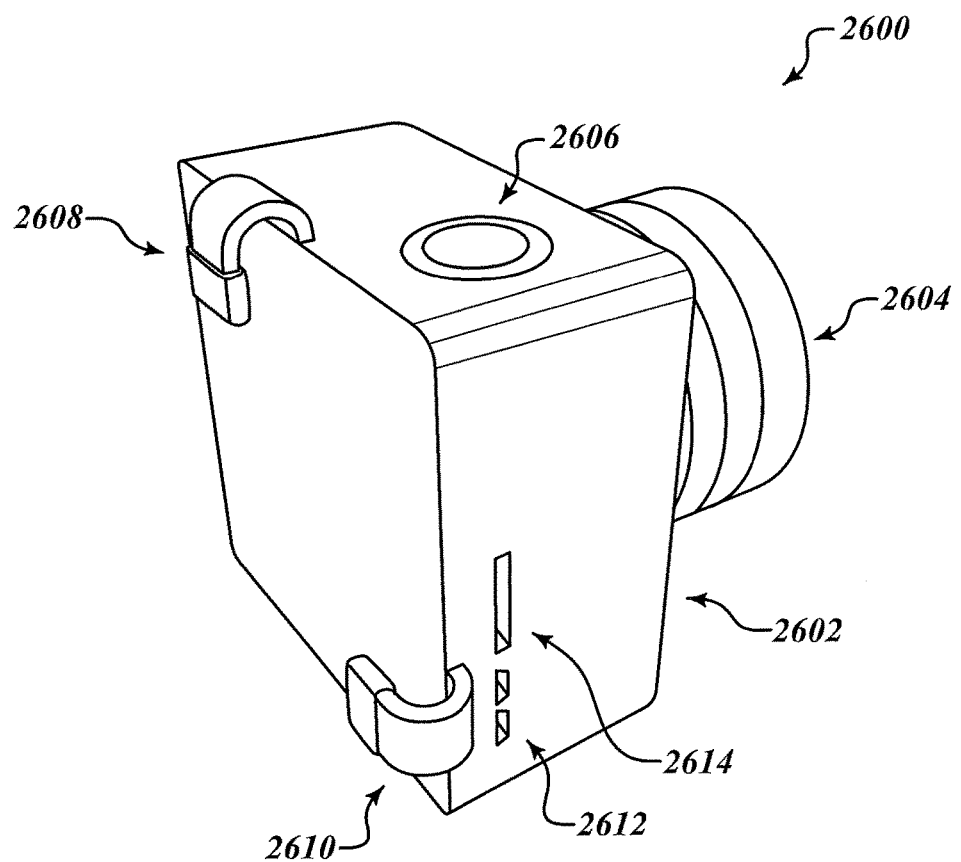

FIG. 26A-26B illustrates lens camera system 2600 arranged in accordance with at least one of the various embodiments. In at least one of the various embodiments, lens camera body 2602 may be arranged to be coupled with an interchangeable lens, such as, interchangeable lens 2604. Also, power button 2606 may be positioned on the top surface of lens camera body 2602.

In at least one of the various embodiments, mount 2608 and mount 2610 may be fixed to the back of lens camera body 2602 enabling one or more host devices to be attached. In at least one of the various embodiments, mounts, such as mount 2608 and 2610, may be arranged for attaching lens camera body 2602 to a host camera, mobile computer, smart-phone, MIL camera, tripods, or the like. Further, in at least one of the various embodiments, one or more power and/or cable connectors, such as, cable connectors 2612 may be included in lens camera body 2602. In at least one of the various embodiments, cable connectors 2612 may enable various data and/or control cables (e.g., USB, microUSB, Firewire, HDMI, micro HDMI, Thunderbolt, or the like), power adapters, battery chargers, or the like, to be connected to lens camera body 2602. Also, in at least one of the various embodiments, lens camera body 2602 may be arranged to include memory card slot 2614 enabling one or more memory cards to for storing information and/or image data.

Further, in at least one of the various embodiments, lens camera body 2602 may include one or more power supply systems. In at least one of the various embodiments, a rechargeable or non-rechargeable battery may be used to provide power. The power may also be provided by an external power source, such as an alternating current (AC) adapter or a powered docking cradle that supplements and/or recharges a battery. Further, in at least one of the various embodiments, such a power supply may be arranged to include an "over-sized" battery to provide a power source for the host device. Accordingly, in at least one of the various embodiments, the power supply included in lens camera body 2602 may be used to extend the operational battery life of the host device. As such, the power supply may be arranged to include one or more interfaces and/or connectors for providing power to a host device.

In at least one of the various embodiments, lens camera system 2600 may be arranged to include one or more radios for wirelessly communicating with host devices, a camera information server, other computers, or the like. See, FIG. 4 for addition discussion of communication components that may be included in lens camera system 2600.

In at least one of the various embodiments, lens camera body 2602 may be arranged into a shape that includes at least one flat surface that enables the lens camera to remain stable if it is placed on a surface separate from a host device.

For example, a lens camera body may be arranged into a square or rectangle shape as shown in FIG. 26A. In at least one of the various embodiments, the flat surface may enable the lens camera to remain stable and in the correct orientation if used for remote operation.

FIG. 26B illustrates lens camera system 2600 viewed from another angle.

Figure 27A:
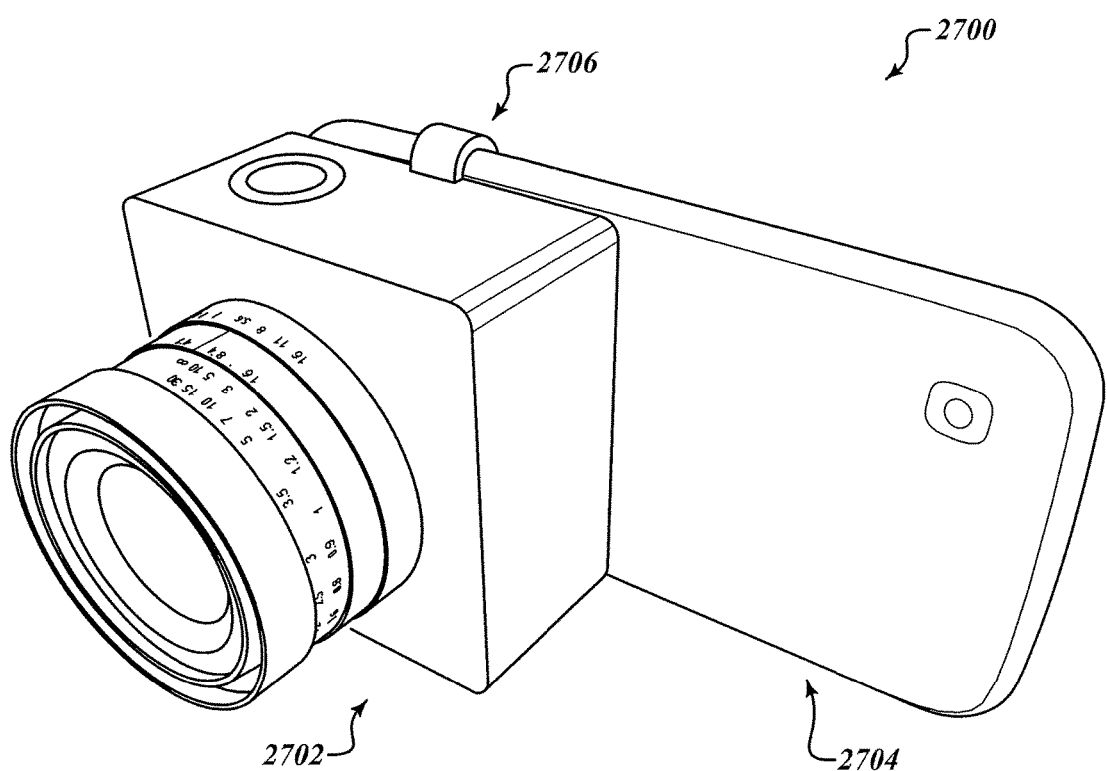
FIGS. 27A-27B illustrate a lens camera system coupled with a host device in accordance with at least one of the various embodiments.
Figure 27B:
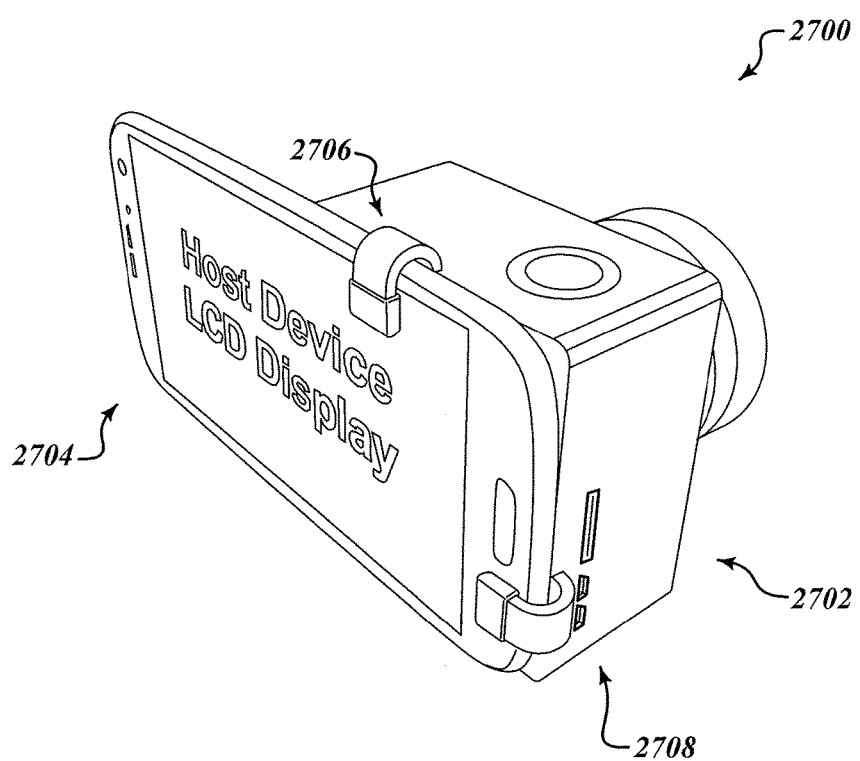

FIGS. 27A-27B illustrate lens camera system 2700 coupled with a host device in accordance with at least one of the various embodiments. In at least one of the various embodiments, lens camera 2702 may be coupled be a host device, such as, host device 2704, using one or more mounts, such as, mount 2706 and/or 2708 (not visible in FIG. 27A), as shown in the FIGS. 27A and 27B. In at least one of the various embodiments, lens camera 2702 may be enabled to communicate with host device 2704 using one or more communication components such as those discussed above.

Generalized Operations

The operation of certain aspects of the invention will now be described with respect to FIGS. 28-33. In at least one of various embodiments, processes 2800, 2900, 3000, 3100, 3200, 3300, and 3400 described in conjunction with FIGS. 28-34, respectively, may be implemented by and/or executed on a single network computer, such as network computer 300 of FIG. 3. In other embodiments, these processes or portions of these processes may be implemented by and/or executed on a plurality of network computers, such as network computer 300 of FIG. 3. Likewise, in at least one of the various embodiments, processes 2800, 2900, 3000, 3100, 3200, 3300, and 3400, or portions thereof, may be operative on one or more lens cameras, or host devices. However, embodiments are not so limited, and various combinations of network computers, host device, client computers, virtual machines, or the like may be utilized. Further, in at least one of the various embodiments, the processes described in conjunction with FIGS. 28-34 may be operative in systems such as those described in conjunction with FIGS. 1-27.

Figure 28:
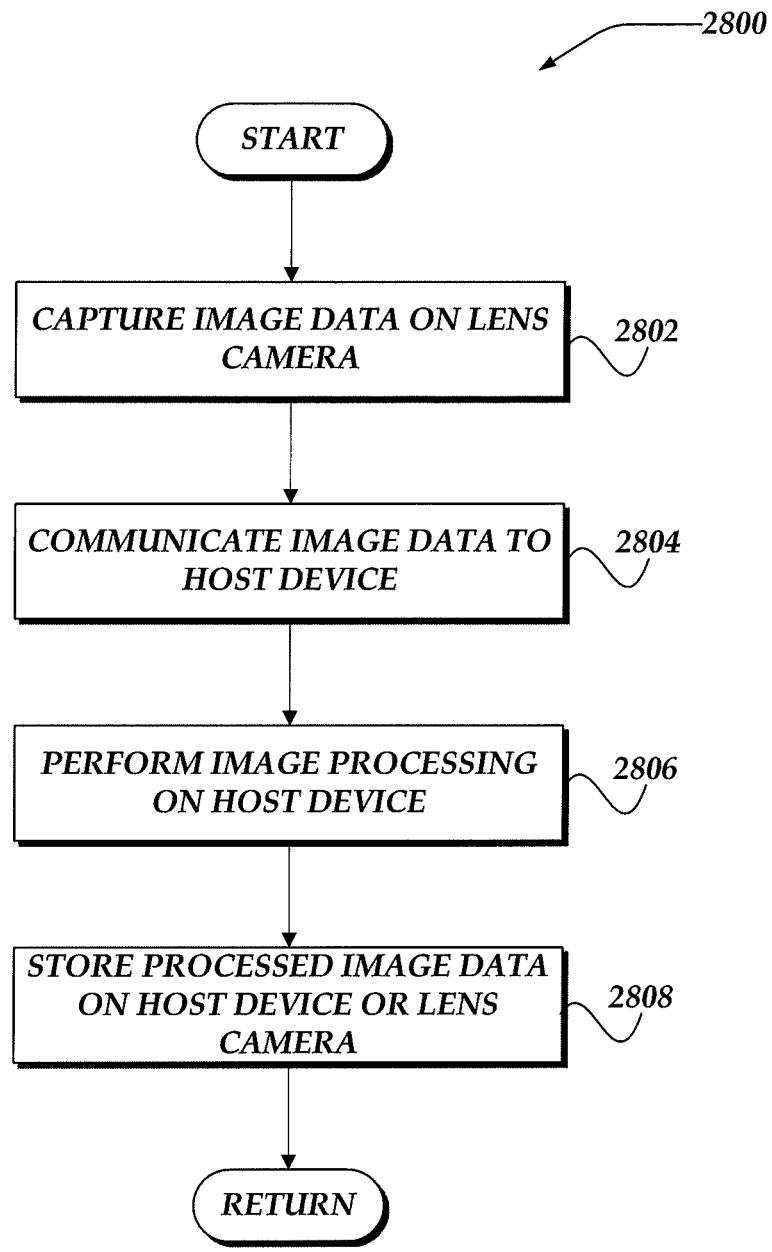
FIG. 28 shows an overview flowchart for a process for capturing image data in accordance with at least one of the various embodiments.

FIG. 28 shows an overview flowchart for process 2800 for capturing image data in accordance with at least one of the various embodiments. After a start block, at block 2802, in at least one of the various embodiments, image data may be captured by the lens camera. In at least one of the various embodiments, as described above, lens cameras may capture still or video image data. In at least one of the various embodiments, the lens camera may use an interchangeable lens attached using a standard lens mount. In at least one of the various embodiments, a host device coupled to lens camera may communicate control messages to the lens camera for controlling the features of the attached interchangeable lens.

In at least one of the various embodiments, user-interface elements on a lens camera application may enable a user to control focus, aperture, exposure, white balance, light metering, or the like, or combination thereof, from the host device.

In at least one of the various embodiments, lens cameras may be arranged to include one or more memory buffers for storing image data as it is captured. In some embodiments, the lens camera may be arranged to store image into a memory card coupled with the lens camera. Alternatively, in at least one of the various embodiments, lens cameras may have little or no buffer memory, in such cases, captured image data may be required to be stored on a host device, or other external memory storage.

In at least one of the various embodiments, a host device may be a digital camera, such as a MIL camera. In at least one of the various embodiments, a lens camera may couple with a digital by way of the electro-mechanical interface on the lens mount of the digital camera. Accordingly, in at least one of the various embodiments, the lens camera may have a lens mount on one side for attaching to the digital camera and a lens mount on the other end for attaching to interchangeable lens. In at least one of the embodiments, the digital camera controls may be employed for control the lens camera. For example, if a user pushes the shutter button on the digital camera, the coupled lens camera may receive the trigger command through the electro-mechanical interface in the lens mounts.

At block 2804, in at least one of the various embodiments, the captured image data may be communicated to a host device. In at least one of the various embodiments, a lens camera may be coupled to a host device using wired and/or wireless technology. Accordingly, depending on the communication method, the lens camera may communicate the image data to the hosting device. Also, in at least one of the various embodiments, the lens camera may include internal memory and/or a memory card slot that may be used for storing image data.

In at least one of the various embodiments, the image data may be compressed using one or more well-known image compression methods to reduce the time it may take to transfer the images from the lens camera to the host device.

In at least one of the various embodiments, a portion of the image data may be communicated to the lens camera to enable the lens camera application to generate preview images/information rather than communicating all of the captured image data.

At block 2806, in at least one of the various embodiments, the host device may perform image processing on the image data. In at least one of the various embodiments, image data provided by a lens camera may be further processed on the host device. In at least one of the various embodiments, processing may include, correcting for lens aberrations, color correction, motion stabilization, high dynamic range imaging, noise reduction, ghost removal, image alignment, or the like, or combination thereof.

In at least one of the various embodiments, by employ the processing resources of the host device for performing the image processing, the components of the lens camera may be simplified. For example, since the bulk of the image processing may be done by the host device, the lens camera may omit expensive image signal processor system. Likewise, the user may be enabled to interact with the lens camera using the view screen of the host device, the lens camera may be constructed without expensive interface components (e.g., high-quality LCD view screens, touch interfaces, complex UI software/firmware, or the like). Furthermore, in at least one of the various embodiments, by incorporate most of the lens camera functionality in the lens camera application, updates to the lens camera application for adding new features are fixing defects may be accomplished easily using software only updates. For example, in at least one of the various embodiments, a user may purchase additional image processing functionality from an online store and download to a host device. Accordingly, in this example, the user may perform a software download to upgrade to features of the lens camera rather than having to update hardware and/or firmware on the lens camera itself.

At block 2808, in at least one of the various embodiments, the processed image data may be stored by the host device or lens camera. After the image data has been processed, the lens camera application may be arranged to store the image data in various locations, such as, in local memory on the host device; a memory card attached to the host device; a memory card in the lens camera, a data store in the cloud; or the like, or combination thereof. Next, control may be returned to a calling process.

Figure 29:
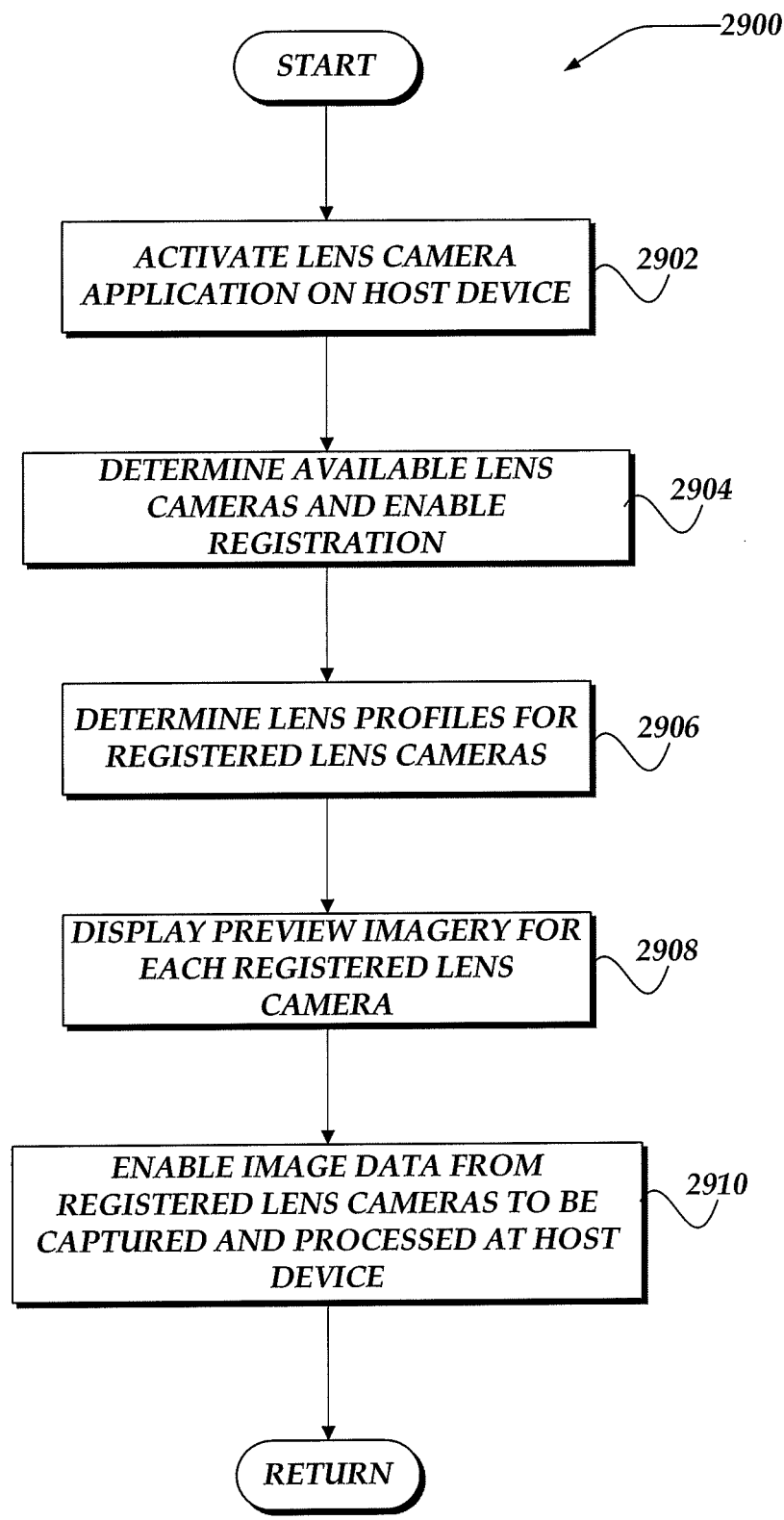
FIG. 29 shows a flowchart for a process for capturing image data with one or more lens cameras, in accordance with at least one of the various embodiments.

FIG. 29 shows a flowchart for process 2900 for capturing image data with one or more lens cameras, in accordance with at least one of the various embodiments. After a start block, at block 2902, a lens camera application may be activated on a host device. In at least one of the various embodiments, a lens camera application, such as, lens camera application 221, may either be activated if a one or more lens cameras are detected by the host device. Or, in at least one of the various embodiments, the lens camera application may be activated by a user.

At block 2904, in at least one of the various embodiments, the available lens cameras may be determined and one or more other available lens cameras may be enabled to register with the host device. In at least one of the various embodiments, if the lens camera application is operative on a host device it may detect one or more lens cameras that may be available for registering with the hosting device.

In at least one of the various embodiments, an available lens camera may be physically coupled to the host device using a wire interface and/or docking/data connector. Or, in at least one of the various embodiments, one or more lens cameras may be available for coupling with the host device wirelessly. In at least one of the various embodiments, if more than one lens camera is determined to available the lens camera application may enable a user to register one or more of the available lens cameras with the host device. In at least one of the various embodiments, lens camera applications may be configured to automatically register previously registered lens cameras. See, at least FIGS. 12-13 for non-limiting examples of wireless coupling; and at least FIG. 18-19 for non-limited examples of physical and/or wired coupling.

At block 2906, in at least one of the various embodiments, one or more lens profiles may be determined for the registered lens cameras. In at least one of the various embodiments, separately, or as part of the registration process, the lens camera application may determine there may be one or more lens profiles available for one or more of the interchangeable lens that may be attached to one or more of the lens cameras.

In at least one of the various embodiments, some lens profiles may be available on the host device while other lens profiles may be located on a server, such as, Camera Information Server Computer 112. In some cases, a user may be prompted by the lens camera application to purchase one or more lens profiles from an online application store and/or by making an "in-application" purchase from within the lens application.

In at least one of the various embodiments, in some cases, depending on the lens type, a lens camera may be disabled from capturing image data if an appropriate lens profile is not found on the host device or otherwise purchased by a user.

At block 2908, in at least one of the various embodiments, image data from one or more of the registered lens cameras may be previewed at the host device. In at least one of the various embodiments, the lens camera application may be arranged to capture preview image from the one or more registered lens cameras and display the preview imagery to a user using the view screen of the hosting device.

In at least one of the various embodiments, preview image data may include imagery having reduced resolution, increased compression, lower frame-rate, or otherwise reduced memory footprint compared to non-preview imagery. However, in some embodiments, the lens camera, may communicate all of the image data to the host device and let the lens camera application perform the image processing for generating the appropriate preview imagery on the host device.

In at least one of the various embodiments, if there are more than one registered lens cameras preview imagery for one or more of them may be displayed simultaneously on the host device view screen. See, at least FIG. 13.

Further, in at least one of the various embodiments, a user may be enabled to select one or more image processing "filters" that may be used to manipulate the image data. For example, a user may select a filter so that image data is processed into black and white images rather than color. Other examples of filters that may be made available include filters for image enhancement and/or special effects. Accordingly, in at least one of the various embodiments, a lens camera application may be arranged to the enable a user to purchase one or more filters from an online application store and/or an in-application store, similarly to how they may be enabled to purchase lens profiles.

In at least one of the various embodiments, image data captured using the lens camera may be used in combination with image data captured by a camera integral and/or built-in to the host device. See, FIG. 25 and FIG. 34.

At block 2910, in at least one of the various embodiments, image data from one or more of the registered lens cameras may be captured, processed, and stored at the host device. In at least one of the various embodiments, a lens camera application operative on the host device may include a user-interface that enables users to selectively trigger the capture of image data from one or more of the registered lens cameras. In at least one of the various embodiments, captured imagery may be processed based on one or more lens profiles, filters, or the like. Also, in at least one of the various embodiments, image processing may be performed for color correction, motion stabilization, high dynamic range imaging, noise reduction, ghost removal, image alignment, or the like, or combination thereof.

In at least one of the various embodiments, the lens camera application may be arranged to capture still or video imagery from more than remote lens camera. In at least one of the various embodiments, the lens camera application operating on a host device may be arranged to enable a user to sequentially trigger multiple lens cameras. Further, the interval between captures in the sequence may be configured using the lens camera application that may be coordinating the sequence. In other cases, multiple lens cameras may be configured to all of the capture images at the same time.

In at least one of the various embodiments, the lens camera application may include a variety of built-in functions for processing image data. Some of these may include artistic filters, or the like. Other functions may include stitching together multiple images and/or videos, or the like. In at least one of the various embodiments, a lens camera application may be arranged to enable a user to purchase and/or download plugins or upgrades that may enable additional image processing function and features to be added to a lens camera application. Accordingly, one of ordinary skill in the art will appreciate that embodiments may include additional image and/or video processing features without departing from the scope the claimed innovations. Next, in at least one of the various embodiments, control may be returned to a calling process.

Figure 30:
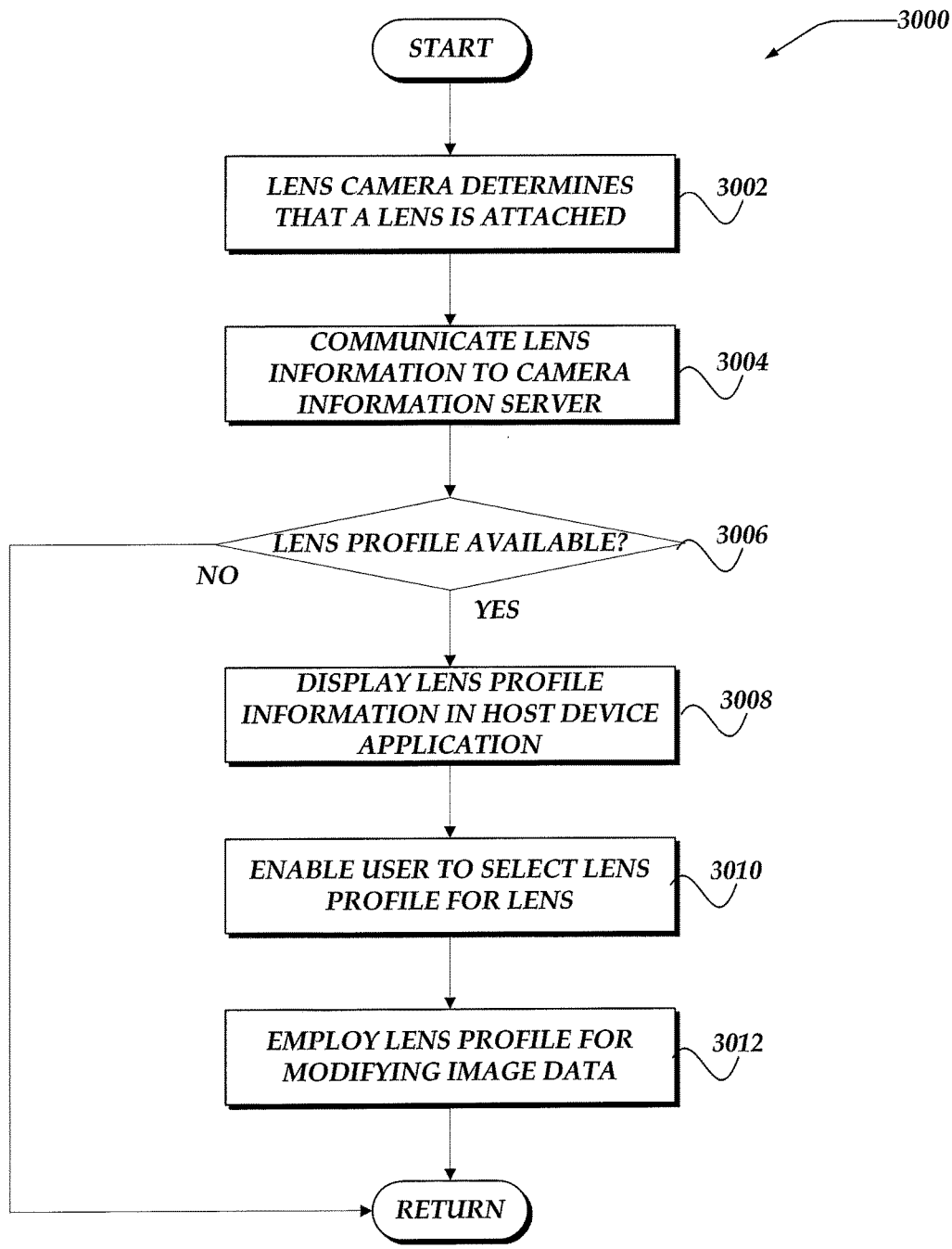
FIG. 30 shows a flowchart for a process for determining lens profiles for interchangeable lenses in accordance with at least one of the various embodiments.

FIG. 30 shows a flowchart for process 3000 for determining lens profiles for interchangeable lenses in accordance with at least one of the various embodiments. After a start block, at block 3002, in at least one of the various embodiments, the lens camera may determine that a lens has been attached. In at least one of the various embodiments, if an interchangeable lens is attached to a lens camera, it may communicate information identifying the lens and/or its characteristics. In at least one of the various embodiments, the elector-mechanical interface built into the lens mount may support the communication. In some cases, the interchangeable lens may send the information actively as part of an initialization process as it is attached. In some other cases, the lens camera application may generate a control message that retrieves the lens information from the interchangeable lens via of the electro-mechanical interface of the lens mount used to the attached the interchangeable lens to the lens camera. In any event, in at least one of the various embodiments, if the interchangeable support electronic identification through the lens mount interface/connections, the lens camera may be arranged to communicate with the interchangeable lens to retrieve the lens information and provide it the lens camera application that may be operative on a host device.

At block 3004, in at least one of the various embodiments, the lens camera application operative on a host device may communicate the lens information to a camera information server. In at least one of the various embodiments, the lens information may be provided over a network to a server, such as, Camera Information Server computer 112 using a defined API and/or interface. In at least one of the various embodiments, the particular network and/or protocol employed to communicate the lens information to the server may be dependent on the capabilities and/or configuration of the host device. For example, in at least one of the various embodiments, a host device may be enabled to communication the information over a wireless network, such as, wireless network 108.

In at least one of the various embodiments, the Camera Information Server may use the lens information to lookup in a database or other remote storage system and/or application whether one or more relevant lens profile may be available for the interchangeable lens.

In at least one of the various embodiments, some interchangeable lens may be unable to be identified electronically. Accordingly, in at least one of the various embodiments, the lens camera application may be arranged to enable the user to capture an image of the interchangeable lens body and upload it to a server, such as, Camera Information Server Computer 112. If such a capture is provided to the server, it may engage one or more well-known machine vision techniques to identify the lens type and manufacturer from the picture.

In at least one of the various embodiments, the user may be enabled to upload a digital image of the text markings on the barrel of interchangeable lens to the server. Accordingly, the server may employ machine vision techniques, such as, optical character recognition (OCR) to identify the make, model, and performance characteristics from the text markings on the interchangeable lens.

At decision block 3006, in at least one of the various embodiments, if a lens profile may be available for the interchangeable lens, control may flow to block 3008; otherwise, control may be returned to a calling process. In at least one of the various embodiments, one or more lens profiles may be determined to correspond with newly attached interchangeable lens. In some cases, new and/or updated lens profiles may have been provided by a lens and/or camera manufacturer. In some cases, the available lens profiles may include lens profiles uploaded by users, or the like. Furthermore, in some embodiments, the available lens profiles may include lens profiles that may have been previously purchased by the user but downloaded to a different host device.

In at least one of the various embodiments, some available lens profiles may be designed to optimize imagery for certain circumstances, such as, low-lighting, black and white, video, color temperature, fast motion, indoor lighting, outdoor lighting, or the like. Thus, in at least one of the various embodiments, lens profiles may be determined based on characteristics, such as, low-light performance, black and white performance, video performance, color temperature performance, fast motion performance, indoor lighting performance, outdoor lighting performance. Accordingly, in at least one of the various embodiments, a given interchangeable lens may have a plurality of different lens profile made available.

In at least one of the various embodiments, one or more of the determined lens profiles may be made available for purchase by a user. In at least one of the various embodiments, lens profiles may be purchased from a web site on the Camera Information Server. Likewise, in at least one of the various embodiments, lens profiles may be made for purchase from within the lens camera application using one or more "in-application" purchasing systems.

At block 3008, in at least one of the various embodiments, information describing the one or more available lens profiles maybe displayed in an application on the host device. In at least one of the various embodiments, the server may communicate the list of available lens profiles to the lens camera application on the host device. In at least one of the various embodiments, the lens camera application may be arranged to display the available lens profiles in a list, or the like. In at least one of the various embodiments, some lens profiles may be displayed with one or more pricing options. In at least one of the various embodiments, pricing options may include, free, one time fees, subscription, free trial offers (e.g., 50 photographs to try out the lens profile before paying), and so on.

At block 3010, in at least one of the various embodiments, the application operative on the host device may enable a user to select a lens profile from the one or more lens profiles for the new interchangeable lens and install any determined lens profile on the lens camera and/or host device. In at least one of the various embodiments, lens profiles have been selected by a user may be displayed in the lens camera application to enable to user to select which lens profile to use. In at least one of the various embodiments, the lens camera application may be configured to automatically determine a default lens profile for a given interchangeable lens. Likewise, in at least one of the various embodiments, if there is only one lens profile available it may be automatically determined and activated.

At block 3012, in at least one of the various embodiments, the determined lens profile may be employed for modifying image data. In at least one of the various embodiments, as image data (e.g., videos, digital photographs) is captured by the lens camera and provided to the host device, the lens camera application may employ some or all of the information included in the determined lens profile to perform image processing for compensating for lens aberrations, filtering, image enhancement, image translation, image warping, or the like, or combination thereof. Next, in at least one of the various embodiments, control may be returned to a calling process.

Figure 31:
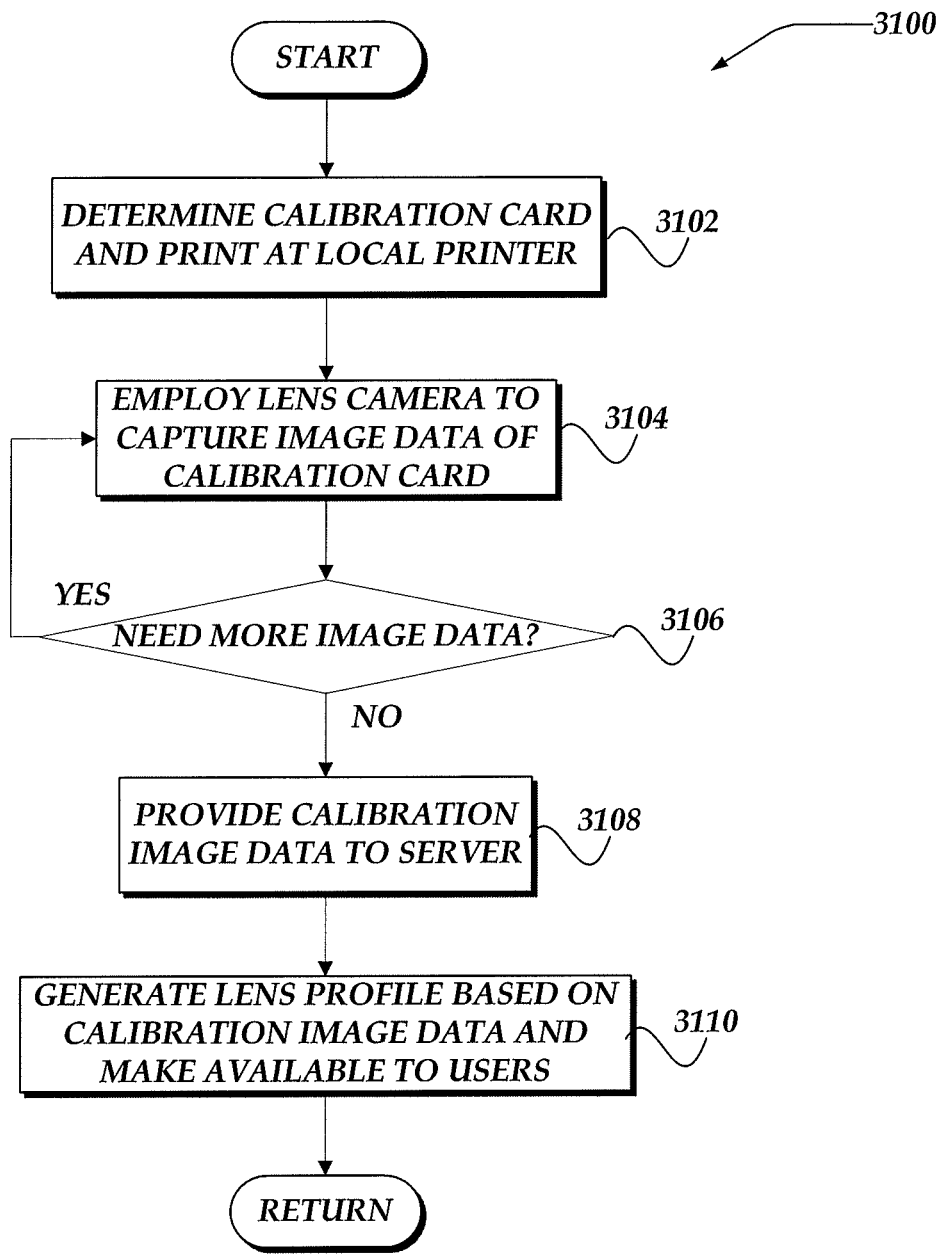
FIG. 31 shows a flowchart for a process for generating lens profiles based on user provided calibration information in accordance with at least one of the various embodiments.

FIG. 31 shows a flowchart for process 3100 for generating lens profiles based on user provided calibration information in accordance with at least one of the various embodiments. After a start block, at block 3102, a calibration card may be determined and by a user at a local printer. In at least one of the various embodiments, a lens camera manufacturer, lens manufacturer, or the like, may provide access to printable calibration cards. In some embodiments, printable calibration cards may be made available on a website, or the like. In at least one of the various embodiments, the lens camera application may be arranged for printing calibrations cards as well.

In at least one of the various embodiments, the user may attach the calibration card to a wall. In at least one of the various embodiments, to ensure a sufficient calibration information may be collected, a user may attach the calibration card a wall or other flat surface the may be large enough to fill the field of view of the lens camera mated with the interchangeable lens that is being calibrated.

At block 3104, in at least one of the various embodiments, image data that includes images of the calibration card may be capture by the lens camera and provided to the host device. In at least one of the various embodiments, if the calibration card does not cover the entire field of the view of the interchangeable lens that is being calibrated, the calibrations application may be super impose information on the host device screen to help guide the user in capturing sufficient calibration image data. Accordingly, in at least one of the various embodiments, the amount of image data captured may depend on the size of the field of view and the size of the calibration card.

In at least one of the various embodiments, the calibration application may be activated on the host device and the lens camera may be pointed at the calibration card that may be attached to the wall. In at least one of the various embodiments, the calibration application (which may be a feature and/or function of the lens camera application) may receive an image of the calibration card and begin the process of collecting image data for calibrating the interchangeable lens.

At decision block 3106, in at least one of the various embodiments, if additional image data is required, control may loop back to block 3104; otherwise, control may flow to block 3108.

At block 3108, in at least one of the various embodiments, the calibration image data collected at the host device may be provided to a server, such as, a camera information server. In at least one of the various embodiments, if the calibration data has determined that image data sufficient for calibration has been collected, the lens camera application may be provided the calibration data to a server, such as, Camera Information Server Computer 112.

At block 3110, in at least one of the various embodiments, a lens profile may be generated based on the calibration image data and made available to users. In at least one of the various embodiments, the server may be arranged to generate one or more lens profiles based on the provided calibration image data.

In at least one of the various embodiments, one or more well-known techniques for calibrating a lens and/or generating lens aberrations compensation information may be performed on the server. In at least one of the various embodiments, calibration application 355 may be arranged to generate one or more lens profiles based on the calibration information. Next, control may be returned to a calling process.

Figure 32A:
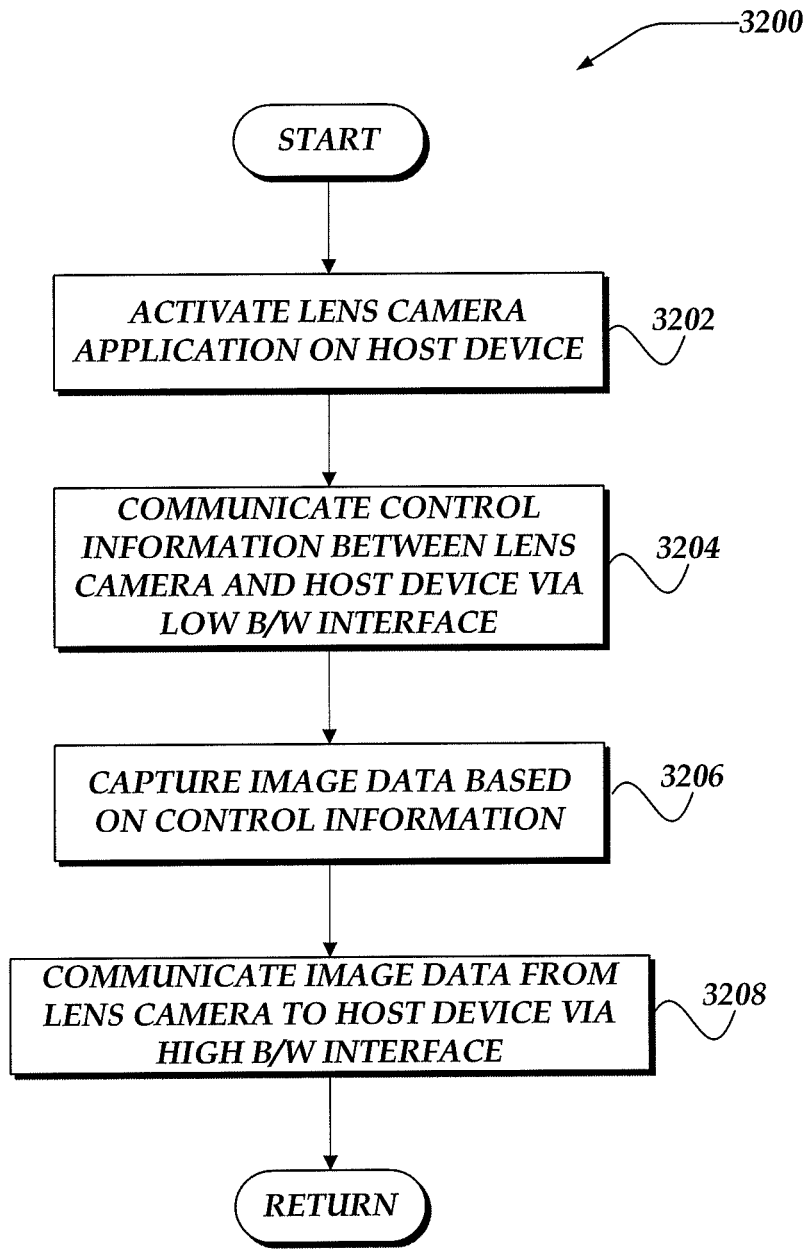
FIG. 32A-32B shows flowcharts for processes for dual band communication between host devices and lens camera in accordance with at least one of the various embodiments.

FIG. 32A shows a flowchart for process 3200 for dual band communication between host devices and lens camera in accordance with at least one of the various embodiments. In at least one of the various embodiments, control messages and image data may be communicated between the lens camera and the host device using separate communication methods. In at least one of the various embodiments, the lens camera application and/or lens camera may be arranged to communicate control messages using low-bandwidth and/or low power communication techniques, such as, NFC, Bluetooth, or the like. Likewise, in at least one of the various embodiments, the lens camera application and/or lens camera may be arranged to communicate image data using high-bandwidth communication techniques, such as, Wi-Fi, or the like.

After a start block, at block 3202, in at least one of the various embodiments, one or more lens camera applications may become operative on a host device. In at least one of the various embodiments, if the lens camera application is initialized, it may determine one or more communication facilities that may be enabled on the host device. Further, it may determine if a lens camera is coupled to the host device. If a lens camera is coupled with the host device the lens camera application may determine which of the available communication facilities may be used to communicate with the lens camera.

At block 3204, in at least one of the various embodiments, control information may be communicated among the lens cameras and the host device using a low bandwidth interface, such as, low bandwidth radio 412. In at least one of the various embodiments, a communication facility for communicating control information may be determined based on configuration settings associated with the lens camera application, user input, host device settings, or the like. In at least one of the various embodiments, the lens camera application may be arranged to determine a low power and/or low bandwidth facility for communicating control information between the lens camera and the host device. For example, if the host device may be connected to the lens camera with a wired dock connector, control messages may be communicated over the dock connector. In other embodiments, if the host device may be coupled the lens camera using wireless facilities, such as, Wi-Fi, Bluetooth, or the like, the lens camera application may determine that the Bluetooth facility may be used for communicating control messages because it consumes less power than the Wi-Fi facility.

At block 3206, in at least one of the various embodiments, the one or more lens cameras capture image data based on part on one or more of the control information communicated between the one or more lens cameras and the host device. In at least one of the various embodiments, control information directing the lens camera to capture image may be provided to the lens camera over using the control information communication facility. Likewise, the lens camera may send control information the lens camera application that is operative on the host device.

At block 3208, in at least one the various embodiments, image data may be communicated from the one or more lens cameras to the host device using a high bandwidth interface, such as, high bandwidth radio 414. In at least one of the various embodiments, image data communication facilities may be determined similarly as control information communication facilities may be determined. (See, block 3204). Except, in at least one of the various embodiments, the criteria for determining an image data communication facility may be different than for determining a control message communication facility. For example, in at least one of the various embodiments, Wi-Fi may be determined for image data communication because of its high-bandwidth potential. Next, in at least one of the various embodiments, control may be returned to a calling process.

Figure 32B:
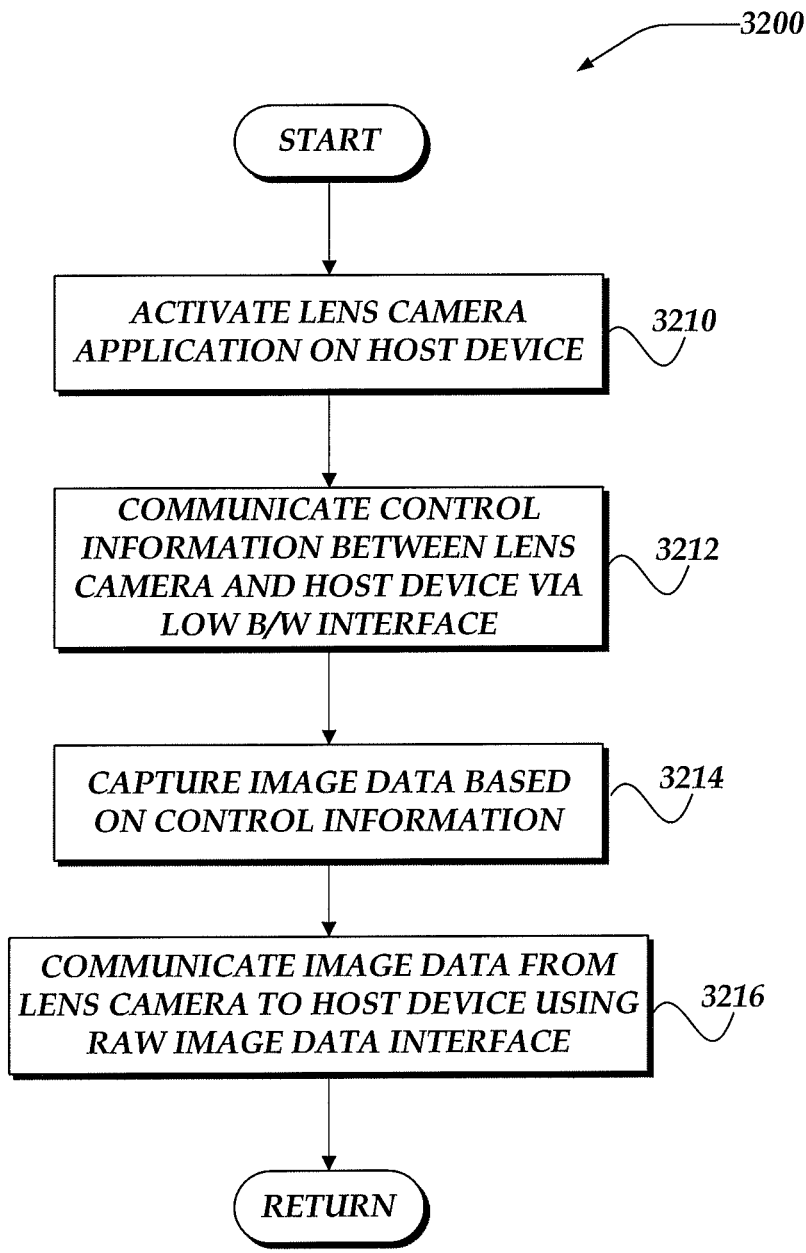

FIG. 32B shows a flowchart for process 3200 for dual band communication between host devices and lens camera in accordance with at least one of the various embodiments. In at least one of the various embodiments, control messages and image data may be communicated between the lens camera and the host device using separate communication methods. In at least one of the various embodiments, the lens camera application and/or lens camera may be arranged to communicate control messages using low-bandwidth and/or low power communication techniques, such as, NFC, Bluetooth, or the like. Likewise, in at least one of the various embodiments, the lens camera application and/or lens camera may be arranged to communicate image data using high-bandwidth communication techniques, such as, Wi-Fi, or the like. Further, in at least one of the various embodiments, a raw image data interface, such as, raw image data interface 416, may be employed for communicating image data from the lens camera.

After a start block, at block 3210, in at least one of the various embodiments, one or more lens camera applications may become operative on a host device. In at least one of the various embodiments, if the lens camera application is initialized, it may determine one or more communication facilities that may be enabled on the host device. Further, it may determine if a lens camera is coupled to the host device. If a lens camera is coupled with the host device the lens camera application may determine which of the available communication facilities may be used to communicate with the lens camera.

At block 3212, in at least one of the various embodiments, control information may be communicated among the lens cameras and the host device using a low bandwidth interface, such as, low bandwidth radio 412. In at least one of the various embodiments, a communication facility for communicating control information may be determined based on configuration settings associated with the lens camera application, user input, host device settings, or the like. In at least one of the various embodiments, the lens camera application may be arranged to determine a low power and/or low bandwidth facility for communicating control information between the lens camera and the host device. For example, if the host device may be connected to the lens camera with a wired dock connector, control messages may be communicated over the dock connector. In other embodiments, if the host device may be coupled the lens camera using wireless facilities, such as, Wi-Fi, Bluetooth, or the like, the lens camera application may determine that the Bluetooth facility may be used for communicating control messages because it consumes less power than the Wi-Fi facility.

At block 3214, in at least one of the various embodiments, the one or more lens cameras capture image data based on part on one or more of the control information communicated between the one or more lens cameras and the host device. In at least one of the various embodiments, control information directing the lens camera to capture image may be provided to the lens camera over using the control information communication facility. Likewise, the lens camera may send control information the lens camera application that is operative on the host device.

At block 3216, in at least one the various embodiments, image data may be communicated from the one or more lens cameras to the host device using a high bandwidth raw image data interface, such as, raw image data interface 416. In at least one of the various embodiments, if more than one image data communication facility is available, image data communication facilities may be determined similarly as control information communication facilities may be determined. (See, block 3212). Except, in at least one of the various embodiments, the criteria for determining an image data communication facility may be different than for determining a control message communication facility. For example, in at least one of the various embodiments, raw Wi-Fi may be determined for image data communication because of its high-bandwidth potential.

In at least one of the various embodiments, image data may be communicated directly to a data store, television, video monitor, computer, video projector, or the like. In some embodiments, image data may be communicated to multiple destinations.

In at least one of the various embodiments, raw image data interfaces may be compatible with one or more of HDMI, microHDMI, Firewire, Thunderbolt, USB, video graphics array (VGA), or the like, or combination thereof. Next, in at least one of the various embodiments, control may be returned to a calling process.

Figure 33:
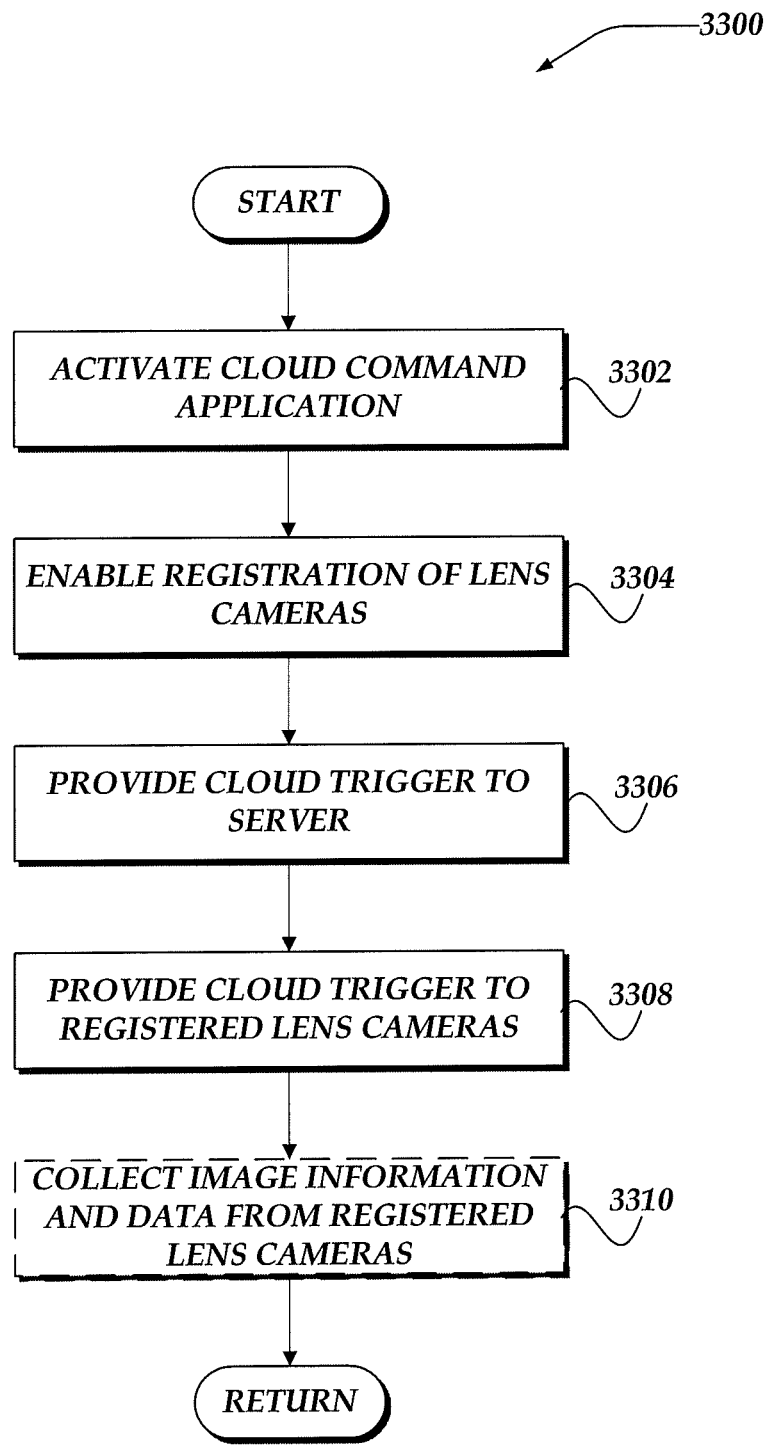
FIG. 33 shows a flowchart for a process for triggering multiple lens cameras in accordance with at least one of the various embodiments.

FIG. 33 shows a flowchart for process 3300 for triggering multiple lens cameras in accordance with at least one of the various embodiments. After a start block, at block 3302, a cloud command application, such as, lens camera application 209 may be activated on a client computer. In at least one of the various embodiments, the lens camera application may be arranged to enable user to activate one or more cloud commands for performing crowd/group operations with multiple lens cameras.

In at least one of the various embodiments, if generating a cloud command, the initiating user may become the "owner" of the cloud command. Accordingly, in at least one of the various embodiments, the owner of a cloud command may set one or more properties associated with the cloud command, such as, trigger name, public or private (invitation only), various guest lens camera capability requirements, description, type of cloud/crowd operation, or the like.

In at least one of the various embodiments, eligibility criteria for guest lens camera may include, defining one or more minimum or maximum threshold for lens properties, such as, focal length, aperture, or the like. In at least one of the various embodiments, criteria may also include lens type, such as, wide-angle, zoom, prime, telephoto, macro, or the like.

Also, in at least one of the various embodiments, guest lens camera requirements may include threshold based on image capture sensor characteristics, such as, size, format, resolution, frame rate, sensitivity, or the like. Furthermore, in at least one of the various embodiments, criteria may be defined based on the host device, such as, communication facilities, processing power, local memory size, location, or the like.

In at least one of the various embodiments, the owner of a cloud command may configure to be private and/or invitation only. Accordingly, the lens camera application may be arranged to enable a cloud command owner to select one or users to invite to register their lens cameras with the cloud trigger. Also, in at least one of the various embodiments, private cloud commands may be invisible to uninvited and/or unsolicited users.

At block 3304, in at least one of the various embodiments, registration of one or more lens cameras may be enabled. In at least one of the various embodiments, one or more other users that have active lens camera on a host device may communicate with a server, such as, Camera Information Server Computer 112 to discover if there are visible and/or active cloud commands. In at least one of the various embodiments, if the user qualifies and meets the entry requirements of a cloud trigger, they may use the lens camera application to indicate an interest to register their lens camera with the cloud command.

At block 3306, in at least one of the various embodiments, a cloud trigger signal may be provided to a server. In at least one of the various embodiments, the user that owns the cloud trigger may activate the trigger from their lens camera application. In at least one of the various embodiments, the server may then provide cloud trigger messages to each of the registered guest lens cameras. In at least one of the various embodiments, a cloud trigger may be provided to the a camera information server or other operative server, using one or more networks, and/or networking methods, at least include those described for network 110 and wireless network 108.

At block 3308, in at least one of the various embodiments, a cloud trigger signal may be provided to each of the registered lens cameras. In at least one of the various embodiments, the server may communicate the cloud trigger to each host device that is coupled to one or more of the registered lens camera. In at least one of the various embodiments, the lens camera application on operative on these host devices may be enabled to display a count down timer to enable the users to be ready when the cloud trigger event occurs.

At block 3310, in at least one of the various embodiments, optionally, image information and/or image data may be collected from each registered lens camera. In at least one of the various embodiments, not every cloud command may trigger each registered lens cameras to capture image data. For example, in some cases, the cloud command may be arranged to activate one or more of the host devices' flashes without capture image data. In at least one of the various embodiments, in other cases image data from each registered lens camera may be captured and provided to the server if the cloud trigger occurs.

In at least one of the various embodiments, image data may be continuously captured, such as, for video streams and/or multi-shot and/or multi-exposure cloud command captures.

In at least one of the various embodiments, image data from the registered lens cameras may be collected and processed on the server and/or made available to some or all of the users that registered their lens camera with the cloud command. For example, in at least one of the various embodiments, the cloud command may be configured to stitch all the image capture data into a single image. In other embodiments, the cloud command may be configured to perform other operations, such as, including generating multi-stream/multi-angle videos, or the like.

In at least one of the various embodiments, cloud commands may be arranged to trigger one or more of the registered lens cameras to capture image data sequentially. For example, in at least one of the various embodiments, several registered lens cameras may be arranged around an perimeter of a sporting event arena, and a cloud command may be arranged such that a first lens camera captures image data for a photograph, then a second, then a third, and so on with a configurable time delay between when each lens camera captures image data. Next, in at least one of the various embodiments, control may be returned to a calling process.

Figure 34:
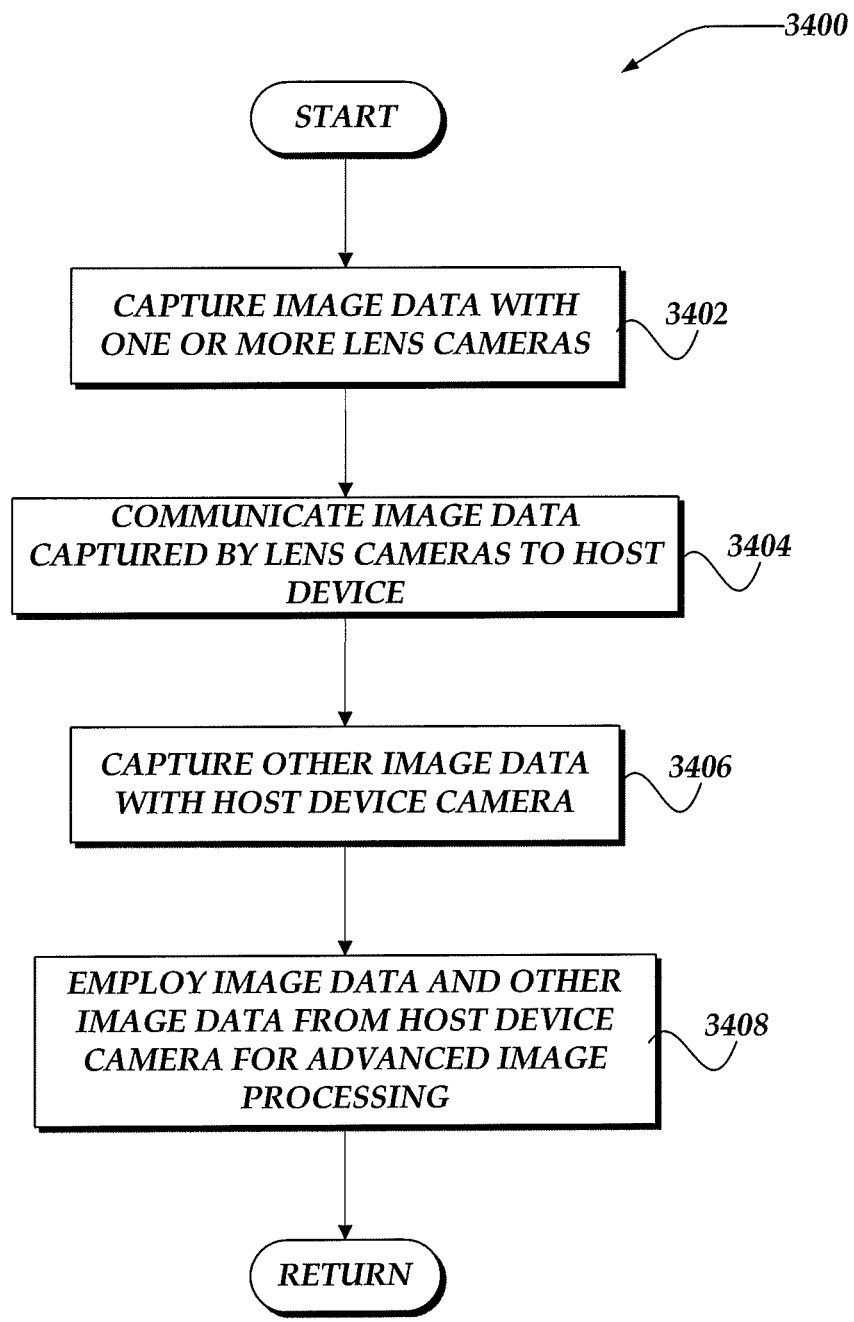
FIG. 34 shows a flowchart for a process for using a lens camera in combination with a host device camera in accordance with at least one of the various embodiments.

FIG. 34 shows a flowchart for process 3400 for using one or more lens cameras in combination with a host device camera in accordance with at least one of the various embodiments. After a start block, at block 3402, image data may be captured by a lens camera. In at least one of the various embodiments, the lens camera may be physically attached and/or coupled to a host device. For example, in at least one of the various embodiments, the lens camera may be attached to a smart phone such as shown in at least FIG. 25. Also, for example, in at least one of the various embodiments, one or more lens cameras remote from the host device may be wirelessly coupled, such as, as shown in at least FIG. 13.

At block 3404, in at least one of the various embodiments, image data captured by the one or more lens cameras may be communicated to the host device.

At block 3406, in at least one of the various embodiments, other image data may be captured using one or more camera that may be integral to the host device. For example, if the host device is a smart phone with a built-in camera, the built-in camera may be activated to captured image data.

At block 3408, in at least one of the various embodiments, the image data captured by the one or more lens cameras and the other image data that may have been captured by the one or more cameras that may be built-in to the host device may be employed for advanced image processing.

In at least one of the various embodiments, image data from one or more of the lens camera and/or the other image data from a camera built-in to the host device may be employed during processing for generating three dimensional (3D) image data, light metering, stereo depth extraction, automatic focusing, image stabilization, background subtraction, high dynamic range image data, ghost image removal, or the like, or combination thereof.

Also, in at least one of the various embodiments, since there may be more than one camera capturing image data at or near the same time, individual cameras, either lens cameras, and/or cameras built-in the host device may use different settings (e.g., exposure, aperture, focus, or the like) if capturing image data. Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A lens camera device for capturing image data, the lens camera device comprising:
a power supply;
an image sensor;
a first mount configured to removably attach a removable lens to the lens camera device, the removable lens configured to enable the image sensor to capture image data;
a memory configured to store the image data;
a transceiver configured to provide wireless communication between at least the lens camera device and a host device;
a second mount configured to removably attach the lens camera device to the host device; and
a hardware processor configured to:
receive the image data in response to control information received from the host device;
modify the image data based on a lens profile associated with the removable lens; and
wirelessly communicate the image data to the host device, wherein the host device is configured to display, store, transmit, or process the image data.

2. The lens camera device of claim 1, wherein the transceiver further comprises:
a first bandwidth radio configured to receive the control information from the host device; and
a second bandwidth radio configured to communicate the image data to the host device, wherein the second bandwidth radio communicates at a higher bit rate relative to the first bandwidth radio.

3. The lens camera device of claim 1, wherein the second mount is configured to removably attach the lens camera device to at least one of a digital camera, a tablet computer, a mobile telephone, a laptop computer, grip assembly or a mobile device.

4. The lens camera device of claim 1, wherein the first mount enables removable attachment based on at least one standardized lens mount interface.

5. The lens camera device of claim 1, further comprising a flash device for illuminating a scene during the capture of the image data, the flash device configured to emit light.

6. The lens camera device of claim 1, wherein the hardware processor is further configured to transmit preview image data to the host device.

7. The lens camera device of claim 1, wherein the second mount further comprises a slot in a housing of the lens camera device configured to grip the host device.

8. The lens camera device of claim 1, wherein the second mount further comprises a connector that enables wired communication between the lens camera device and the host device.

9. The lens device of claim 1, wherein the hardware processor is configured to modify the image data to compensate or correct for at least one aberration of the removable lens.

10. The lens device of claim 9, wherein the at least one aberration of the removable lens includes at least one of: vignetting, barrel distortion, or chromatic aberration.

11. The lens device of claim 1, wherein the hardware processor is configured to select the lens profile associated with the removable lens from a plurality of lens profiles.

12. A hardware chip configured to enable capturing of image data via a lens camera device, the chip comprising:
an image interface configured to receive the image data captured via an image sensor;
a memory interface configured to access a memory that temporarily stores the image data;
a processor configured to:
determine a lens profile associated with a lens, wherein the image data can be modified based on the lens profile associated with the lens;
transmit the lens profile to a host device; and
capture the image data in response to control information received from the host device; and
a communication interface configured to communicate the image data from the lens camera device to the host device, wherein the host device is configured to display the image data or process the image data.

13. The hardware chip of claim 12, wherein the communication interface comprises:
a first bandwidth radio to receive the control information from the host device; and
a second bandwidth radio to communicate the image data to the host device, wherein the second bandwidth radio communicates at a higher bit rate relative to the first bandwidth radio.

14. The hardware chip of claim 12, wherein the lens camera device further comprises:
a first mount configured to removably attach at least one lens to the lens camera device; and
a second mount configured to removably attach the lens camera device to the host device, wherein the host device includes at least one of a digital camera, a tablet computer, a mobile telephone, a laptop computer, grip assembly or a mobile device.

15. The hardware chip of claim 12, wherein the communication interface is further configured to communicate control information with the lens.

16. The hardware chip of claim 12, wherein the communication interface is further configured to receive control information from the host device via a low-bandwidth interface.

17. The hardware chip of claim 12, wherein the communication interface enables a connector in a mount of the lens camera device to provide wired communication between the lens camera device and the host device.

18. The hardware chip of claim 12, wherein the image data can be modified based on the lens profile associated with the lens to compensate or correct for at least one aberration of the lens.

19. The hardware chip of claim 18, wherein the at least one aberration of the removable lens includes at least one of: vignetting, barrel distortion, or chromatic aberration.

20. The hardware chip of claim 12, wherein the processor is configured to determine the lens profile associated with the lens by selecting the lens profile associated with the lens from a plurality of lens profiles.

* * * * *